United States Patent
Graf et al.

[19]

[11] Patent Number: 6,138,076
[45] Date of Patent: Oct. 24, 2000

[54] AUTOMATIC NON-ARTIFICIALLY EXTENDED FAULT SURFACE BASED HORIZON MODELING SYSTEM

[75] Inventors: Kermit E. Graf, Austin; Apostol T. Vassilev, Cedar Park, both of Tex.

[73] Assignee: GeoQuest, a division of Schlumberger, Houston, Tex.

[21] Appl. No.: 09/371,225

[22] Filed: Aug. 10, 1999

Related U.S. Application Data

[62] Division of application No. 08/916,841, Aug. 22, 1997, Pat. No. 6,014,343.
[60] Provisional application No. 60/029,524, Oct. 31, 1996.
[51] Int. Cl.[7] .................................................. G01V 1/28
[52] U.S. Cl. .............................. 702/14; 702/16; 367/73
[58] Field of Search ................................ 702/16, 17, 11, 702/12, 13, 14, 2; 367/72, 73

[56] References Cited

U.S. PATENT DOCUMENTS 5,229,976  7/1993  Boyd et al. ............................... 367/73

*Primary Examiner*—Donald E. McElheny, Jr.
*Attorney, Agent, or Firm*—John H. Bouchard

[57] ABSTRACT

An automatic, non-artificially extended, fault surface based horizon modeling method and apparatus produces a final faulted horizon model which is a three dimensional representation of a faulted earth formation including all the horizons and all the faults in response to seismic data, well log data, and fault surfaces and relationships data. The horizon modeling apparatus produces the final faulted horizon model by filtering input horizon data and removing bad (wrong-sided) data points. This is accomplished by: (a) computing intersections between each horizon and each fault that intersects the horizon, (b) assessing the quality of each intersection, (c) filtering in the vicinity of the intersection by decreasing the slope between the intersecting fault and its respective horizon, (d) generating a horizon surface and reassessing their quality, (e) reintroducing the eliminated data points between the fault and the horizon, (f) re-filtering the reintroduced data points, (g) generating an initial faulted horizon model, (h) generating a set of final fault locations, and (i) generating a final faulted horizon model.

14 Claims, 31 Drawing Sheets

FIG. 14
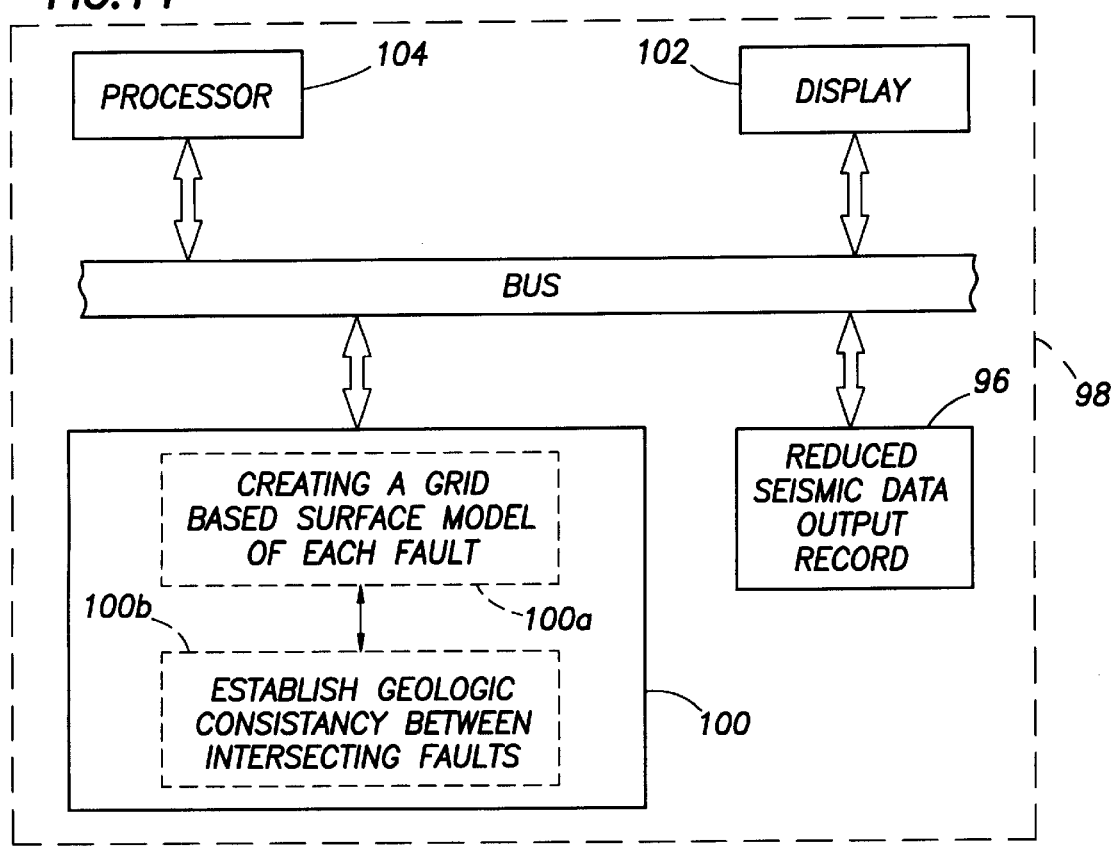
FIG. 15
FIG. 16
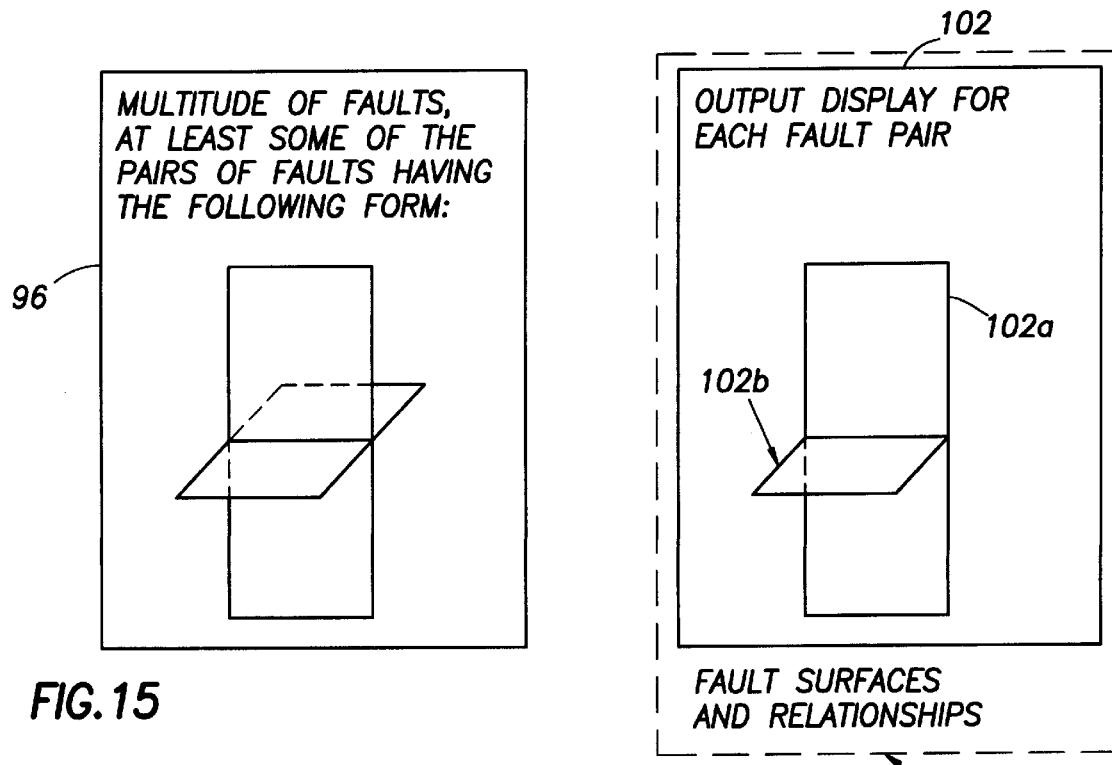

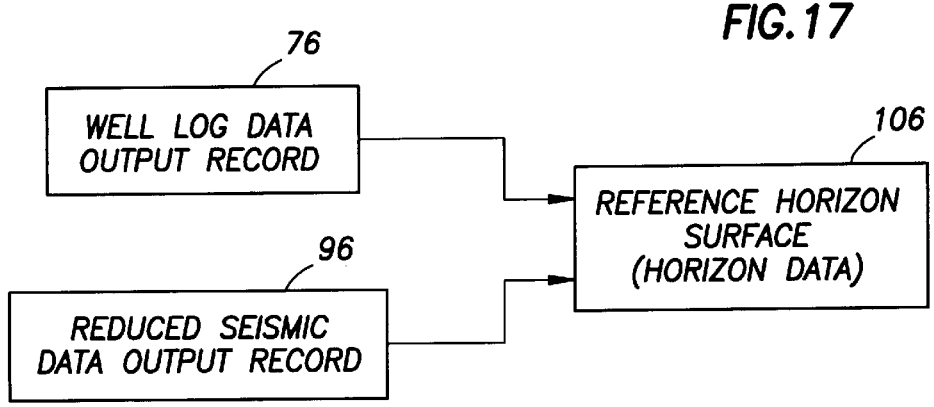
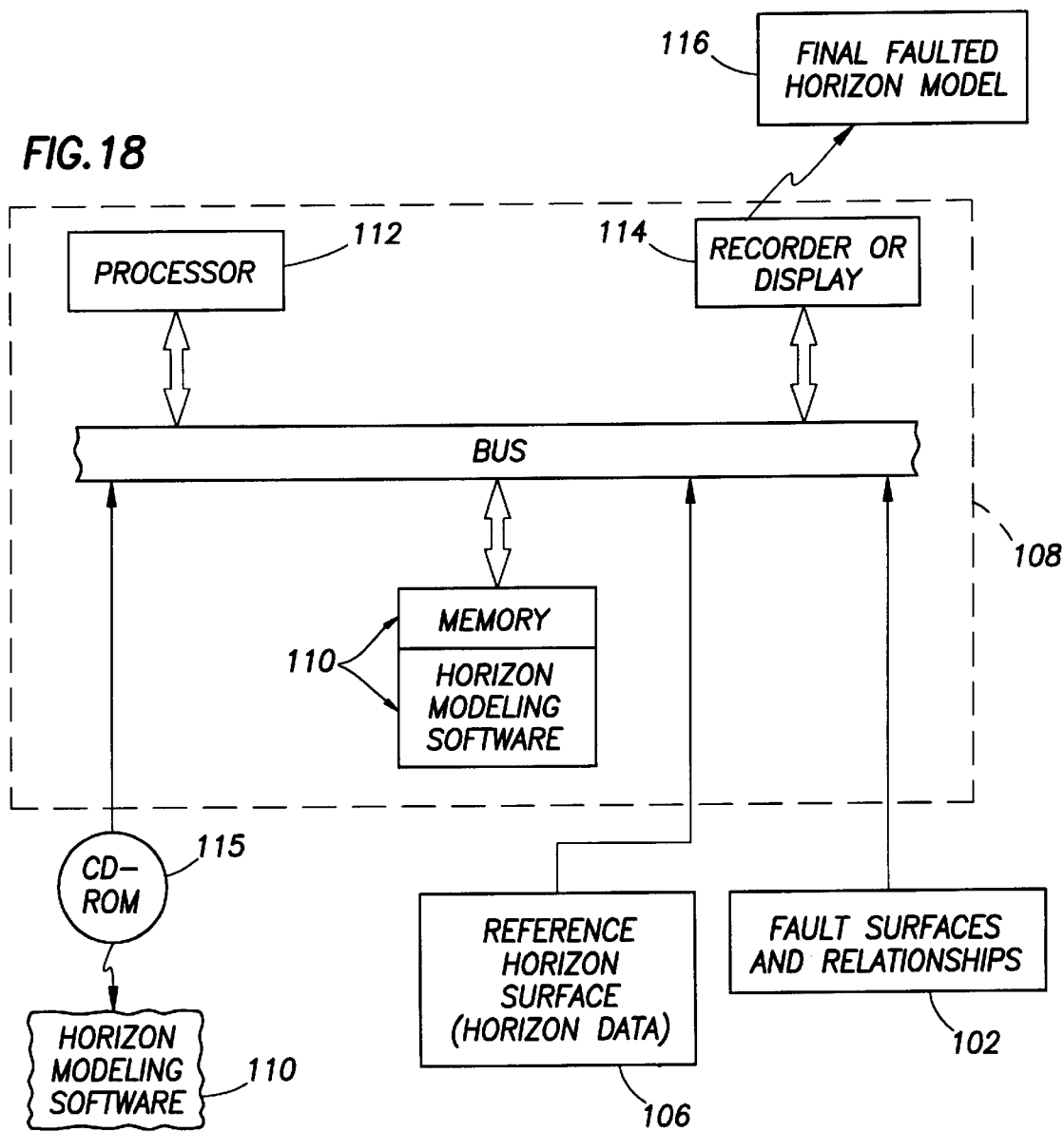

A,D=REFERENCE HORIZONS
B,C=INFILL HORIZONS

FIG. 45

| Current Table | Faults_Gridding | | Main Module | | | | |
|---|---|---|---|---|---|---|---|
| Fault Surface | | Segments | Smooth | Trend | Inc. | Extrap. | Calc. Tip Loop |
| ▼ Faults_F_01 | ▨ | Faults_F_01_fsegs | High ☐ | 2nd Order ☐ | 1 ☐ | 150.000000 | Calc ☐ |
| ▲ Faults_F_02 | ▨ | Faults_F_02_fsegs | High ☐ | 2nd Order ☐ | 1 ☐ | 150.000000 | Calc ☐ |
| ▼ Faults_F_03 | ▨ | Faults_F_03_fsegs | High ☐ | 2nd Order ☐ | 1 ☐ | 150.000000 | Calc ☐ |
| ▼ Faults_F_04 | ▨ | Faults_F_04_fsegs | Very High ☐ | 2nd Order ☐ | 1 ☐ | 150.000000 | Calc ☐ |
| ▼ Faults_F_05 | ▨ | Faults_F_05_fsegs | High ☐ | 2nd Order ☐ | 1 ☐ | 150.000000 | Calc ☐ |
| ▼ Faults_F_06 | ▨ | Faults_F_06_fsegs | High ☐ | 2nd Order ☐ | 1 ☐ | 150.000000 | Calc ☐ |
| ▼ Faults_F_07 | ▨ | Faults_F_07_fsegs | High ☐ | 2nd Order ☐ | 1 ☐ | 150.000000 | Calc ☐ |
| ▼ Faults_F_09 | ▨ | Faults_F_09_fsegs | High ☐ | 2nd Order ☐ | 1 ☐ | 150.000000 | Calc ☐ |
| ▼ Faults_F_10 | ▨ | Faults_F_10_fsegs | High ☐ | 2nd Order ☐ | 1 ☐ | 150.000000 | Calc ☐ |

| Defaults... | Add... | Remove | Remove All | Load Table... | Save Table... | Expand All | Contract All | Sort |

| OK | Apply | Cancel | Help |

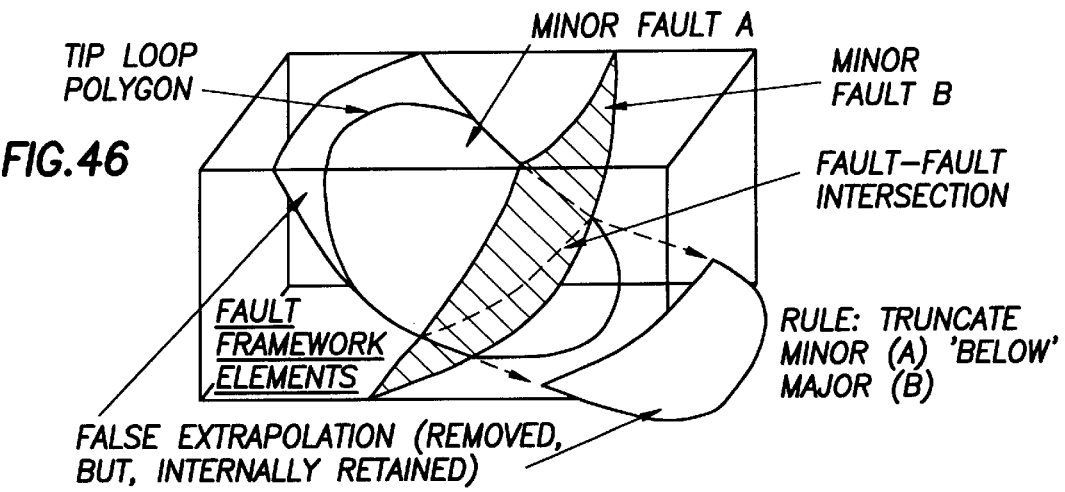

| Build Fault Framework | | | | |
|---|---|---|---|---|
| Fault Framework | Fault_framework | Pick Set... | | |
| Vertical Faults | | Pick Set... | | |
| Select Colors | Fault | Related Fault | Major | Minor Truncated |
| | Faults_F_01 | Faults_F_02 | Faults_F_01 | Below |
| | Faults_F_01 | Faults_F_11 | Faults_F_01 | Below |
| | Faults_F_01 | Faults_F_12 | Faults_F_01 | Above |
| | Faults_F_01 | Faults_F_A | Faults_F_01 | Above |
| | Faults_F_01 | Faults_F_B | Faults_F_01 | Above |
| | Faults_F_01 | Faults_F_C | Faults_F_01 | Above |
| | Faults_F_01 | Faults_F_H | Faults_F_01 | Above |
| | Faults_F_01 | Faults_F_Ha | Faults_F_01 | Below |
| | Faults_F_02 | Faults_F_01 | Faults_F_01 | Below |
| | Faults_F_02 | Faults_F_A | Faults_F_A | Below |
| | Faults_F_03 | | Undefined | Undefined |
| | Faults_F_04 | | Undefined | Undefined |
| | Faults_F_05 | Faults_F_06 | Faults_F_05 | Above |
| | Faults_F_05 | Faults_F_07 | Faults_F_05 | Below |
| | Faults_F_06 | Faults_F_08 | Faults_F_05 | Above |

Find Fault                                     Hide Duplicate Rows

| Load Faults... | Remove Fault | Save to fault framework(not needed) |
|---|---|---|
| Calculate Rules | Restore Fault | |

| OK | Apply | Cancel | Help |

FIG.48
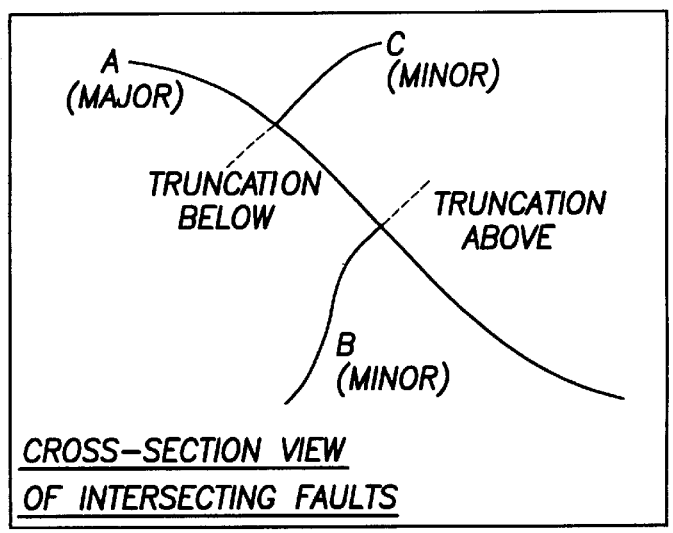
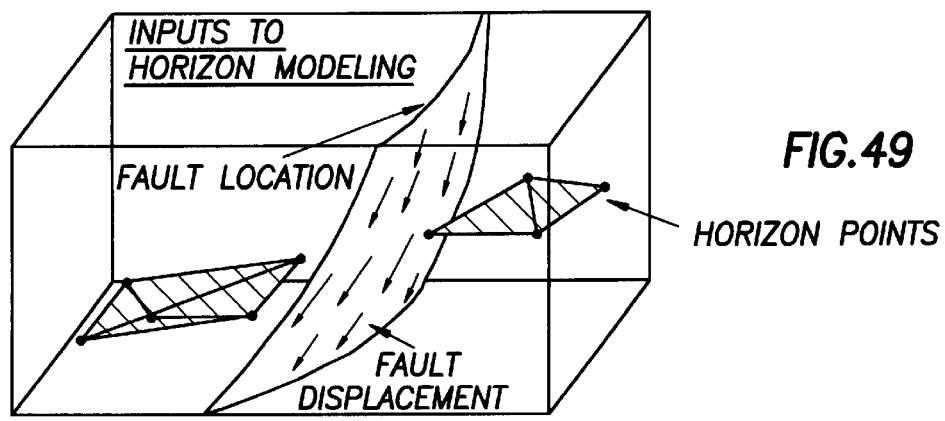
FIG.49
FIG.50
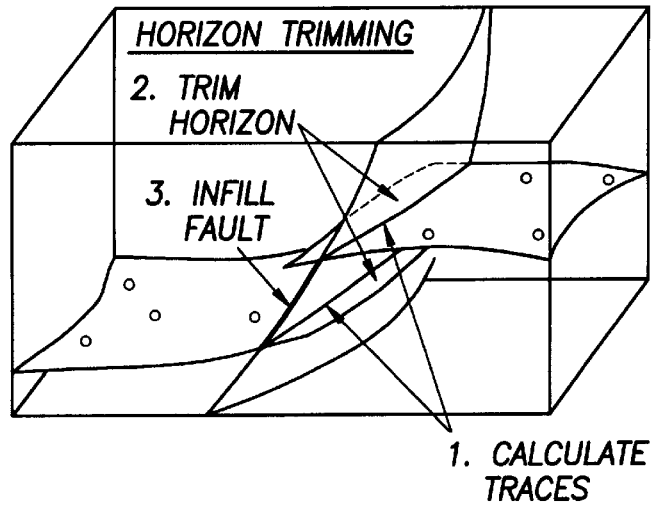

FIG.51
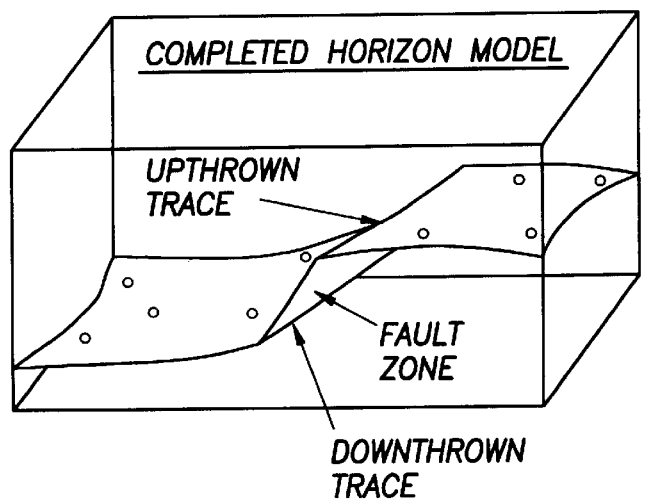
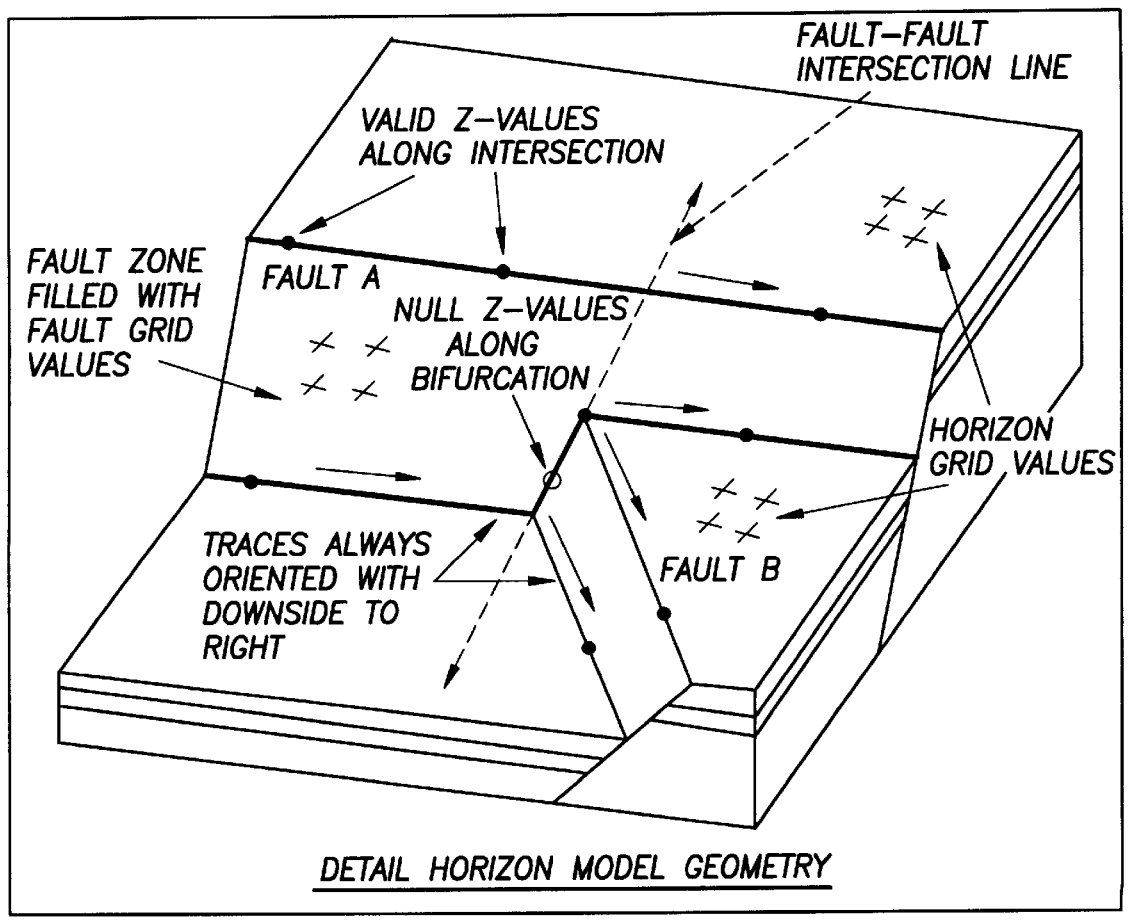
FIG.52

FIG.54
| MODE ICON | FAULT FRAMEWORK | CONFORMAL REFERENCE SURFACES |
|---|---|---|
| HORIZON MODELING MODES OF OPERATION ||| 
|  | NONE (FAULTING OFF) | NONE (CONFORMAL OFF) |
| 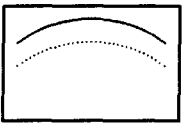 | NONE (FAULTING OFF) | ABOVE |
|  | | BELOW |
| 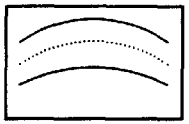 | | BOTH |
| 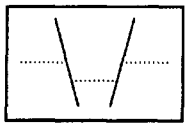 | REQUIRED | NONE (CONFORMAL OFF) |
| 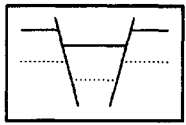 | REQUIRED | ABOVE |
| 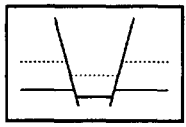 | | BELOW |
| 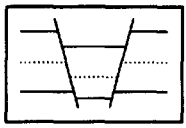 | | BOTH |

FIG. 55

Horizon Modeling

Process control
- ● Do all modeling calculations
- ○ Calculate initial fault locations only
- ○ Calculate model using initial fault locations
- ○ Restart modeling at fault trace calculation
- ○ Restart modeling at fault trace regrid calculation
- ○ Restart modeling at fault zone infill ☒ Save internal data(necessary for restart options)

When calculating initial fault locations

| | | |
|---|---|---|
| Initial seismic filter distance (relative to fault surfaces) | [Computed] | ☒ Computed / ☐ No filtering |
| Maximum number of iterations in fault location calculations | 10 | |
| Maximum distortion allowed in fault location lines (degrees) | 30 | ▲▼ |

When calculating horizon model

Seismic filtering (based on initial fault locations)

| | | | |
|---|---|---|---|
| Minimum filter distance | [Computed] | ☒ Computed | ☐ No filtering |
| Maximum filter distance | [Computed] | ☒ Computed | |

| OK | Cancel | Help |

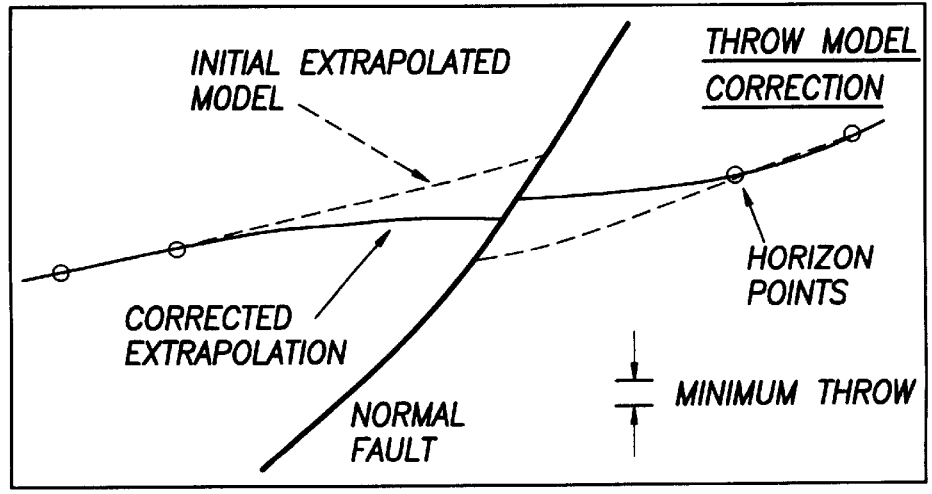

FIG. 56

AUTOMATIC NON-ARTIFICIALLY EXTENDED FAULT SURFACE BASED HORIZON MODELING SYSTEM

CROSS REFERENCE TO RELATED APPLICATIONS

This specification is a division of 08/916,041, filed Aug. 22, 1997, U.S. Pat. No. 6,014,343, 35 USC 111(a) and 35 USC 119(e)(1) application of prior pending Provisional Application serial No. 60/029,524, filed Oct. 31, 1996, and entitled "Method for 3D Modeling of Faulted Geologic Horizons".

BACKGROUND OF THE INVENTION

The subject matter of the present invention relates to a fully automated software based method and apparatus for 3D modeling of faulted geologic horizons, and more particularly, to a workstation based apparatus and associated software based method for modeling, in 3D space, a horizon in an earth formation which is intersected by one or more faults in the earth for the purpose of accurately determining the geometry of earth formations and consequently of a precise definition of oil reservoirs, the workstation generating, on a recording medium, a "final faulted horizon model" including a set of "final fault locations" which represent the intersection between the horizon and the fault(s), the generated "final faulted horizon model" assisting an operator interpreter in the task of locating underground deposits of hydrocarbons which are situated near the "final fault locations". A geologic horizon is the interface between two depositional earth formations or layers, which, when faulted, results in a complex interface with abrupt changes in depth.

The energy industry is continuously involved in the location of underground deposits of hydrocarbons, such as oil, in earth formations. In order to locate such hydrocarbons, "computer modeling" is a technique that is used for the purpose of simulating the earth formation in which the underground deposits of hydrocarbons are located. The earth formation is comprised of a plurality of horizons and a multitude of faults which intersect the horizons. When the computer modeling technique is used, a computer workstation executes a block of software and, in response thereto, a model is generated by a recorder that will contain horizon surfaces and will display all the intersections between all the faults and each of the horizons in the earth formation. The intersection between each fault and each horizon is called a "final fault location" and each horizon surface model that is generated by the workstation recorder is called a "final faulted horizon model". When the final fault locations on the final faulted horizon model are generated by the recorder, a workstation operator can determine the location of the underground deposits of hydrocarbon (e.g, oil) because the hydrocarbon deposits can be situated adjacent to one or more of the intersections (final fault locations).

However, in the past, the workstation operator had to arduously perform a significant amount of work in order to construct accurate faulted horizon models and determine the intersections (final fault locations) between the faults and each of the earth formation horizons. That is, when a horizon is intersected by a fault, in the past, a first section of the horizon located on one side of the fault had to be manually defined and extended by the workstation operator and a second section of the same horizon located on the other side of the fault also had to be manually defined and extended by the workstation operator in order to ultimately determine the shape and/or characteristics of the intersection (final fault location) between the fault and the horizon. This task performed by the operator is very laborious and time consuming, typically requiring many weeks, even months, to complete.

A common approach to construction of these types of models is to require at least partial definition of fault intersection lines as input along with horizon data. Older, more conventional modeling methods require definition of all intersection lines with no direct usage or requirement of faults as surfaces. The definition of these lines is typically done manually by the operator. Such definitions result in large errors which deteriorate the consistency and accuracy of all subsequent models. Less common, but more advanced, approaches take as an input fault geometry local to the horizon in the form of piecewise planar approximations, or they may accept faults as surfaces but with an additional requirement of approximate intersection lines to assist model building. Again, such operator defined output data is not guaranteed to be accurate and consistent with the rest of the input data which can corrupt the subsequent modeling results. Finally, there are other, even more advanced, approaches which are fully fault surface based, but lack automation, requiring time consuming human intervention and analysis at key phases of the modeling process.

In addition, the prior art horizon modeling system adapted to generate a final faulted horizon model utilized the "fault blocking" method. That is, for a particular horizon in the earth formation which is intersected by a plurality of faults to form a horizon model and a corresponding plurality of horizon/fault intersections on the particular horizon, a preliminary step was taken during the horizon modeling including the step of manually extending the ends of the horizon/fault intersections to the model boundary, or to another horizon/fault intersection, to thereby form a plurality of closed "fault blocks" on the particular horizon prior to performing the remaining horizon modeling steps and generating the final faulted horizon model. This preliminary step (of extending the ends of the horizon/fault intersections to the model boundary or to another horizon/fault intersection thereby forming the plurality of the fault blocks on the horizon) represents one type of design philosophy associated with one type of horizon modeling system, which design philosophy is different than the design philosophy of the horizon modeling system of the present invention. A fundamental assumption for all faulted horizon modeling methods is that the fault models are computed and available. Each model is represented by a surface in the 3D space. Every fault has a type associated with it (i.e., normal, reverse, mixed). A fault is "normal" if the horizon sections on both sides of the fault surface are non-overlapping. A fault is "reverse" if the horizon sections are overlapping. A fault is "mixed" if, in some areas along the fault surface, it is normal and, in others, it is reverse. We further assume that appropriate geological relationships between related faults are established and available (see prior pending application Ser. No. 08/823,107 filed Mar. 24, 1997, now U.S. Pat. No. 5,982,707, and entitled "Method and Apparatus for Determining Geologic Relationships for Intersecting Faults", the disclosure of which is incorporated by reference into this specification).

As a result, a fully automated general method and apparatus is needed in order to determine the shape and/or characteristics of each of the horizons and of each of the final fault locations (intersections) between each of the faults and each of the horizons in the earth formation. The requirement to form closed fault blocks for the definition of the faulted horizon model is eliminated completely. Thus, complicated faulted horizons can be constructed much more accurately and reliably in a very efficient way.

SUMMARY OF THE INVENTION

Accordingly, it is a primary object of the present invention to provide an automatic non-artificially extended fault surface based horizon modeling system which does not utilize the fault blocking design philosophy but instead adopts another different type of modeling philosophy which allows the faulted horizon model to be defined in the presence of faults which die out naturally within the modeling domain without providing any extensions of the original fault models.

It is a further object of the present invention to provide a fully automated method and apparatus for determining a final faulted horizon model of an earth formation where the final faulted horizon model includes a set of characteristics associated with each of the final fault locations (or intersections) between each intersecting fault and each horizon in the earth formation.

It is a further object of the present invention to provide a fully automated method and apparatus for determining a final faulted horizon model of an earth formation, such fully automated apparatus being based on a unique adaptive technique for horizon data filtering, eliminating the need for human intervention in developing horizon models, and reducing significantly the time needed for developing accurate models and obtaining precise estimates for available oil and gas resources.

It is a further object of the present invention to provide the aforementioned automatic non-artificially extended fault surface based horizon modeling system which further utilizes two filters, one filter being adapted for filtering in the vicinity of preliminary inconsistent horizon/fault intersections by eliminating some horizon data points thereby decreasing the slope of the resulting preliminary horizon model close to the faults, and another filter being adapted for refiltering any reintroduced horizon data points by eliminating certain ones of the data points which are located within a narrow filtering zone determined by the initial fault locations, which are computed by the first filter.

It is a further object of the present invention to provide a fully automated method and apparatus for determining a final faulted horizon model of an earth formation, which apparatus will determine the final faulted horizon model by: automatic determination of initial estimates of fault locations using fault surfaces and horizon data, automatic filtering of horizon data to remove wrong-sided points with respect to the fault surfaces that would otherwise produce an incorrect model, and automatic definition of a fault throw model for each fault, constraining the horizon at the initial fault locations to honor the fault type (normal or reverse).

It is a further object of the present invention to provide a fully automated method and apparatus, for determining initial estimates of fault locations using fault surfaces and horizon data by: (a) introducing data representing one horizon, (b) generating a preliminary horizon model, (c) computing the intersections between this preliminary horizon model and each fault, (d) improving the preliminary horizon model by filtering the horizon data in the vicinity of these intersection curves which exhibit geometric characteristics not in good agreement with the geometric characteristics of the corresponding fault, and repeating the above procedure in steps (a) through (d) for each horizon until horizon and fault surfaces have clean intersections representing initial fault locations which have geometric characteristics matching well the geometric characteristics of the corresponding fault.

It is a further object of the present invention to provide a fully automated method and apparatus, for filtering the input horizon data and removing bad (wrong-sided) data points coming from existing methods and apparatus for interpretation of seismic data by: (e) reintroducing the eliminated data points between the fault and the horizon which were eliminated during the above referenced first filtering step (d), (f) re-filtering the reintroduced data points, which now constitutes the original input data points, by eliminating certain ones of the data points which are located within a narrow filtering zone in the vicinity of the initial fault locations thereby generating clean horizon data.

It is a further object of the present invention to provide a fully automated method and apparatus, for determining an initial faulted horizon model in an earth formation, by: (g) generating an initial faulted horizon model in response to the clean horizon data, generated during the above referenced re-filtering step (f), and the initial fault locations where the initial faulted horizon model includes a horizon having a substantially vertically sloped fault or discontinuity passing through the initial fault locations.

It is a further object of the present invention to provide a fully automated method and apparatus, for determining a final faulted horizon model of an earth formation, by: (h) generating a set of final fault locations in response to the original initial fault locations and the initial faulted horizon model generated during the above referenced generating step (g) where the final fault locations represent a horizon having a non-vertically sloped fault or discontinuity passing therethrough, the horizon having a fault zone including an apparent oval shaped opening through which the non-vertically sloped fault passes.

It is a further object of the present invention to provide a fully automated method and apparatus, for determining an accurate estimate of the underground deposits of hydrocarbon in an earth formation, by: (i) generating a final faulted horizon model in response to the final fault locations generated during the above referenced generating step (h) but not in response to the initial fault locations generated during the above referenced generating step (d), the final faulted horizon model including one or more accurately represented intersections between a horizon and one or more faults passing through the horizon, one or more fluid contact surfaces describing the interface between the ground water and the hydrocarbon fluid, the underground deposits of hydrocarbon being potentially located adjacent the intersections of the final faulted horizon model above the oil/water contact.

It is a further object of the aforementioned automatic non-artificially extended fault surface based horizon modeling system to automatically calculate a conformal horizon model in response to a reference faulted horizon model and a very small number of actual horizon data points. The relative position of the conformal model is determined by the actual data points, but the shaping of the horizon surface is controlled by the reference horizon.

It is a further object of the present invention to provide a fully automated method and apparatus for determining conformal horizon data by combining the actual horizon data with shaping data derived from the reference horizons, and properly taking into account the 3D geometrical features of the faults and the reference horizons involved. Once the data for the conformal horizon is defined, the construction of the faulted conformal horizon model is very similar to the aforementioned faulted horizon models.

In accordance with these and other objects of the present invention, a fully automated, workstation and software based, non-artificially extended, and fault surface based horizon modeling system will automatically calculate a plurality of reference and conformal horizon models in response to a reference horizon data and a few additional data points on the conformal horizon models thereby producing final faulted horizon models of earth formations by performing three fundamental steps:

1. Automatically determining initial estimates of fault locations (lines of intersection between the horizon and faults) using fault surfaces and horizon data; these estimates account for fault die out within the bounds of the horizon model, i.e., they estimate where the fault does and does not exist in the horizon; reliable fault location estimation is the key ingredient of the 3D modeling process described herein; unique methods are used which offer a robust solution for the general data case;

2. Automatically filtering of horizon data to remove wrong-sided points with respect to the fault surfaces that would otherwise produce an incorrect model; this reconciles horizon data with fault surface locations, insuring that all modeling input data items are mutually consistent; appropriate filter distances are calculated for each fault based on the analysis of the horizon data close to the initial fault locations; this modeling step is essential for the automation of the modeling process and guarantees a high quality final horizon model; and 3. Automatically defining a fault throw model for each fault, constraining the horizon at the initial fault locations to honor the fault type, either normal or reverse; this is especially important for sparse data sets where the extrapolated horizon along each side of a normal fault may result in a reverse fault in some places and a normal fault in others along the corresponding initial fault location; the opposite can happen in regards to a reverse fault; throw modeling enforces consistency and is used only when a fault displacement model is unavailable; without this step, the user would need to intervene with interpreted points in void areas close to faults to constrain the model; throw modeling is also effective in modeling void and naturally formed fault blocks, that is, blocks without any data points.

More particularly, a fully automated workstation and software based horizon modeling method and apparatus is disclosed which is based on non-artificial fault extensions. The horizon modeling method and apparatus determines and generates a final faulted horizon model for an earth formation based on a design philosophy which does not artificially extend the fault surfaces or the ends of the horizon/fault intersection on a particular horizon but instead allows the ends of the horizon/fault intersections on the particular horizon to terminate naturally, the generation of the final faulted horizon model being accomplished by performing the following steps:

(a) introducing data to the workstation based apparatus which reflects one or more horizons in the formation, fault data for each horizon of the earth formation being modeled including "fault surfaces" and "relationships", the "relationships" including an identification of those pairs of the fault surfaces that intersect, and a further identification of the "major/minor" status of each fault of each pair of intersecting fault surfaces, (b) computing a preliminary unfaulted horizon model using only the horizon data, (c) computing intersections between the preliminary unfaulted horizon model and each fault that intersects said horizon model wherein some of the intersections exhibit geometric characteristics which are inconsistent with those of the corresponding fault surface, (d) filtering in the vicinity of the inconsistent intersections by eliminating some horizon data points thereby decreasing the slope of the unfaulted horizon model close to the faults that needed filtering thereby generating a horizon surface having clean, consistent intersections representing initial fault locations, (e) when consistent horizon intersections are generated, reintroducing the eliminated data points, (f) re-filtering the reintroduced data points, which now constitute the original input data points, by eliminating certain ones of the data points which are located within a narrow filtering zone determined by the initial fault locations thereby generating clean horizon data, (g) generating an initial faulted horizon model in response to the clean horizon data generated during the above referenced re-filtering step (f) and the initial fault locations wherein the initial faulted horizon model includes a horizon having a substantially vertically sloped fault or discontinuity passing therethrough at the initial fault locations, (h) generating a set of final fault locations in response to the initial faulted horizon model generated during the above referenced generating step (g) where the final fault locations represent a horizon having a non-vertically sloped fault or discontinuity passing therethrough, the horizon having a fault zone including an apparent oval shaped opening through which the non-vertically sloped fault passes when the final fault locations represent a horizon having the non-vertically sloped fault passing therethrough, and (i) generating a final faulted horizon model in response to the final fault locations generated during the above referenced generating step (h) but not in response to the initial fault locations generated during the above referenced generating step (d).

The final faulted horizon model includes one or more accurately represented intersections between a horizon and one or more faults passing through the horizon, the underground deposits of hydrocarbon being potentially located adjacent to the intersections of the final faulted horizon model.

In summary, a robust method for fully automated 3D horizon modeling in the context of complex faulting is constructed. The method is new and reveals a great potential for becoming a leading technique for horizon modeling in the oil and gas industry. It eliminates the need of human intervention in developing horizon models. The new method reduces significantly the time needed for developing accurate models and obtaining precise estimates for the available oil and gas resources. The automation is based on a unique adaptive technique for horizon data filtering and preliminary faulted horizon surface estimates. A geologic horizon is typically the interface between two depositional earth formations or layers, which, when faulted, results in a complex interface with abrupt changes in depth. Although the modeling method is presented in the context of earth modeling, the same technique is directly applicable to other fields of science and engineering involving complex 3D surface modeling. A new solution is presented which fully automates the horizon modeling process. It does this across a wide variety of horizon data types (coming from seismic sources, well logs, etc) with automatic reconciliation of horizon data to previously modeled fault surfaces. Automation is the distinguishing factor separating this method as unique from other fault surface based horizon modeling methods. However, automation is not at the expense of quality of output so that a high quality model is reliably produced. In addition to horizon data, input requirements include fault surfaces and a description of fault relationships (names of faults that mutually intersect and their major/minor relationship). The system requires a minimum number of modeling control parameters, such as final resolution of the model, smoothing factors, etc. All these inputs are set before horizon modeling starts and they result in a complete horizon model along with its set of horizon-fault intersection lines. Even though the user can choose values for some or all modeling parameters, the system is tuned so that it produces high quality results in the vast majority of cases using default values.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 1 through 3 illustrate problems or deficiencies associated with the prior art, of which FIG. 3 illustrates the so-called "fault blocking" design philosophy adopted by the prior art horizon modeling systems;

FIGS. 14–16 illustrate how the reduced data in the reduced data output record medium of FIG. 13 is used to obtain a set of data called "fault surfaces and relationships", the "fault surfaces and relationships" data being input to the workstation system of FIG. 18;

FIG. 17 illustrates how the well log data in the well log data output record of FIG. 7 and the seismic data in the reduced data output record medium of FIG. 13 are combined to produce data indicative of a "reference horizon surface" or "horizon data";

FIG. 18 illustrates a computer workstation which stores the "horizon modeling software" of the present invention and which receives as input data the "reference horizon surface" data of FIG. 17 and the "fault surfaces and relationships" data of FIG. 16, the workstation of FIG. 18 having a recorder or display which will generate and produce the "final faulted horizon model" in accordance with the present invention, an example of which is illustrated in FIG. 19;

FIG. 28 illustrates the steps performed by:

Figure 21:
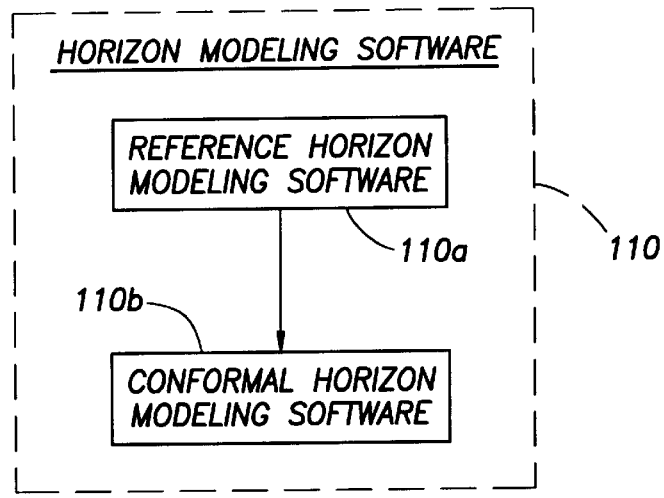
FIG. 21 illustrates how the horizon modeling software of the present invention illustrated in FIG. 18 includes a reference horizon modeling software and a conformal horizon modeling software.
Figure 23:
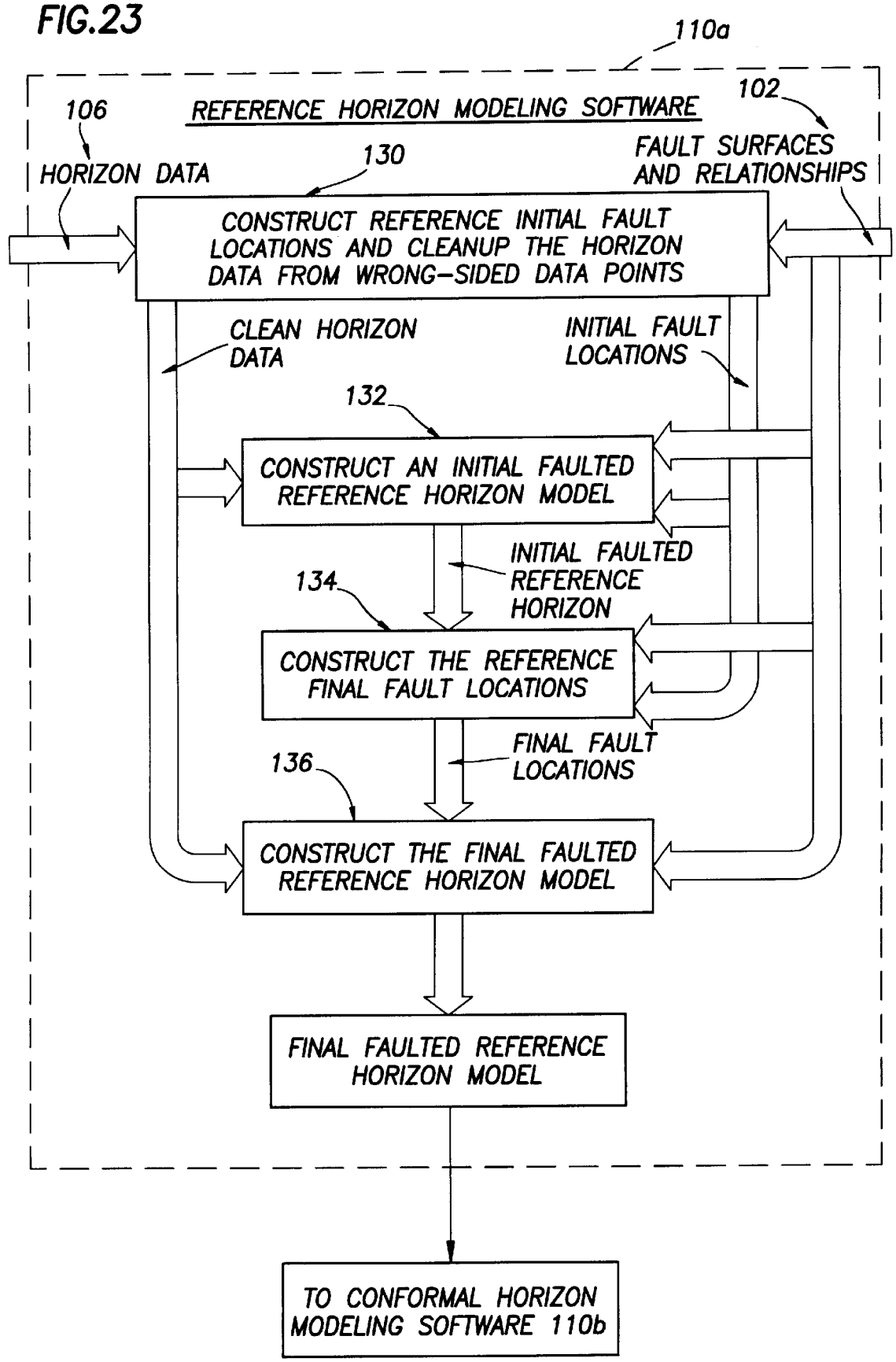
FIG. 23 illustrates a construction of the reference horizon modeling software.
Figure 24:
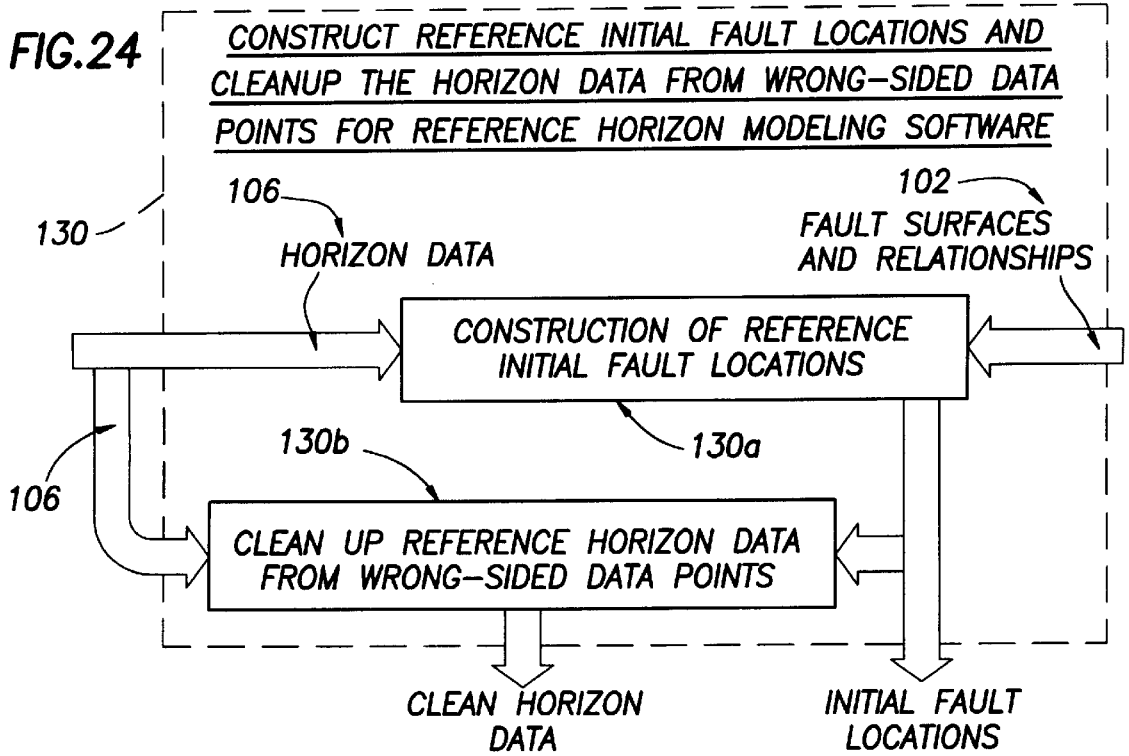
FIG. 24 illustrates a construction of the "construct initial fault locations and cleanup the horizon data from wrong sided data points" block of code in the reference horizon modeling software of FIG. 23.
Figure 25:
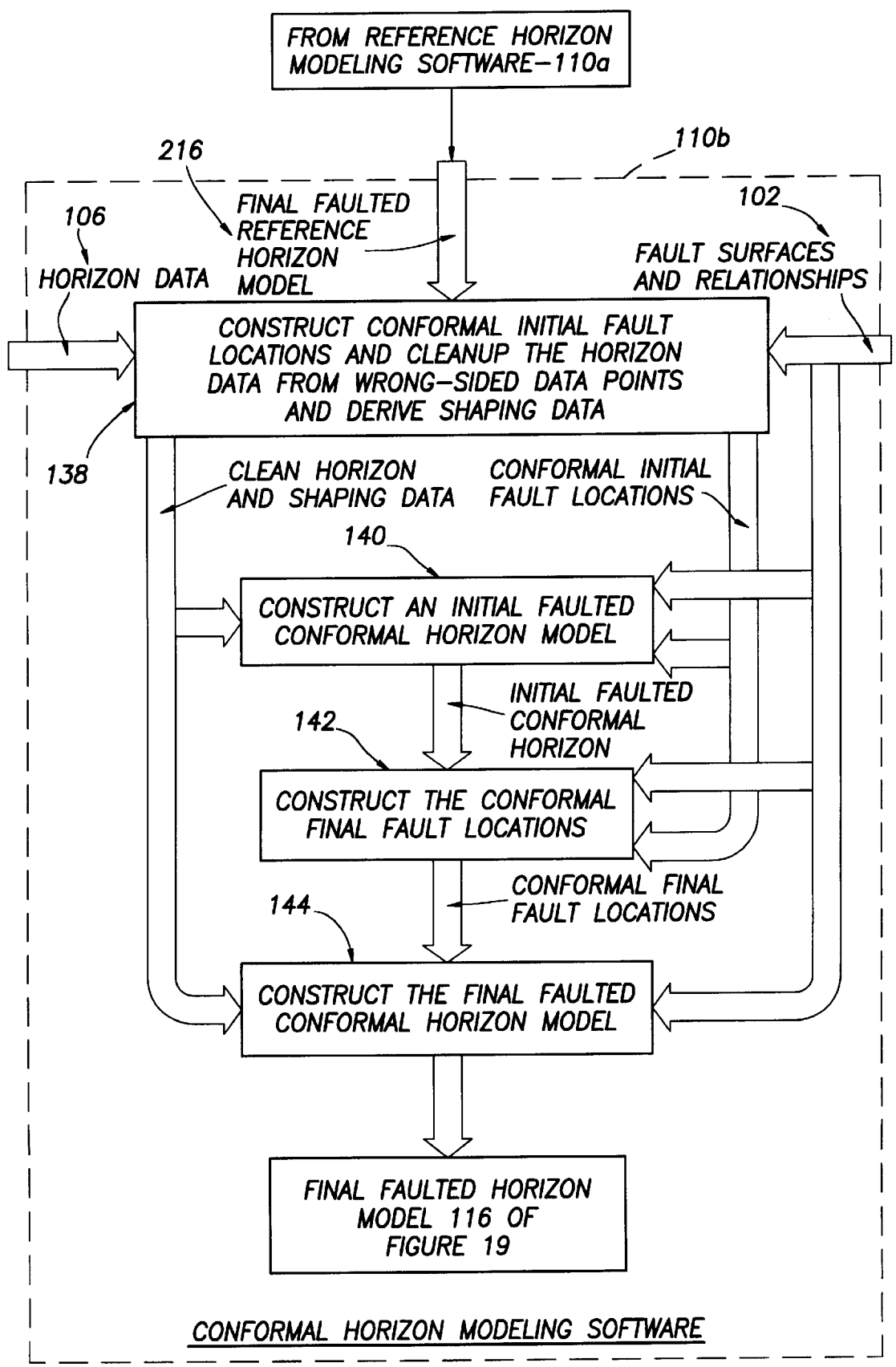
FIG. 25 illustrates a construction of the conformal horizon modeling software.
Figure 26:
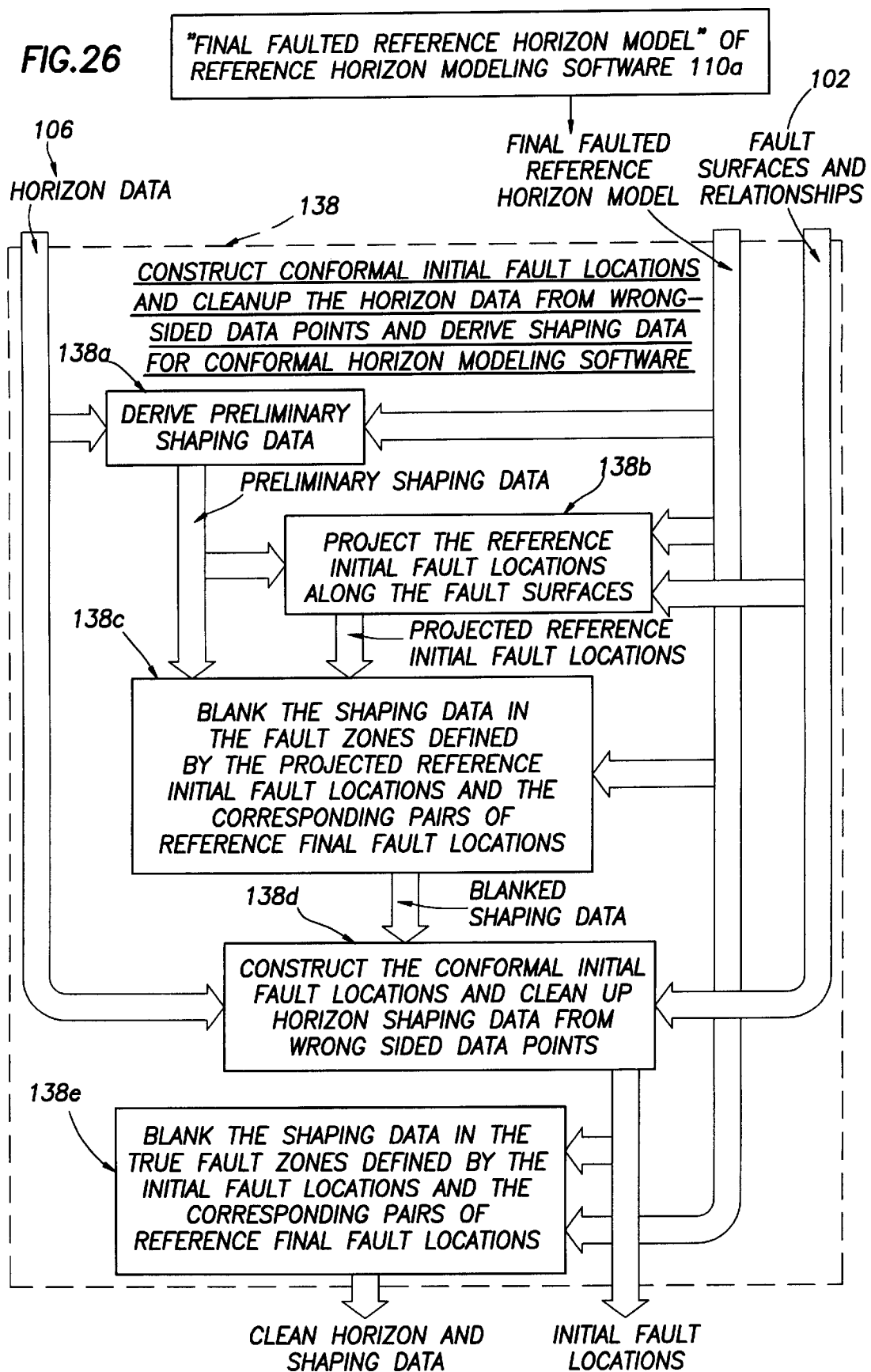
FIG. 26 illustrates a construction of the "construct initial fault locations and cleanup the horizon data from wrong sided data points and derive shaping data" block of code in the conformal horizon modeling software of FIG. 25.
Figure 27:
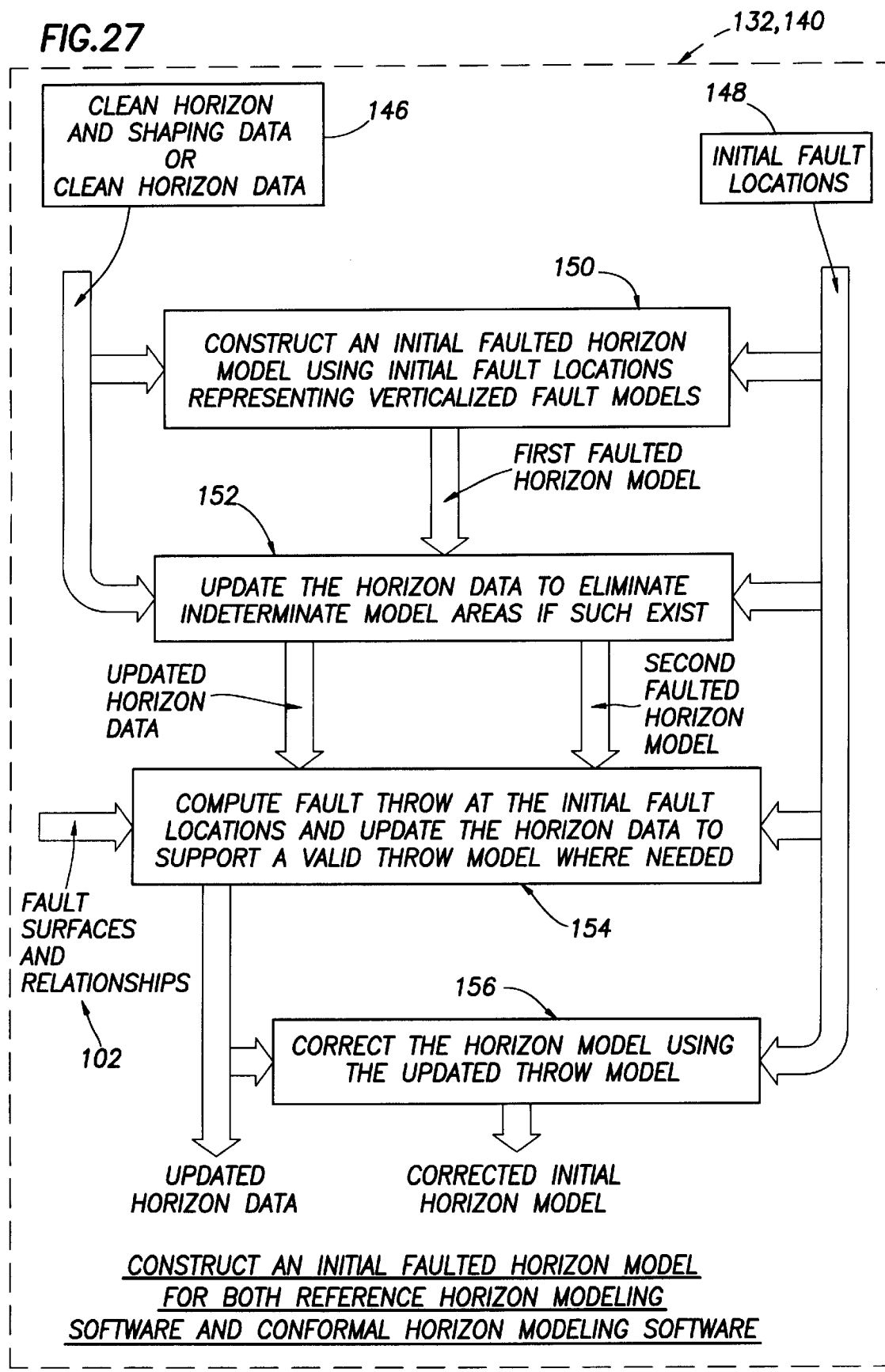
FIG. 27 illustrates a construction of the "construct an initial faulted horizon model" block of code in both the reference horizon modeling software of FIG. 23 and the conformal horizon modeling software of FIG. 25.
Figure 28:
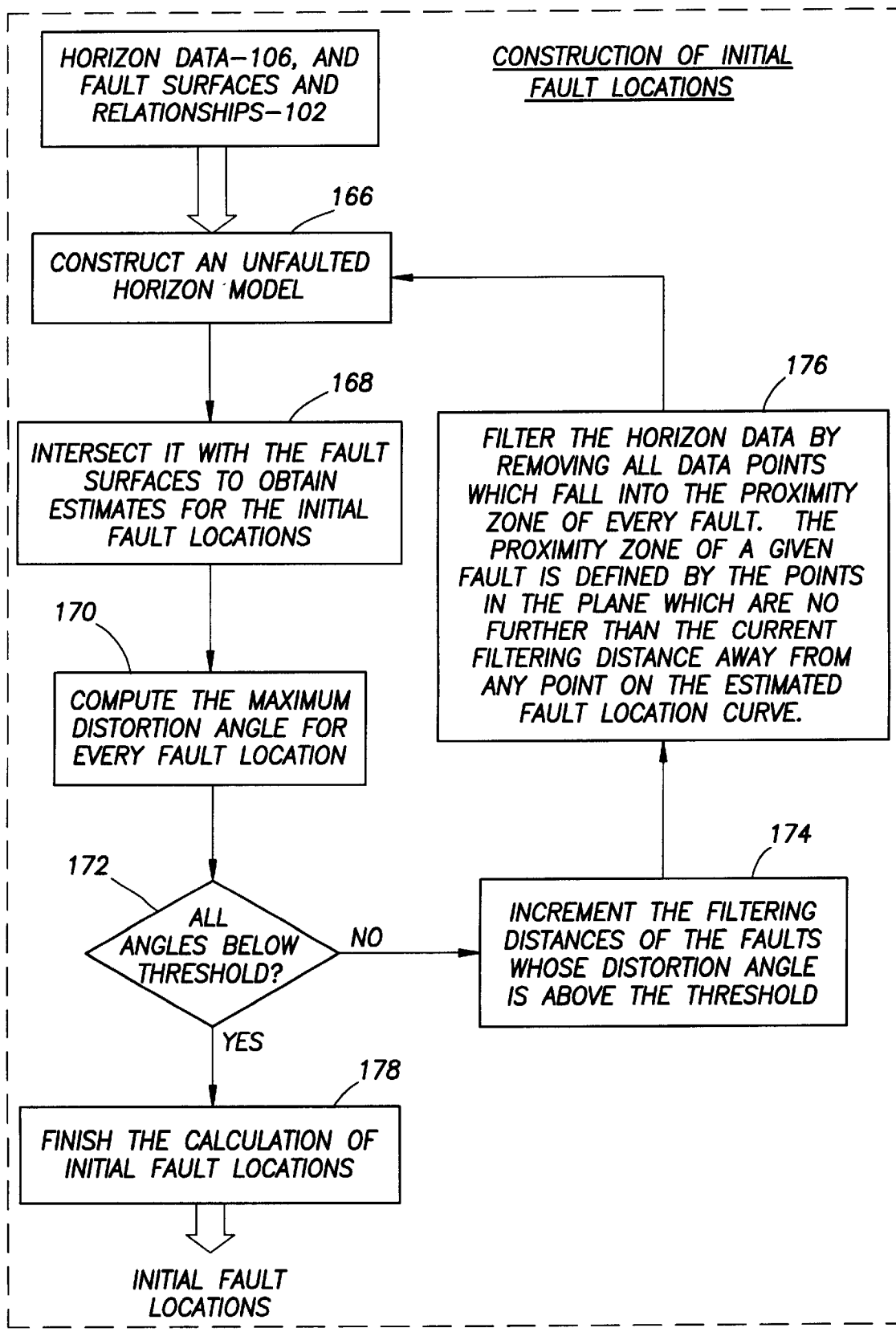
Figure 31:
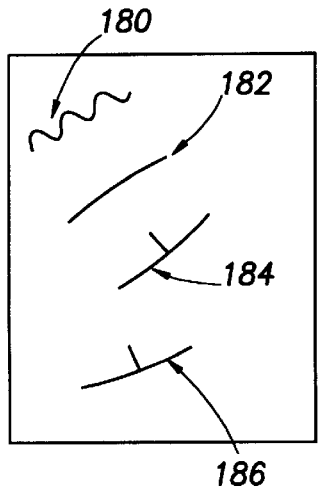
Figure 37:
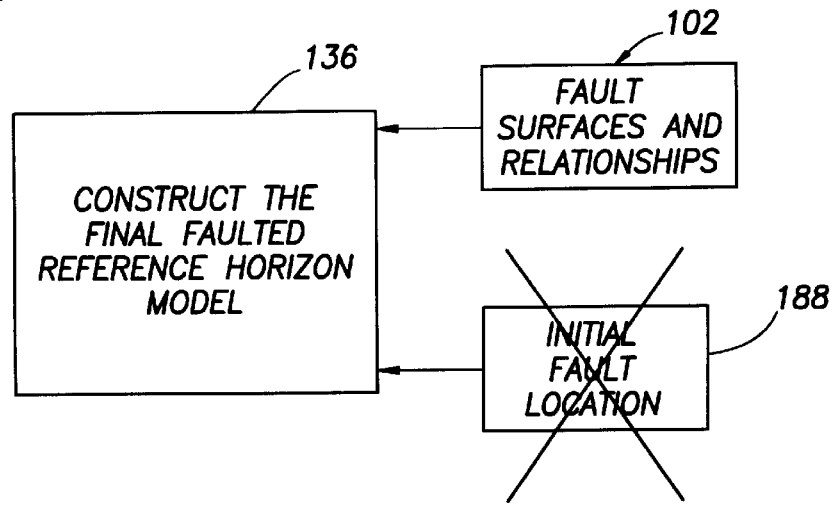
Figure 37A:
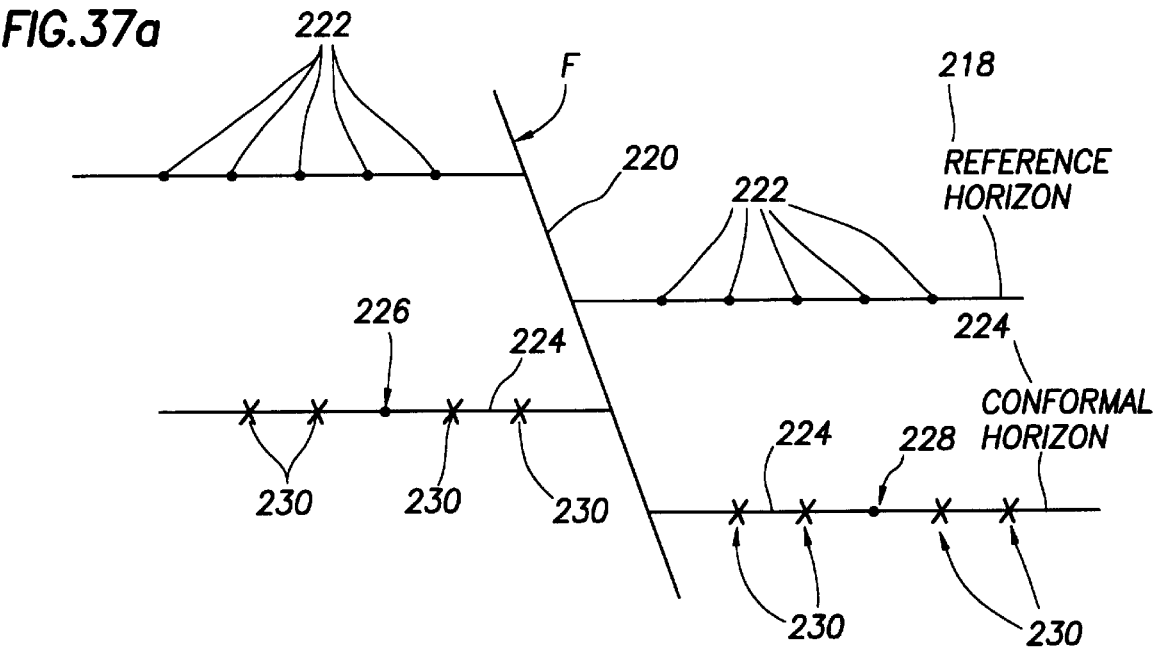
Figure 37B:
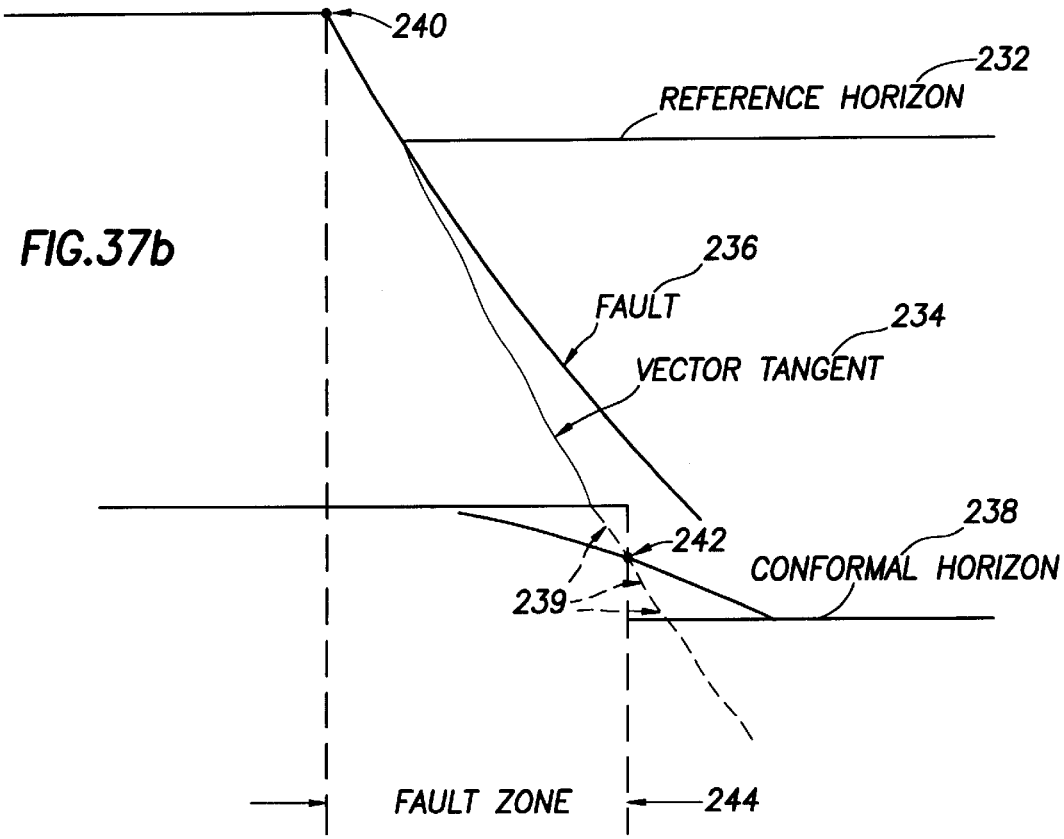
Figure 37C:
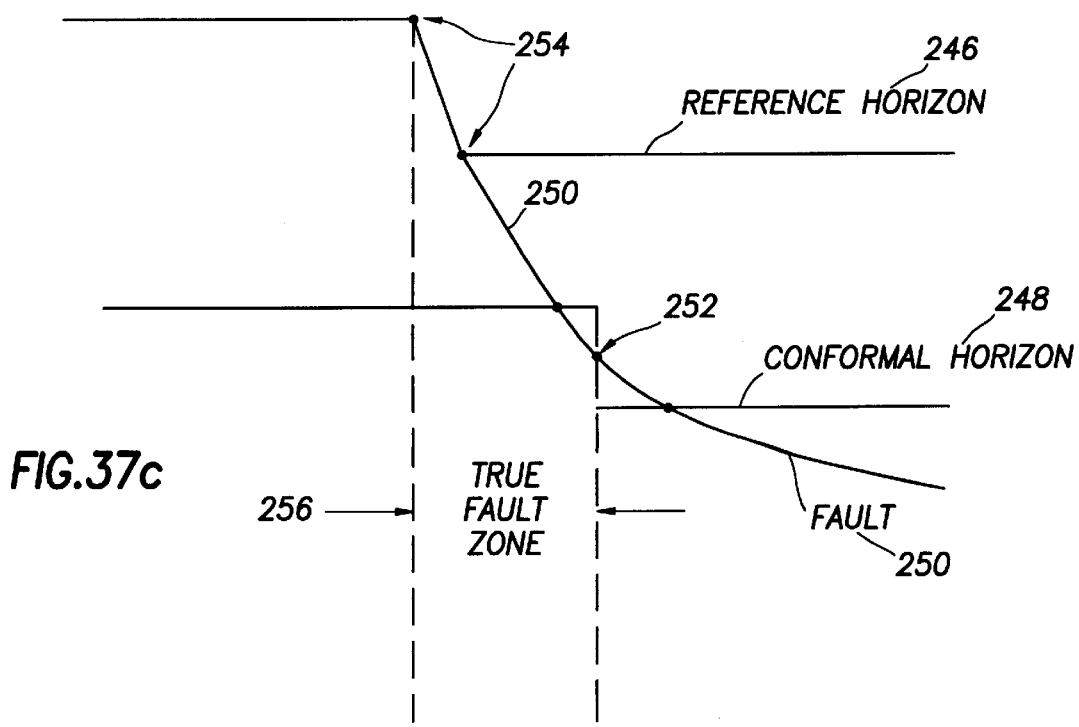
Figure 43:
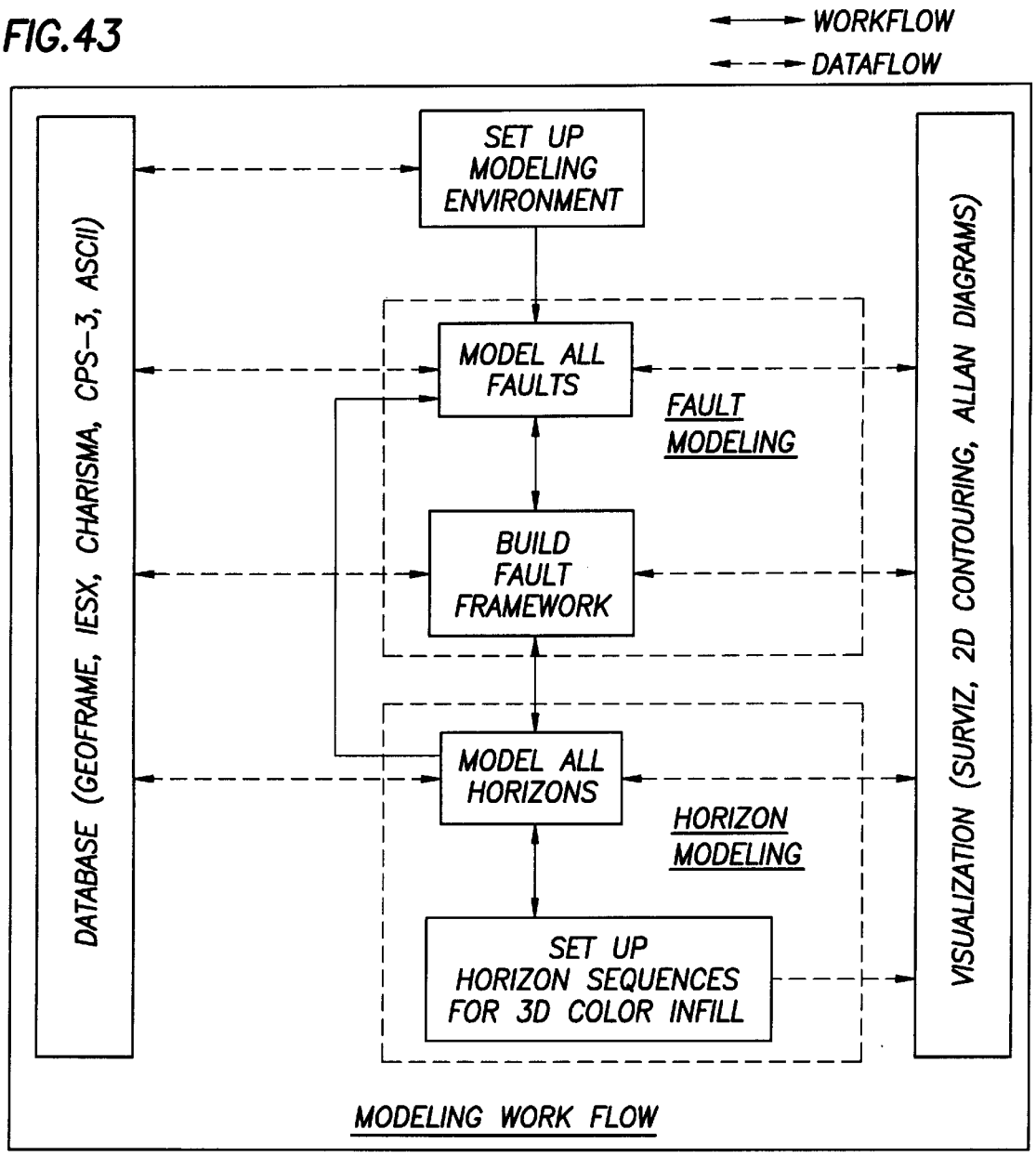
Figure 44:
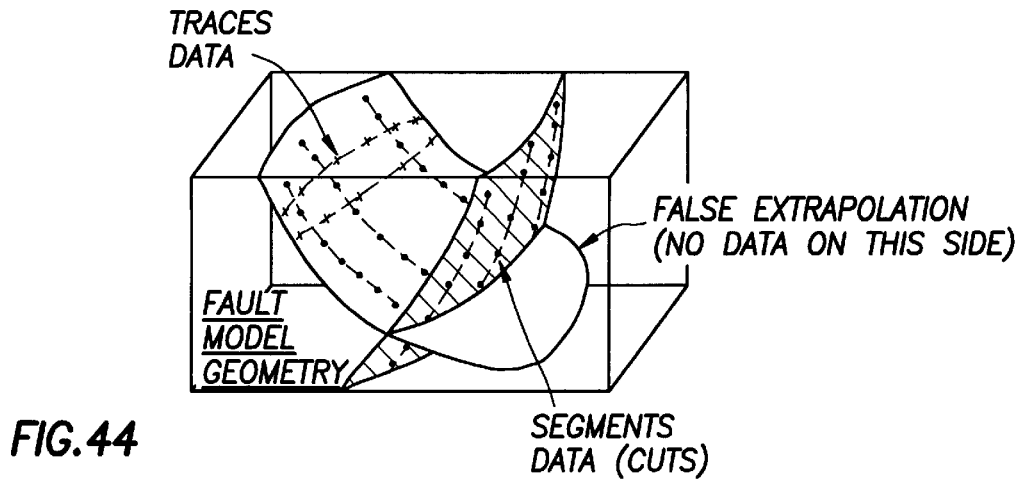
Figure 53:
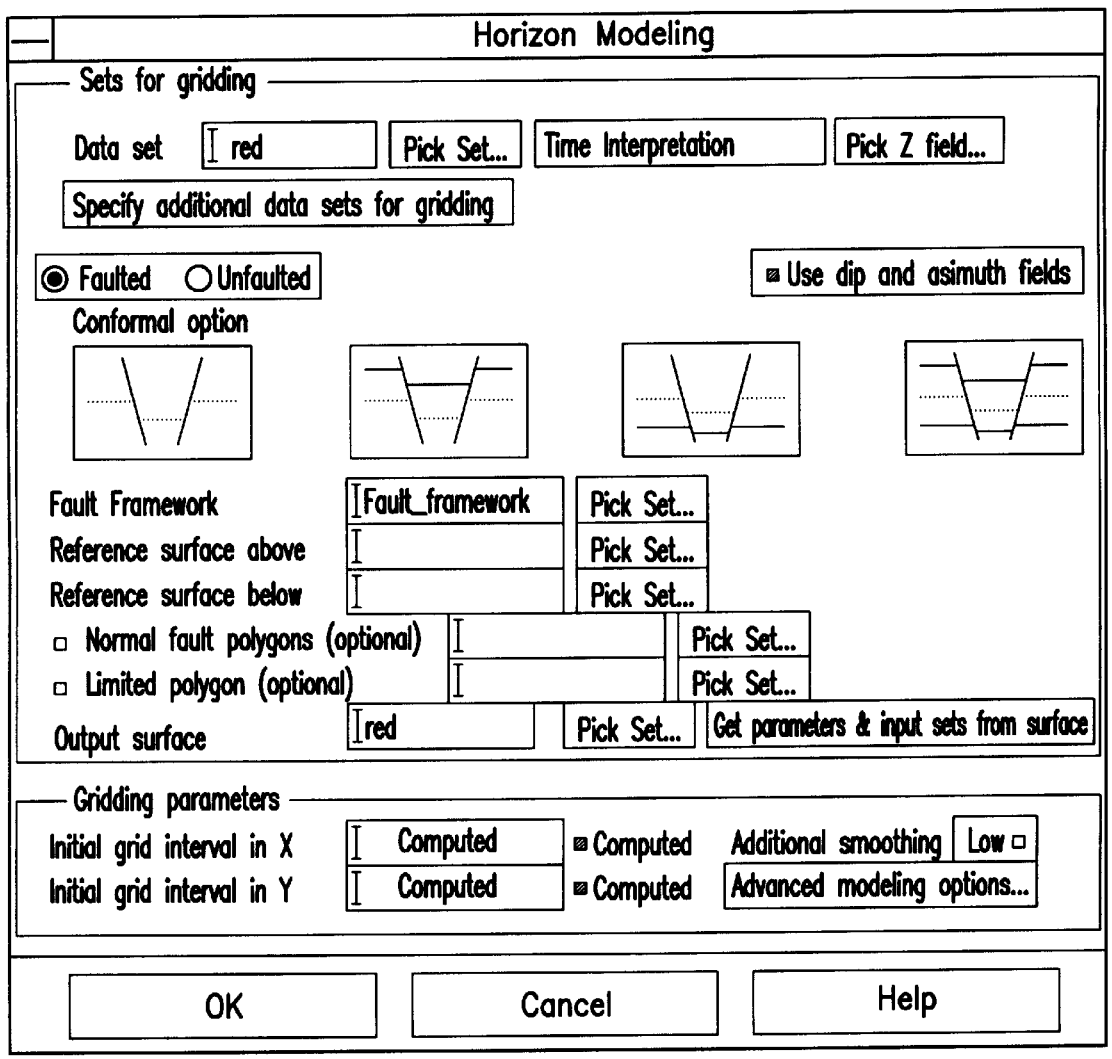

the "construction of initial fault locations" block of code in FIG. 24 associated with the "construct initial fault locations and cleanup the horizon data from wrong sided data points" block of code in FIG. 23 associated with the reference horizon modeling software of FIG. 21, and the "construct initial fault locations" portion of the code entitled "construct initial fault locations and cleanup the horizon data from wrong sided data points" block of code in FIG. 26 associated with the "construct initial fault locations and cleanup the horizon data from wrong sided data points and derive shaping data" block of code in FIG. 25 associated with the conformal horizon modeling software of FIG. 21;

FIGS. 29a through 37 illustrate the functions performed by the reference horizon modeling software and the conformal horizon modeling software of FIGS. 23–27 as well as the process steps of FIG. 28;

FIG. 37a illustrates the concepts associated with the function of the conformal horizon modeling software 110b;

FIG. 37b is presented for illustration of the concepts associated with the function of the following blocks of code in FIG. 26: blocks 138b and 138c;

FIG. 37c is presented for illustration of the concepts associated with the following block of code in FIG. 26: block 138e;

FIGS. 38 through 42 are provided for illustration during a discussion of the "fault throw" associated with the "compute fault throw . . . " block of code shown in FIG. 27;

FIG. 43 illustrates a modeling work flow;

FIG. 44 illustrates a fault geometry model;

FIG. 45 illustrates gridding faults;

FIG. 46 illustrates fault framework elements;

FIG. 47 illustrates building the fault framework;

FIG. 48 illustrates a cross section view of intersecting faults;

FIG. 49 illustrates inputs to horizon modeling;

FIG. 50 illustrates horizon trimming;

FIG. 51 illustrates a completed horizon model;

FIG. 52 illustrates a detail horizon model geometry;

FIG. 53 illustrates a horizon modeling dialog;

FIG. 54 illustrates horizon modeling modes of operation;

FIG. 55 illustrates advanced modeling options; and

FIG. 56 illustrates throw model correction.

DESCRIPTION OF THE PREFERRED EMBODIMENT

Figure 1:
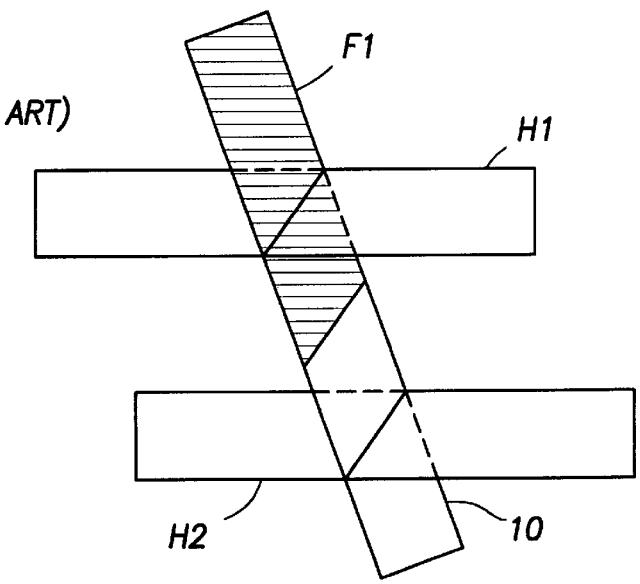
Figure 2:
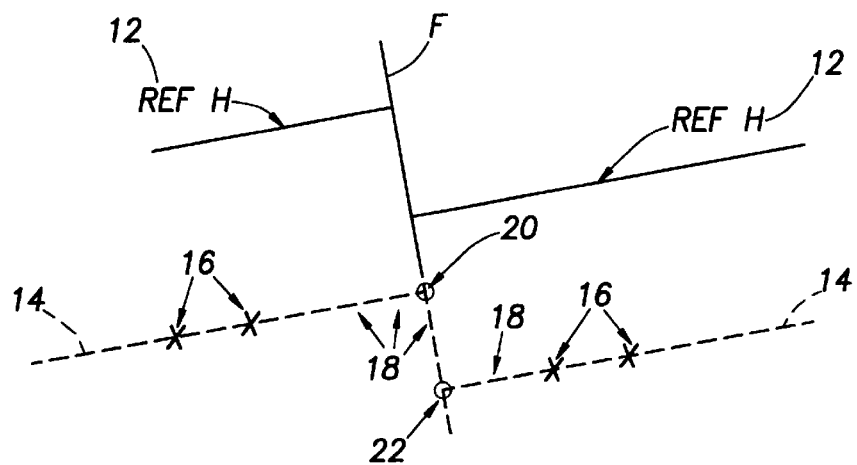
Figure 3:
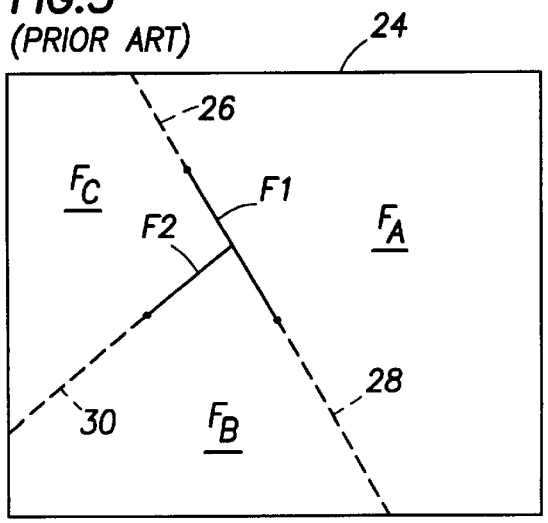

Referring to FIGS. 1 through 3, the problems or deficiencies associated with the prior art is illustrated.

In FIG. 1, in the prior art, a workstation did store software for the purpose of determining the intersection between a horizon and an intersecting fault. As a result, the operator at the workstation had to use a mouse to manually extend one section F1 of a fault 10 in order to determine the characteristics of the intersection between the particular fault 10 and horizons H1 and H2. This manual extension required for many faults meant that the workstation operator had to arduously perform a lot of work in order to determine the characteristics of the intersection between each horizon and each intersecting fault. On the other hand, the present invention is completely automated thereby eliminating all the aforementioned significant amount of work previously required by the operator.

In FIG. 2, assume that a reference horizon 12 is given and the prior art apparatus was required to determine the conformal horizon 14. A limited amount of shaping data 16 is given. No shaping data was given in the vicinity of the the fault "F", at 18. Given the reference horizon 12 and the limited shaping data 16, the operator sitting at a workstation using the prior art software was required to "manually" extend the conformal horizon 14, starting at the shaping data 16, until the conformal horizon 14 intersected the fault "F" at points 20, 22 thereby identifying the intersection points 20 and 22. The result of this action, performed manually, would produce the conformal horizon 14 from the reference horizon 12. On the other hand, the present invention is completely automated thereby eliminating all the aforementioned significant amount of work previously required by the operator.

In FIG. 3, the so-called "fault blocking" design philosophy, adopted by the prior art horizon modeling systems, is illustrated. In FIG. 3, a horizon 24 has been intersected by faults, and, as a result, a plurality of intersection lines "F1" and "F2" appear on the surface of the horizon 24. The prior art "design philosophy" required the operator at a workstation to extend the ends of each intersection line to the edge of the horizon thereby producing a plurality of "fault blocks". Therefore, in FIG. 3, when utilizing the prior "fault blocking" design philosophy, a first extension 26 connects one end of intersection line F1 to the edge of the horizon 24, a second extension 28 connects the other end of intersection line F1 to the edge of the horizon 24, and a third extension 30 connects the end of intersection line F2 to the edge of the horizon thereby producing three "fault blocks" on the horizon 24 of FIG. 3: a first fault block "Fa", a second fault block "Fb", and a third fault block "Fc". This "fault block" design philosophy, adopted by the prior art horizon modeling system, changes the entire nature of the design which was ultimately implemented by the prior art horizon modeling system. On the other hand, the horizon modeling system of the present invention does not adopt the "fault blocking" design philosophy, but in-fact, the horizon modeling system of the present invention utilizes the "non-artificially extended" design philosophy which is illustrated in greater detail in FIG. 4.

Figure 4:
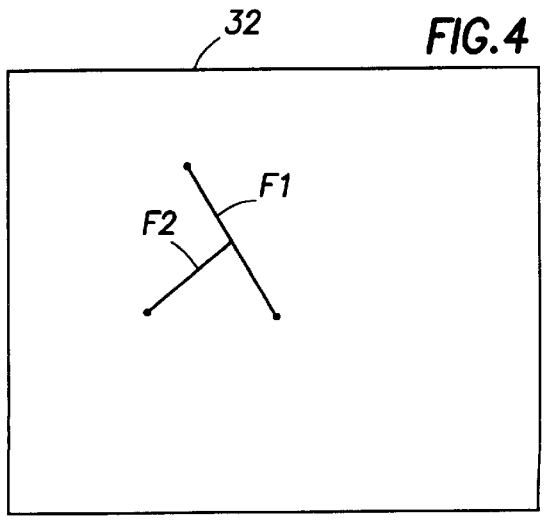
FIG. 4 illustrates the horizon modeling design philosophy adopted by the present invention wherein the fault blocking approach of FIG. 3 is not utilized, rather, the faults are allowed to die out in the modeling domain where it dies out in the physical domain.

Referring to FIG. 4, the design philosophy of the horizon modeling system of the present invention adopts the "non-artificially extended" philosophy. In FIG. 4, a horizon/fault intersection line "F1" is not extended to the edge of the horizon 32, and a horizon/fault intersection line "F2" is also not extended to the edge of the horizon 32. Therefore, the horizon/fault intersection lines "F1" and "F2" in FIG. 4 are "non-artificially" extended.

Figure 5:
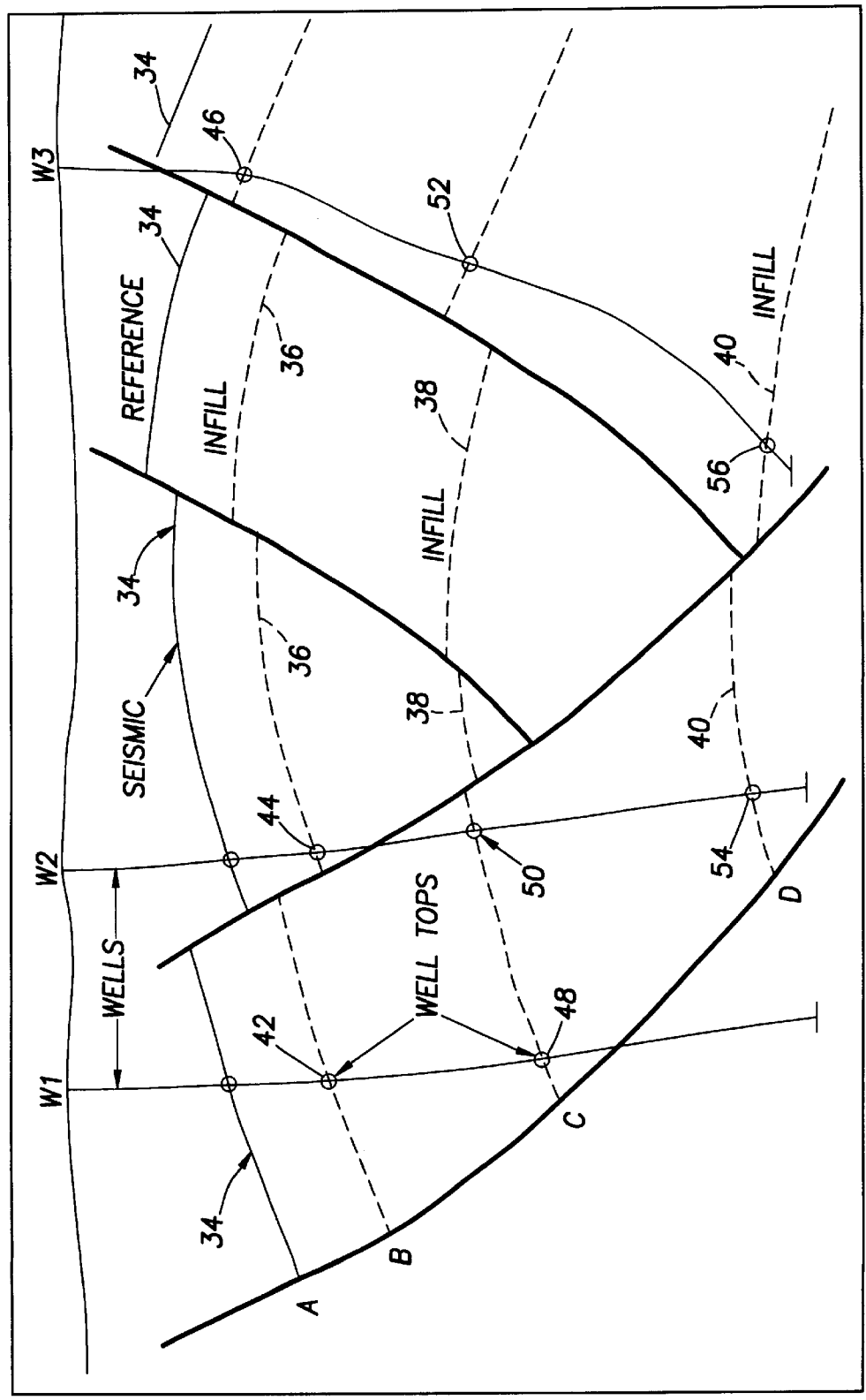
FIG. 5 illustrates the definition of a reference horizon and a conformal horizon and further illustrates how the conformal horizon is computed in response to a known reference horizon and one or two additional data points which are known to lie on the conformal horizon.

Referring to FIG. 5, a definition of a "reference" horizon and a "conformal" horizon is illustrated. In FIG. 5, a seismic "reference" horizon is given by numeral 34. The reference horizon 34 is one which is easily defined by a multitude input seismic data. Since input seismic data more than adequately defines the horizon 34 in FIG. 5, that horizon 34 is said to be a "reference" horizon 34. However, a "conformal" horizon would be one of the other horizons in FIG. 5. For example, horizon 36, 38, and 40 are "conformal" horizons because these horizons are not easily defined by the input seismic data. That is, there may be only a few input seismic data points [42, 44, 46], [48, 50, 52], and [54, 56] which define the "conformal" horizons 36, 38, 40. Therefore, in order to define each of the "conformal" horizons 36, 38, 40, in FIG. 5, the conformal horizons 36, 38, and 40 are extrapolated from and defined by the "reference" horizon 34 and the few input wellbore data points [42, 44, 46], [48, 50, 52], and [54, 56], respectively, which lie on each conformal horizon 36, 38, 40.

Figure 6:
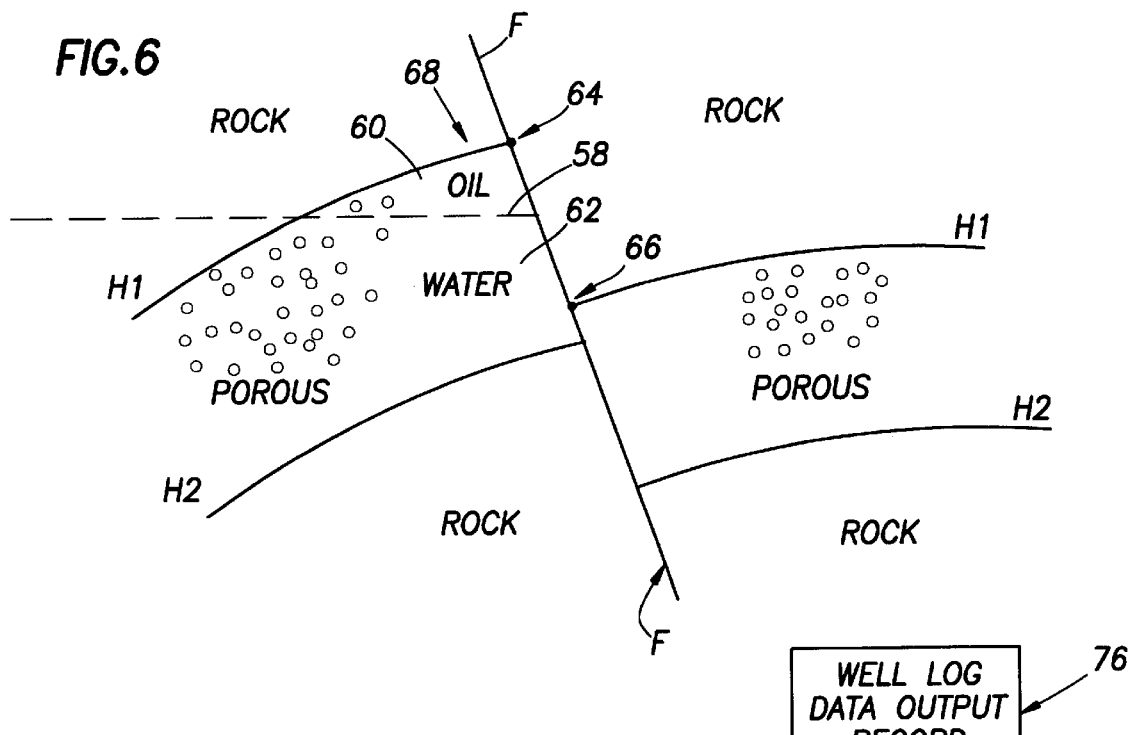
FIG. 6 illustrates how oil and water are known to be disposed near the intersection between a horizon and a fault in an earth formation.

Referring to FIG. 6, the ultimate purpose of the horizon modeling system of the present invention is to assist the geophysicist in the task of interpreting input well log and seismic data to define the precise location of underground deposits of hydrocarbons in an earth formation. For example, in FIG. 6, a fault "F" cuts through a first horizon H1 and a second horizon H2 in an earth formation. A line 58 represents a separation between oil 60 and water 62, the oil 60 and water 62 existing on one side of the fault "F". Rock and a porous material exist on the other side of fault "F". The fault "F" intersects the horizons H1 and H2 at two places, a first intersection 64 and a second intersection 66. From FIG. 6, it is evident that oil 60 usually exists near the intersections 64 and 66 between the fault "F" and the horizons H1 and H2. In order to extract the oil 60 from the earth formation, it is necessary to drill near the first intersection 64, at point 68.

However, in order to know the exact location of point 68, one must first know the locations and/or characteristics of the intersections 64 and 66 between the fault "F" and the horizons H1 and H2. In other words, one must know the exact characteristics and/or location of a "fault zone" which exists between the intersections 64, 66 in FIG. 6 where the fault "F" intersects the horizons H1 and H2. The horizon modeling system of the present invention will define the exact characteristics and/or location of each "fault zone" between a horizon and an intersecting fault in an earth formation.

Figure 7:
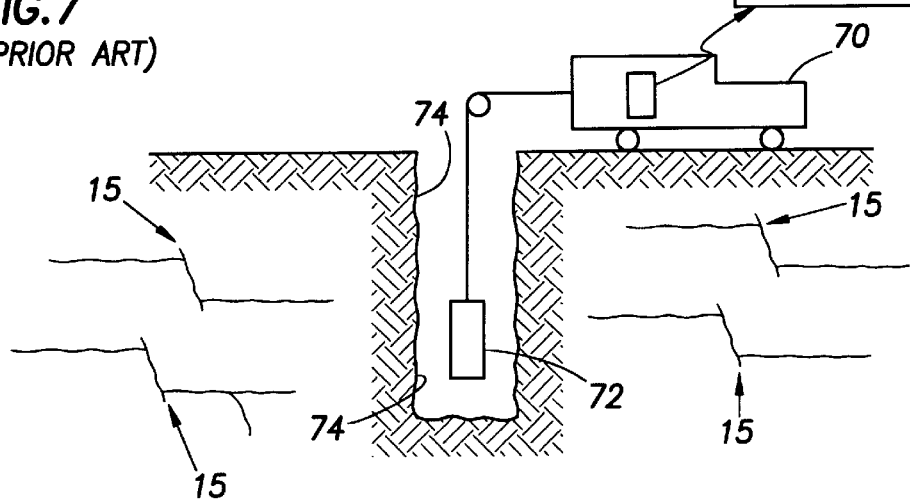
FIG. 7 illustrates how a well log data output record is generating during a logging operation of a fault ridden earth formation.
Figure 8:
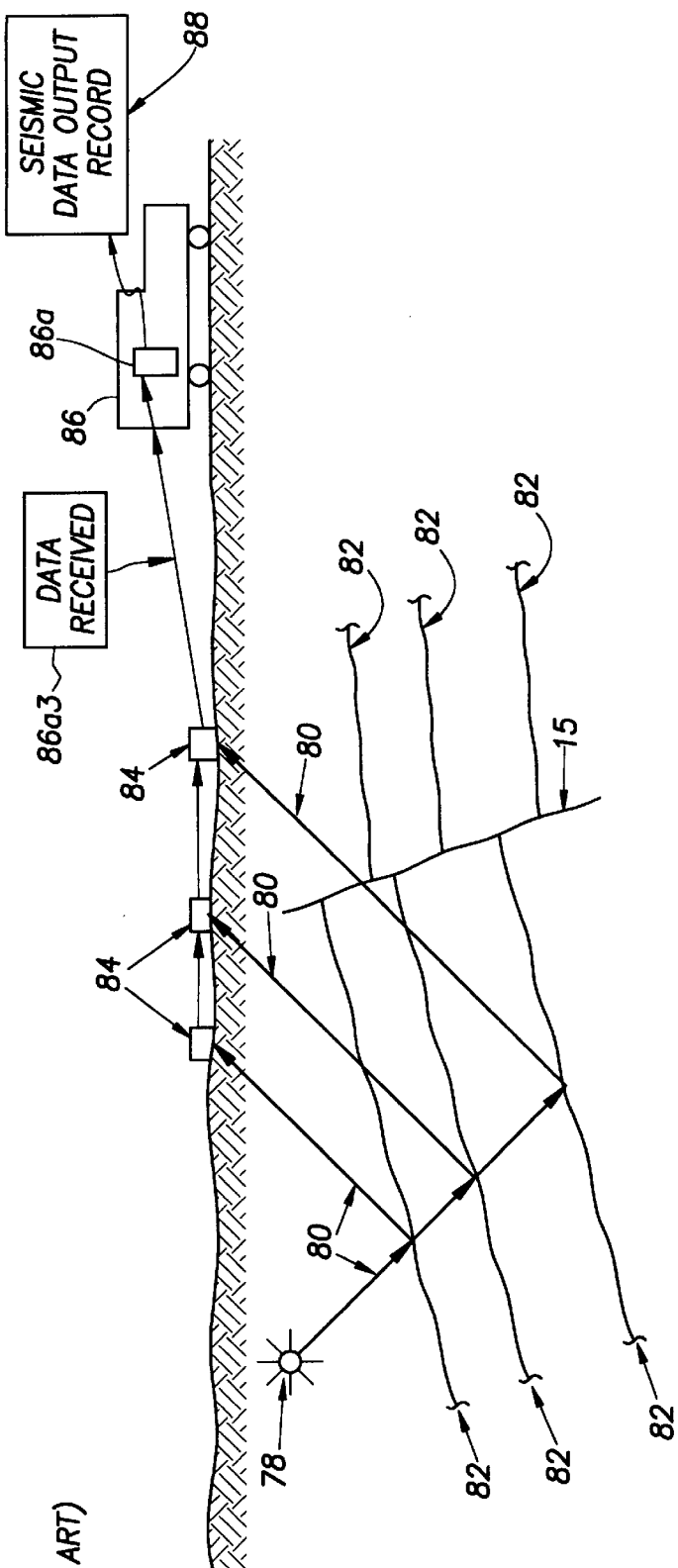
FIG. 8 illustrates how a seismic data output record is generated during a seismic operation of the fault ridden earth formation.

Referring to FIGS. 7 and 8, various types of input data, used by the horizon modeling system of the present invention, are derived from well logging operations and seismic operations performed in connection with a fault-ridden earth formation. For example, in FIG. 7, a well logging truck 70 lowers a logging tool 72 into a borehole 74 which penetrates an earth formation containing a multitude of faults 15. When the logging operation is completed, a well log data output record 76 is obtained. In FIG. 8, a source of energy 78 generates sound vibrations 80. These sound vibrations 80 will reflect off a horizon 82 in an earth formation containing a multitude of faults 15 and the sound vibrations 80 will be received in a plurality of receivers 84. Signals from the receivers 84 will be received in a computer 86a of a recording truck 86, and a seismic data output record 88 will be generated. The seismic data output record 88 and the well log data output record 76 will provide the input data to the horizon modeling system of the present invention.

Figure 11:
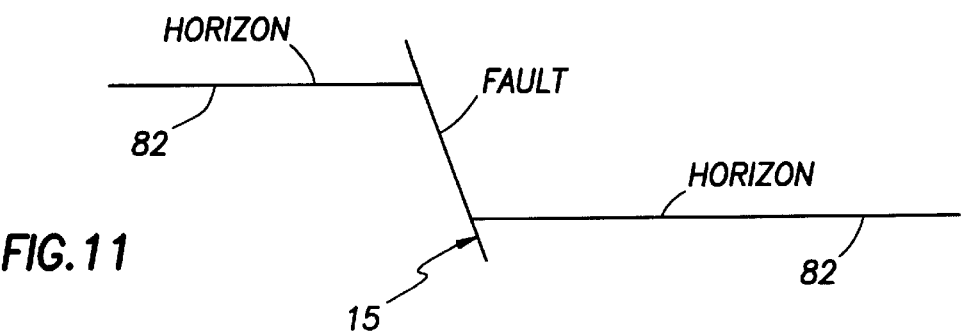
FIGS. 9–11 illustrate the physical characteristics of an intersection between a fault and a horizon associated with each of the faults which intersect a particular horizon in the fault ridden earth formation of FIGS. 7 and 8.
Figure 10:
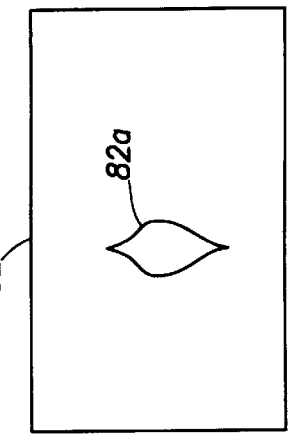
Figure 9:
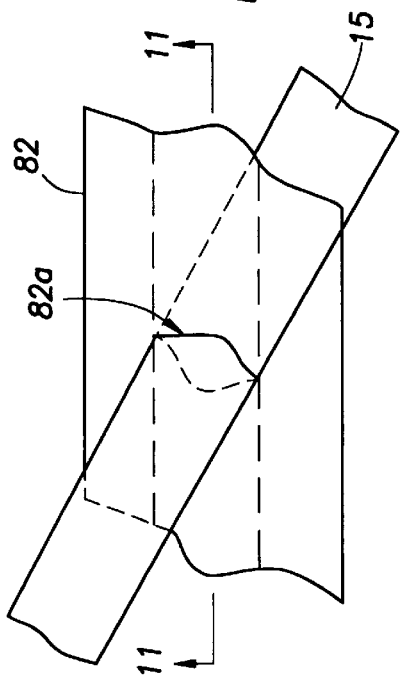

Referring to FIGS. 9 through 11, the characteristics of the intersection between the horizons 82 of FIG. 8 and the fault 15, when such horizons 82 are cut through and intersected by one or more of the faults 15, is illustrated.

In FIG. 9, the intersection between the fault 15 and the horizon 82 is called a "fault zone". In FIG. 9, the fault zone is denoted by numeral 82a. Note that the fault zone 82a is an opening that is created in the horizon 82 when the fault 15 passes through the horizon 82. Note the shape of the fault zone 82a in FIG. 9, the left side of which is raised upwardly, and the right side of which is lowered downwardly.

In FIG. 10, a top view of the horizon 82 of FIG. 9, having the fault zone 82a, is illustrated.

In FIG. 11, a side view of the horizon 82 and intersecting fault 15 of FIG. 9, taken along section lines 11—11 of FIG. 9, is illustrated. Note that the right side of the horizon 82 in FIG. 11 is disposed below the left side of the horizon 82 due to the intersecting fault 15 passing through the horizon 82. The fault zone 82a is shown in several locations on the map of a particular horizon illustrated in FIG. 20, that particular horizon of FIG. 20 being one of the plurality of horizons shown in the final faulted horizon model of FIG. 19.

Figure 12:
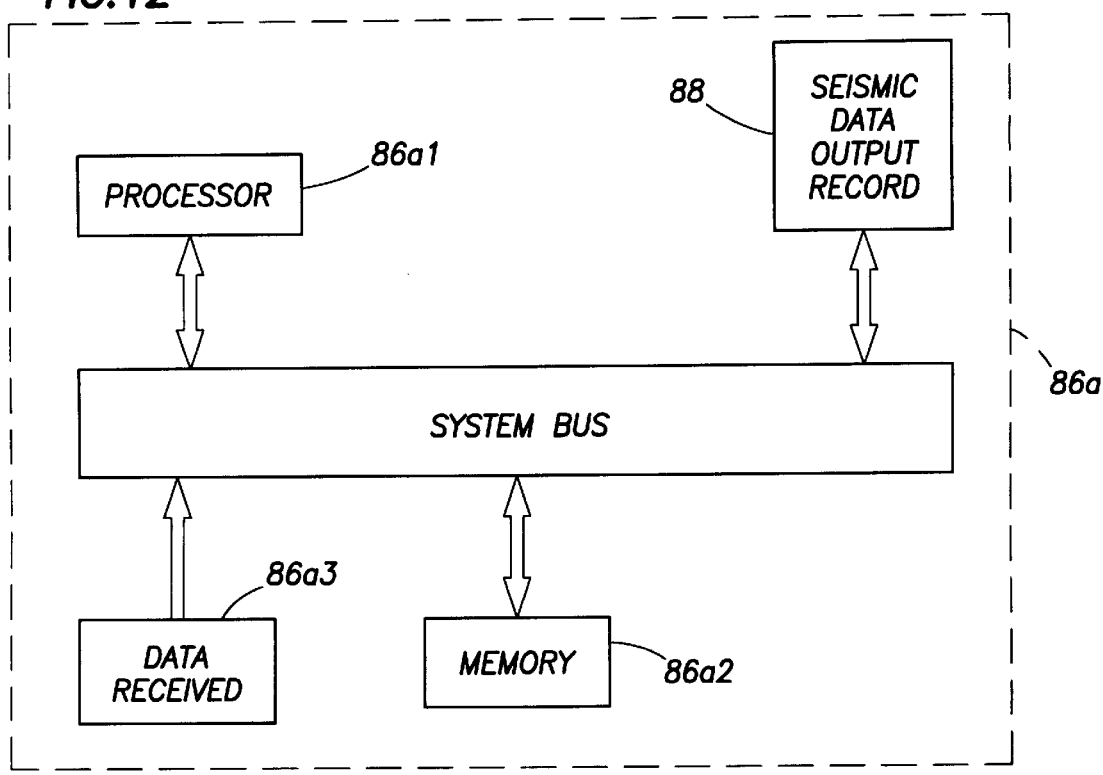
FIGS. 12–13 illustrate how the seismic data in the seismic data output record of FIG. 8 is data-reduced to produce a reduced data output record medium.

Referring to FIG. 12, the recording truck computer 86a of FIG. 8 is illustrated. The recording truck computer 86a receives the "data received" 86a3 of FIG. 8 and, in response thereto, the recording truck computer processor 86a1 will generate a "seismic data output record" 88 which is also illustrated in FIG. 8.

Figure 13:
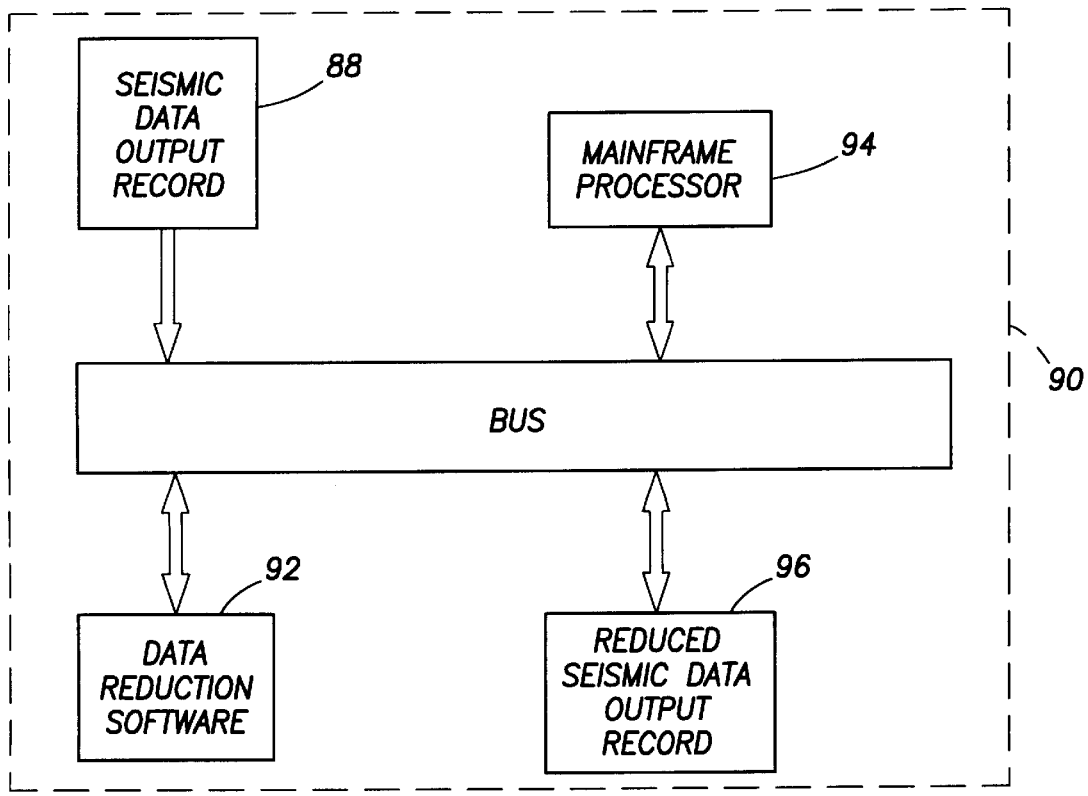

Referring to FIG. 13, the seismic data output record 88 of FIG. 12 is now input to a mainframe computer 90. The mainframe computer 90 memory stores a "data reduction software" 92; when the data reduction software 92 is executed by the mainframe processor 94, the data present in the seismic data output record 88 is reduced and, as a result, the mainframe computer processor 94 generates a "reduced seismic data output record" 96. The data reduction software 92 can be found in a book entitled "Seismic Velocity Analysis and the Convolutional Model", by Enders A. Robinson, the disclosure of which is incorporated by reference into this specification.

Referring to FIGS. 14, 15, and 16, in FIG. 14, the reduced seismic data output record 96 is now input to a workstation 98 which stores a software package in a memory 100, and that software package includes two parts: "creating a grid based surface model of each fault" 100a and "establishing geologic consistency between intersecting faults" 100b. A display 102 is generated when the processor 104 executes the software package 100a, 100b. In FIG. 15, the content of the "reduced seismic data output record" 96 of FIG. 14 is illustrated, said content being comprised of a multitude of faults, at least some of the pairs of faults having the form illustrated in FIG. 15. In FIG. 16, the display 102 of FIG. 14 will generate a major fault 102a and a minor fault 102b truncated below the major fault 102a. The results produced on the display 102 of FIG. 16 will hereinafter be referred to as "fault surfaces and relationships 102". The system of FIGS. 14, 15, and 16, which produces the "fault surfaces and relationships" of FIG. 16, is fully described and set forth in prior pending application Ser. No. 08/823,107, filed Mar. 24, 1997, entitled "Method and Apparatus for Determining Geologic Relationships for Intersecting Faults", the disclosure of which is incorporated by reference into this specification.

Referring to FIG. 17, the "well log data output record" 76 of FIG. 7 and the "reduced seismic data output record" 96 of FIG. 13, when combined, will produce a "reference horizon surface" 106 which is comprised of and defined by a multitude of "horizon data" 106.

Referring to FIG. 18, the "reference horizon surface" 106 (which is defined by the multitude of "horizon data") of FIG. 17 and the "fault surfaces and relationships" 102 of FIG. 16 is now input to another workstation 108. That workstation 108 has a memory 110 which is adapted to store a horizon modeling software 110 in accordance with the present invention. The workstation 108 includes a processor 112 and a recorder or display 114. When the processor 112 of workstation 108 of FIG. 18 executes the horizon modeling software 110 of the present invention, a "final faulted horizon model" 116, in accordance with the present invention, is generated. The horizon modeling software 110 is initially stored on a storage medium, such as a CD-Rom 115. That CD-Rom 115 is adapted to be inserted into the workstation 108 of FIG. 18, and the horizon modeling software 110 stored on the CD-Rom 115 is loaded into the workstation 108 and stored in the memory 110 of that workstation 108. The workstation 108 could comprise, for example, a Silicon Graphics Indigo2 workstation. The software programs stored in the memory 110 can be written in C programming language under the Unix and Motif standards. The horizon modeling software 110 program can be recompiled and run on Sun workstations in conjunction with other CPS-3 products listed below, which are available from GeoQuest, a division of Schlumberger Technology Corporation, Houston, Tex. In addition to the Unix workstation operating environment, the minimum CPS-3 Mapping and Modeling software required to run the horizon modeling software 110 is as follows (such CPS-3 Mapping and Modeling software being available from GeoQuest, a division of Schlumberger Technology Corporation, Houston, Tex.): (1) CPS-3 Main Module runtime license; (2) SurfViz Visualization software; and (3) IESX Seis3DV, Part No. UA3D1-QD1.

Figure 19:
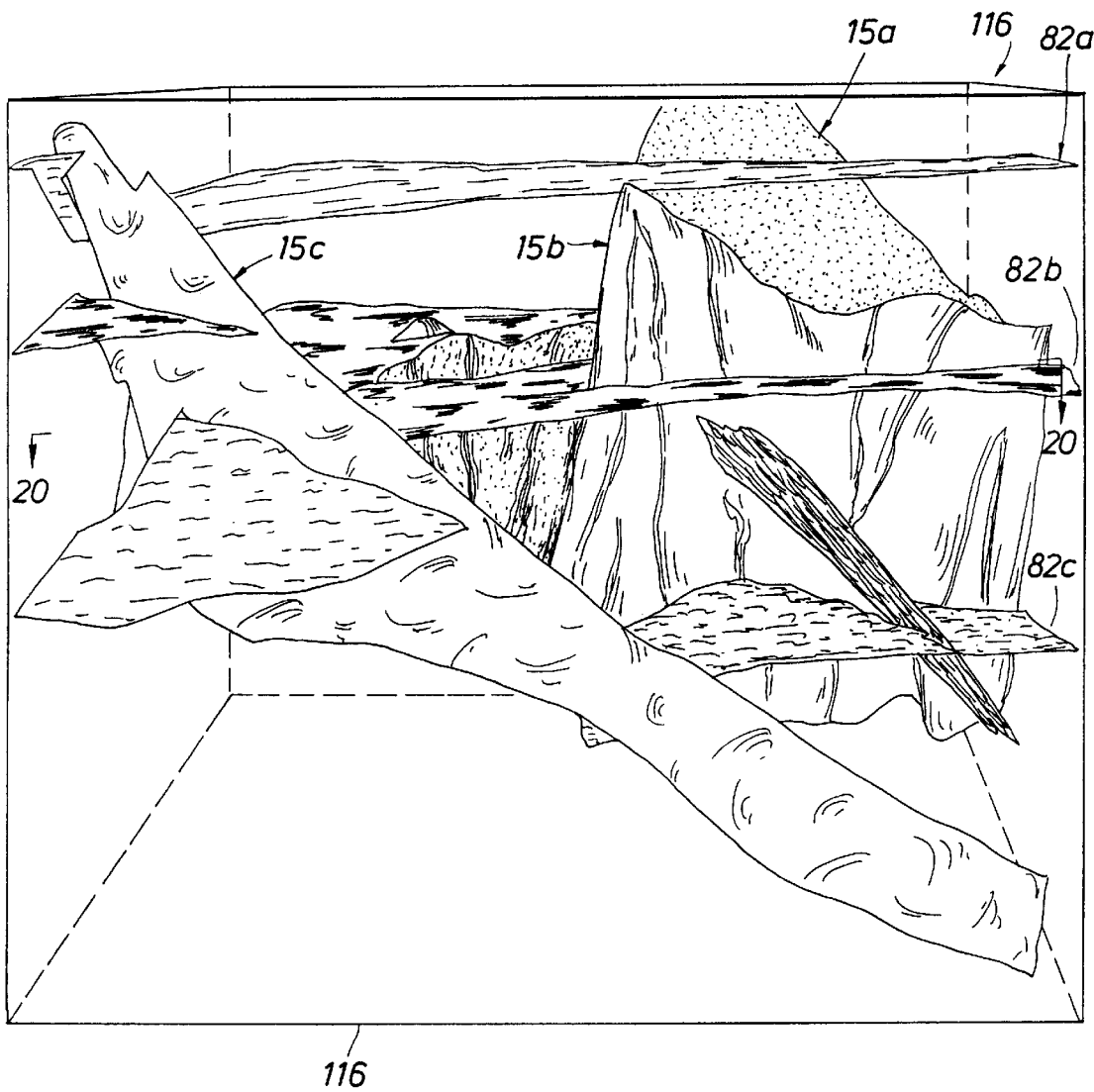
FIG. 19 illustrates one example of a "final faulted horizon model" in accordance with the present invention which includes the reference horizon and all the conformal horizons in addition to all the faults in a fault ridden earth formation.
Figure 20:
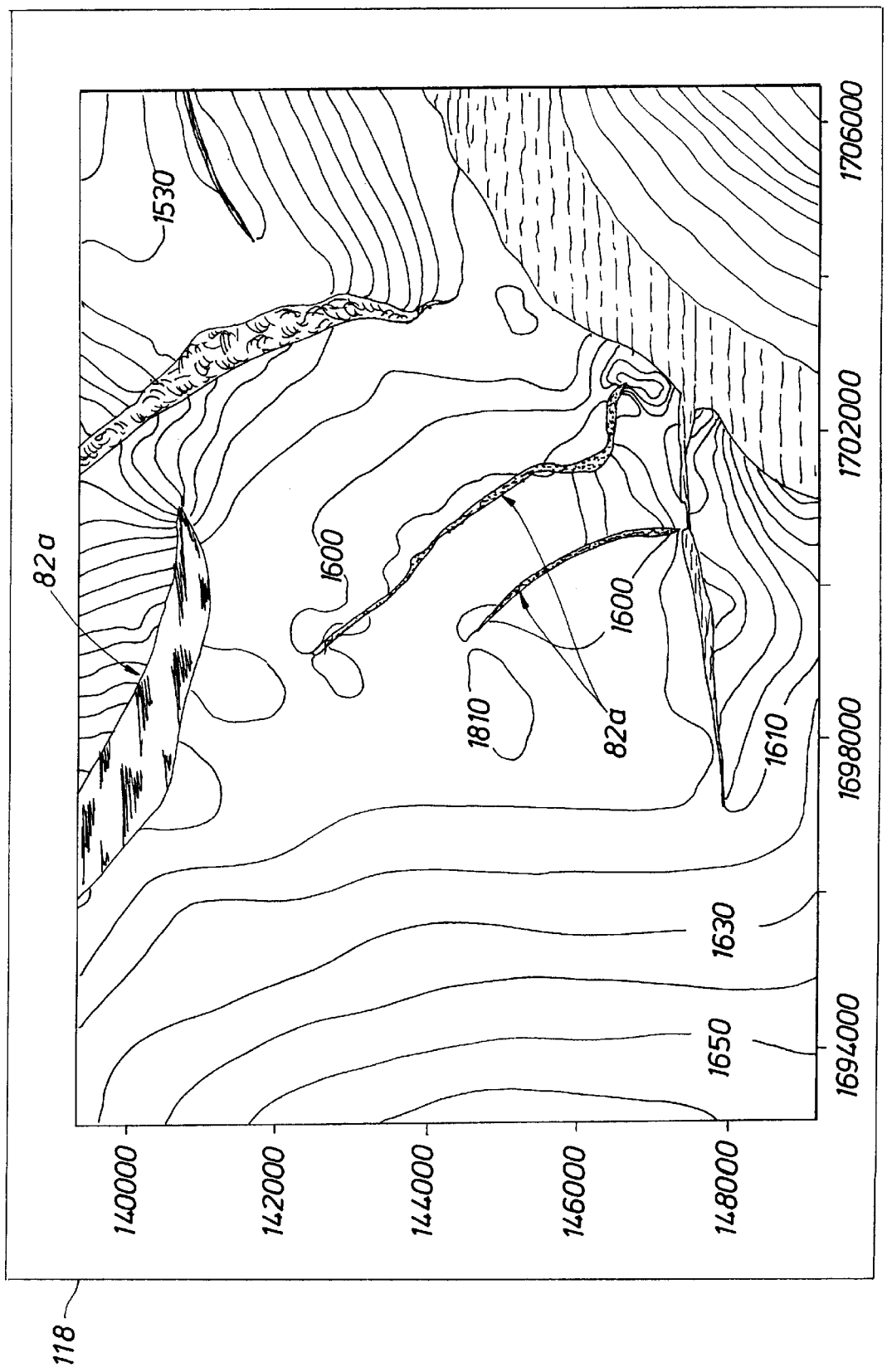
FIG. 20 illustrates a map of one of the horizons in the "final faulted horizon model" of FIG. 19.

Referring to FIGS. 19 and 20, in FIG. 19, an example of a "final faulted horizon model" 116 is illustrated. The final faulted horizon model 116 of FIG. 19 is a three dimensional representation of a section of the earth formation that is illustrated in FIGS. 7 and 8 (where the earth formation of FIGS. 7 and 8 is comprised of a multitude of horizons intersected by a plurality of faults). For example, in FIG. 7, an earth formation having a plurality of horizons are intersected by a plurality of faults 15, and in FIG. 8, a plurality of horizons 82 are intersected by one of the plurality of faults 15. In FIG. 19, the final faulted horizon model 116 (in accordance with the present invention) is a 3-D view of the earth formation of FIGS. 7 and 8 showing a plurality of horizons 82a, 82b, and 82c which are intersected by a plurality of faults 15a, 15b, and 15c. In FIG. 20, a "map" 118 of one of the horizons 82a, 82b, 82c of FIG. 19 is illustrated, the term "map" 118 being defined as being a top view of one of the horizons 82a, 82b, 82c in FIG. 19. For example, a "map" 118 (e.g., the map 118 shown in FIG. 20) can show and represent (for example) a top view of horizon 82b in FIG. 19, the top view of horizon 82b being viewed downwardly in FIG. 19 along section lines 20—20 of FIG. 19. In FIG. 20, note the fault zones 82a similar to the fault zones 82a shown in FIGS. 9 and 10.

Referring to FIG. 21, a more detailed construction of the horizon modeling software 110 of FIG. 18 is illustrated. In FIG. 21, the horizon modeling software 110 includes a reference horizon modeling software 110a and a conformal horizon modeling software 110b which is responsive to the results produced by the reference horizon modeling software 110a.

Figure 22:
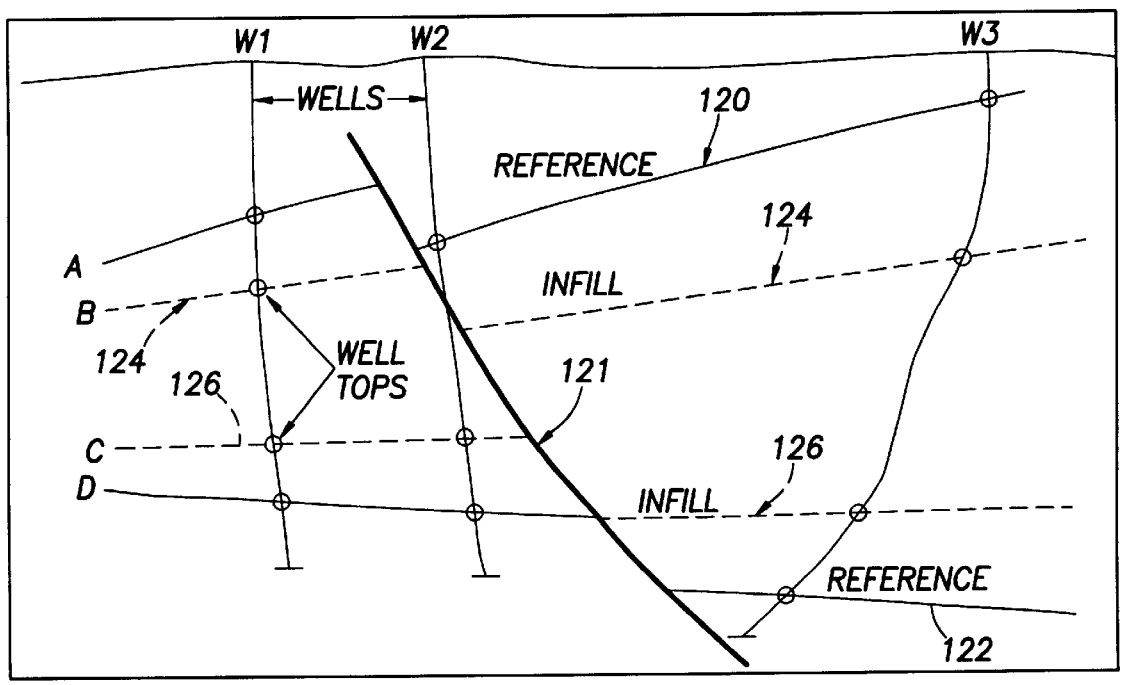
FIG. 22 illustrates the reference horizon constructed by the reference horizon modeling software of FIG. 21 and the conformal horizons constructed by the conformal horizon modeling software of FIG. 21.

Referring to FIG. 22, a definition of a "reference" horizon and a "conformal" horizon is provided. In FIG. 22, a pair of "reference" horizons 120, 122 and a pair of "conformal" horizons 124, 126 are illustrated. A "reference" horizon is one for which plenty of original points/data are available (from the horizon data 106 and the fault surfaces and relationships 102 of FIG. 18) for defining the reference horizon. However, for a "conformal" horizon, only a few original points define the conformal horizon; therefore, the conformal horizon must be derived from a combination of the few original points that define the conformal horizon and the reference horizon itself. In FIG. 22, plenty of points/data are available for defining the reference horizons 120, 122; however, the conformal horizons 124, 126 include only a few original points; therefore, the conformal horizons 124, 126 must be derived from the few original points while using the reference horizons 120, 122 as a guide or a "frame of reference".

Referring to FIGS. 23 through 27, recalling that the design philosophy of the horizon modeling system of the present invention includes and adopts the "non-artificially extended" design philosophy of FIG. 4, a detailed construction of the reference horizon modeling software 110a and the conformal horizon modeling software 110b of the horizon modeling software 110 of FIG. 21 of the present invention is illustrated.

In FIG. 23, a construction of the reference horizon modeling software 110a of FIG. 21 is illustrated. The reference horizon modeling software 110a of FIG. 23 includes four blocks of code:

1. A first block of code 130 having the following function: to "construct reference initial fault locations and clean up the horizon data from wrong sided data points". This first block of code 130 receives the aforementioned horizon data 106 and the fault surfaces and relationships data 102 and, responsive thereto, it generates a set of "clean horizon data" and a set of "initial fault locations".

2. A second block of code 132 having the following function: to "construct an initial faulted reference horizon model". This second block of code 132 receives the "clean horizon data", the "initial fault locations", and the fault surfaces and relationships 102 and, responsive thereto, it generates an "initial faulted reference horizon".

3. A third block of code 134 having the following function: to "construct the reference final fault locations". This third block of code 134 receives the "initial faulted horizon" from the second block of code 132 and the "initial fault locations" and the "fault surfaces and relationships" 102 and, responsive thereto, it generates the "final fault locations".

4. A fourth block of code 136 having the following function: to "construct the final faulted reference horizon model". This fourth block of code 136 receives the "final fault locations" from the third block of code 134 and the "clean orizon data" and the "fault surfaces and relationships" 102 (but not the "initial fault locations") and, responsive thereto, it generates the "final faulted reference horizon model". The "final faulted reference horizon model" which is output from the fourth block of code 136 is then input to the conformal horizon modeling software 110b of FIG. 25. The "final faulted reference horizon model" (output from the fourth block of code 136 of FIG. 23) represents only that portion of "final faulted horizon model" 116 of FIG. 19 which includes the "reference" horizon.

In FIG. 25, a construction of the conformal horizon modeling software 110b of FIG. 21 is illustrated. The conformal horizon modeling software 110b of FIG. 25 includes four blocks of code:

1. A fifth block of code 138 having the following function: to "construct conformal initial fault locations and clean up the horizon data from wrong sided data points and derive shaping data". This fifth block of code 138 receives the "final faulted reference horizon model" from the reference horizon modeling software 110a of FIG. 23 and the horizon data 106 and the fault surfaces and relationships 102 and, responsive thereto, it generates "clean horizon shaping data" and "initial fault locations".

2. A sixth block of code 140 having the following function: to "construct an initial faulted conformal horizon model". This sixth block of code 140 receives the "clean horizon shaping data" and the "initial fault locations" and the "fault surfaces and relationships" 102 and, responsive thereto, it generates an "initial faulted conformal horizon".

3. A seventh block of code 142 having the following function: to "construct the conformal final fault locations". This seventh block of code 142 receives the "initial faulted conformal horizon" from the sixth block of code 140 and the "initial fault locations" and the "fault surfaces and relationships" 102 and, responsive thereto, it generates the "final fault locations" (for the conformal horizon).

4. An eighth block of code 144 having the following function: to "construct the final faulted conformal horizon model". This eighth block of code 144 receives the "final fault locations" (for the conformal horizon) and the "clean horizon shaping data" and the "fault surfaces and relationships" 102 (but not the "initial fault locations") and, responsive thereto, it generates the "final faulted horizon model" 116 of FIG. 19 in accordance with the present invention (which includes the "final faulted conformal horizon model" which is defined to be that portion of the "final faulted horizon model" 116 of FIG. 19 which includes the "conformal" horizon).

In FIG. 24, recalling that the reference horizon modeling software 110a of FIG. 23 includes the first block of code 130 whose function it is to "construct reference initial fault locations and cleanup the horizon data from wrong sided data points", a detailed construction of that first block of code 130 is illustrated in FIG. 24. In FIG. 24, the first block of code 130 includes: (1) a first sub-block 130a which: receives the horizon data 106 and the fault surfaces and relationships 102 data, functions for the "construction of reference initial fault locations", and generates "initial fault locations" for the reference horizon, and (2) a second sub-block 130b which receives the horizon data 106 and the "initial fault locations" from the first sub-block 130a, functions to "clean up reference horizon data from wrong sided data points", and generates "clean horizon data" for the reference horizon.

In FIG. 26, recalling that the conformal horizon modeling software 110b of FIG. 25 includes the fifth block of code 138 whose function it is to "construct conformal initial fault locations and cleanup the horizon data from wrong sided data points and derive shaping data", a detailed construction of that fifth block of code 138 is illustrated in FIG. 26. In FIG. 26, the fifth block of code 138 includes: (1) a first sub-block 138a which receives horizon data 106 and the "final faulted reference horizon model" from the reference horizon modeling software 110a, functions to "derive preliminary shaping data", and it generates "preliminary shaping data", (2) a second sub-block 138b which receives the "preliminary shaping data" and the "final faulted reference horizon model" and the fault surfaces and relationships 102, functions to "project the reference initial fault locations along the fault surfaces", and it generates "projected reference initial fault locations", (3) a third sub-block 138c which receives the "preliminary shaping data" and the "projected reference initial fault locations" and the "final faulted reference horizon model", functions to "blank the shaping data in the fault zones defined by projected reference initial fault locations and the corresponding pairs reference final fault locations", and it generates "blanked shaping data", (4) a fourth sub-block 138d which receives the "blanked shaping data" and the horizon data 106 and the fault surfaces and relationships data 102, functions to "construct the conformal initial fault locations and clean up horizon shaping data from wrong sided data points", and it generates "initial fault locations" for the conformal (as opposed to the reference) horizon, and (5) a fifth sub-block 138e which receives the "initial fault locations" for the conformal horizon and the "final faulted reference horizon model" from the reference horizon modeling software 110a, functions to "blank the shaping data in the true fault zones defined by the initial fault location (for the conformal horizon) and the corresponding pairs of reference final fault locations", and it generates "clean horizon and shaping data" for the conformal horizon.

In FIG. 27, recalling that the reference horizon modeling software 110a of FIG. 23 includes a second block of code 132 ("construct an initial faulted reference horizon model") and that the conformal horizon modeling software 110b of FIG. 25 includes a sixth block of code 140 ("construct an initial faulted conformal horizon model"), a detailed construction of both the second block of code 132 for the reference horizon modeling software 110a and the sixth block of code 140 for the conformal horizon modeling software 110b (for constructing an initial faulted horizon model for both the reference horizon modeling software 110a and the conformal horizon modeling software 110b) is illustrated in FIG. 27. In FIG. 27, the second block of code 132 and the sixth block of code 140 each comprise the following:

(1) a first sub-block 150 which: receives two inputs (a) a first input 146 which includes the "clean horizon data" (for the reference horizon modeling software 10a) or the "clean horizon and shaping data" (for the conformal horizon modeling software 110b) and (b) a second input 148 which includes the "initial fault locations", functions to "construct an initial faulted horizon model using initial fault locations representing verticalized fault models", and it generates a "first faulted horizon model", (2) a second sub-block 152 which: receives the above referenced first input 146 and the above referenced second input 148 and the "first faulted horizon model" from the first sub-block 150, functions to "update the horizon data to eliminate indeterminate model areas if such exist", and it generates two outputs: (a) a first output "updated horizon data", and (b) a second output "a second faulted horizon model", (3) a third sub-block 154 which: receives four inputs (a) fault surfaces and relationships 102, (b) the above referenced first output "updated horizon data", (c) the above referenced second output "a second faulted horizon model", and (d) the second input "initial fault locations", functions to "compute fault throw at the initial fault locations and update the horizon data to support a valid throw model where needed", and it generates "updated horizon data", and (4) a fourth sub-block 156 which receives the "updated horizon data" from the third sub-block 154 and the "initial fault locations" 148, functions to "correct the horizon model using the updated throw model", and it generates "a corrected initial horizon model". Therefore, there are two outputs from the second block of code, sixth block of code 132, 140 of FIG. 27: the "updated horizon data" from the third sub-block 154 and the "corrected initial horizon model" from the fourth sub-block 156.

When the horizon modeling software 110 of FIG. 18 of the present invention is executed by the processor 112 of the workstation 108 of FIG. 18, a functional operation is performed by that processor 112. A description of that functional operation is set forth in the following paragraphs with reference to FIGS. 18 through 27, and with further reference to FIGS. 28 through 44 of the drawings.

Assume that the CD-Rom 115 of FIG. 18 is loaded into the workstation 108 of FIG. 18 and the horizon modeling software 110 on the CD-Rom 115 is loaded from the CD-Rom 115 into the workstation 108 and stored in the memory 110 of that workstation 108. When the processor 112 of workstation 108 executes the horizon modeling software 110 of FIG. 18, a function is performed by that software 110 which ultimately results in the production of the "final faulted horizon model" 116 of FIG. 19 from which the map 118 of FIG. 20 of one of the horizons (such as horizon 82a) on the model 116 may be derived. The final faulted horizon model 116 of FIG. 19 is recorded or displayed on the "recorder or display" 114 of the workstation 108 of FIG. 18. The function performed by the horizon modeling software 110 when it is executed by the processor 112 which results in the production of the "final faulted horizon model" 116 of the present invention is set forth below in the following paragraphs.

The horizon modeling software 110 of the present invention represents a robust method for fully automated 3D horizon modeling of an earth formation including complex faulting. The method is new and reveals a great potential for becoming a leading technique for horizon modeling in the oil and gas industry. It eliminates the need of human intervention in developing horizon models. The new method reduces significantly the time needed for developing accurate models and obtaining precise estimates for the available oil and gas resources. The automation is based on a unique adaptive technique for horizon data filtering and preliminary horizon surface estimates. A method is presented for the automatic construction of realistic 3D geologic horizon models in the presence of complex faulting. A geologic horizon is typically the interface between two depositional earth formations or layers, which, when faulted, results in a complex interface with abrupt changes in depth. A fully automated modeling method is presented. Although the method is presented in the context of earth modeling, the same technique is directly applicable to other fields of science and engineering involving complex faulted (discontinuous) 3D surface modeling. A common approach to construction of these types of models is to require as an input at least a partial definition of fault intersection lines in addition to horizon data. Older, more common modeling methods require definition of all intersection lines with no direct usage or requirement of faults as surfaces. Less common, but more advanced, approaches take, as an input, fault geometry local to the horizon in the form of piecewise planar approximations, or they may accept faults as surfaces but with an additional requirement of approximate intersection lines to assist model building. Finally there are other, even more advanced, approaches which are fully fault surface based, but lack automation, requiring time consuming intervention and analysis at key phases of modeling. A new solution is presented which fully automates the horizon modeling process. It does this across a wide variety of data types with automatic reconciliation of horizon data to previously modeled fault surfaces. Automation is the distinguishing factor separating this method as unique from other fault surface based horizon modeling methods. However, automation is not at the expense of quality of output so that a high quality model is reliably produced. In addition to horizon data, input requirements include fault surfaces and a description of fault relationships (names of faults that mutually intersect and their major/minor relationship). The system requires a minimum number of modeling control parameters, such as final resolution of the model, smoothing factors, etc. All these inputs are set before horizon modeling starts and they result in a complete horizon model along with its set of horizon-fault intersection lines. Even though the user can choose values for some or all modeling parameters, the system is tuned so that it produces high quality results in the vast majority of cases using default values. The following fault model definition is a requirement: A fault should be defined only where it has physical definition and not be artificially extrapolated where it does not exist, i.e., the fault should die out in the modeling domain where it dies in the physical domain. Horizon data become sharable across faults taking into account structural changes at fault boundaries. This allows the horizon model to be naturally continuous away from faults and discontinuous along each fault surface. A special case is called "compound faulting", where one fault is cut by another. When this happens, the cut (minor) fault should have two definitions, one before the cut and one after. The model after the cut is a truncated subset of the initial model. Each fault may include a displacement model which, when present, forms structural relationships between adjacent fault blocks. Displacement is represented as a continuous magnitude surface entity and, when paired with the fault location surface, a more complete fault model is formed, describing both magnitude and direction of earth shift from one side of the fault to the other side. Displacement varies smoothly along the fault from zero at the edge (or non-zero if cut by another fault) to a maximum near the fault center. Methods of structural conformal geology are optional components of the modeling process. Multiple horizons may be modeled independent or dependent on one another. Conformal dependency may be established between one or two other reference horizons controlling the shape of the modeled horizon. Single-reference conformal modeling constrains the shape to one input reference horizon. Dual-reference conformal modeling constrains the shape to an average (proportional) shape of two reference horizons. The derivation of shaping constraints is fully automated in keeping with overall automation of the system. Methods used to support this automation are discussed below. Although constructing realistic geologic horizon models in the presence of complex faulting is a 3D modeling problem, the methods employed are a hybrid between 3D and 2D techniques. The 2D methods are used appropriately to make the solution as efficient as possible in light of large scale applicability. There is no limit on the number of faults, resolution of the fault or horizon surfaces, or number of horizon data points. The automation of the modeling process is achieved in three fundamental ways: (1) Automatic determination of initial estimates of fault locations (lines of intersection between the horizon and faults) using fault surfaces and horizon data—These estimates account for fault die out within the bounds of the horizon model, i.e., they estimate where the fault does and does not exist in the horizon; reliable fault location estimation is the key ingredient of the 3D modeling process; unique methods are used which offer a robust solution for the general data case; (2) Automatic filtering of horizon data to remove wrong-sided points with respect to the fault surfaces that would otherwise produce an incorrect model—This reconciles horizon data with fault surface locations, insuring that all modeling input data items are mutually consistent; appropriate filter distances are calculated for each fault based on the analysis of the horizon data close to the initial fault locations; this modeling step is essential for the automation of the modeling process and guarantees a high quality final horizon model; and (3) Automatic definition of a fault throw model for each fault, constraining the horizon at the initial fault locations to honor the fault type, either normal or reverse—This is especially important for sparse data sets where the extrapolated horizon along each side of a normal fault may result in a reverse fault in some places and a normal fault in others along the corresponding initial fault location; the opposite can happen in regards to a reverse fault; throw modeling enforces consistency and is used only when a fault displacement model is unavailable; without this step, the user would need to intervene with interpreted points in void areas close to faults to constrain the model; throw modeling is also effective in modeling void fault blocks, blocks without any data points.

Reference Horizon Modeling Software 110a of FIG. 23

Construct Reference Initial Fault Locations and Clean Up the Horizon Data from Wrong Sided Data Points—Block 130 of FIG. 23

In FIG. 23, the "Construct initial fault locations and clean up the horizon data from wrong sided data points" block of code 130 is further illustrated in greater detail in FIG. 24. In FIG. 24, the block of code 130 of FIG. 23 is further comprised of two blocks of code: the "Construction of reference initial fault locations" block of code 130a, and the "Clean up reference horizon data from wrong sided data points" block of code 130b. The following paragraphs will discuss each of these two blocks of code individually.

Construction of Reference Initial Fault Locations 130a

The purpose of this block 130s is to construct initial fault locations for the reference horizon (such as reference horizon 120, 122 of FIG. 22).

Figure 29A:
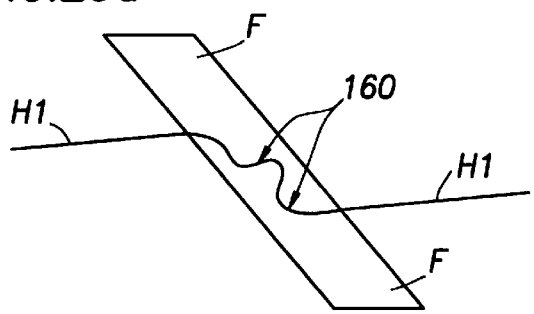
Figure 29B:
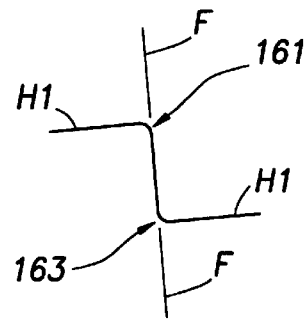

In accordance with one aspect of the present invention, the "horizon modeling software" 110 of FIG. 18, and in particular, the block of code 130a of FIG. 24 entitled "Construction of reference initial fault locations", will function as a "first filter" for filtering out a "particular set of reference horizon data" 106 of FIG. 24 which are located in close proximity to the "fault zone" (such as fault zone 82a of FIGS. 9 and 10) where the reference horizon 120 of FIG. 22 intersects the fault 121. FIGS. 29a and 29b will discuss why this "first filter" is needed. In FIGS. 29a and 29b, referring initially to FIG. 29b, a fault "F" intersects a horizon H1. Note that the slope of the horizon H1 intermediate the intersections 161, 163 is approximately the same as (not smaller than) the slope of the fault "F". As a result, a "serpentine" shaped intersection between the horizon H1 and the fault "F" is produced. FIG. 29a illustrates in greater detail the "serpentine" shape of the intersection 160 between the horizon H1 and the fault "F". The "serpentine" shape of the intersection line 160 in FIG. 29a indicates that the above referenced "particular set of the reference horizon data" associated with reference horizon "H1" which are located in the vicinity of the intersection 160 in FIG. 29a exhibits geometric characteristics which are not in good agreement with the geometric characteristics of the corresponding fault "F". As a result, it is necessary to generate horizon and fault surfaces (such as horizon "H1" and fault surface "F" in FIG. 29a) which have clean intersections that represent "initial fault locations" which have geometric characteristics matching well the geometric characteristics of the corresponding fault. Therefore, the intersection 160 in FIG. 29a between horizon "H1" and fault "F" (which is hereinafter called an "initial fault location") must be corrected such that the geometric characteristics of the intersection 160/initial fault location 160 will match well the geometric characteristics of the fault "F".

First Filter

Figure 30A:
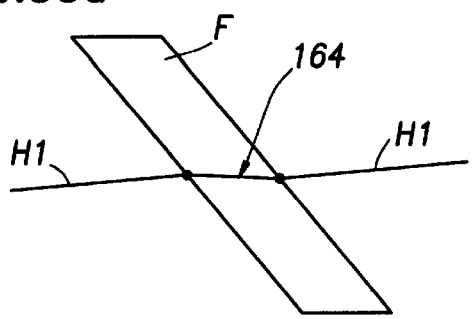
Figure 32A:
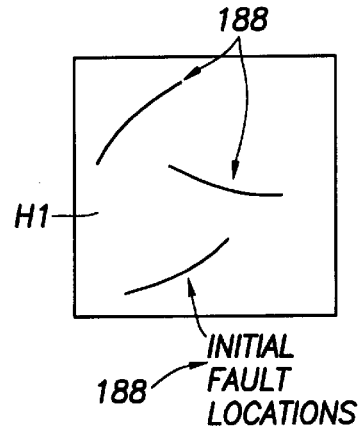
Figure 32B:
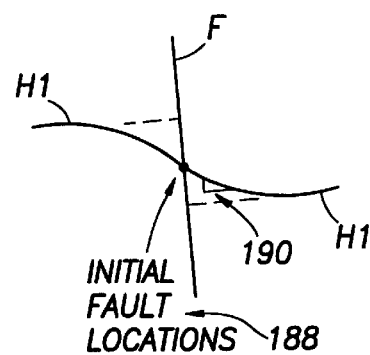

In FIG. 28, in order to correct the intersection 160 in FIG. 29a such that the geometric characteristics of the intersection 160/initial fault location 160 will match well the geometric characteristics of the fault "F", it is necessary to eliminate the above referenced "particular set of reference horizon data". In FIG. 24, the "construction of reference initial fault locations" code 130a functions as a "first filter" by filtering out the above referenced "particular set of reference horizon data". The "first filter" will filter out the "particular set of reference horizon data" and, as a result, it will flatten (i.e., decrease) the slope of the horizon "H1" in the vicinity of the fault "F". For example, in FIG. 30b, note that the slope of the horizon H1 (see numeral 162) has been flattened (i.e., decreased) relative to the slope of the fault "F". As a result of the decreased slope, at 162 in FIG. 30b, of the horizon H1 relative to the fault "F", the "particular set of reference horizon data" have been "filtered out" by the "construction of reference initial fault locations" code 130a of FIG. 24. Therefore, the "construction of reference initial fault locations" code 130a of FIG. 24 functions as the "first filter" by removing just enough reference horizon data in the vicinity of the intersection 160 between the horizon H1 and the fault "F" of FIG. 29b to produce a "clean intersection" while retaining as much of the original reference horizon data as possible. In FIG. 30a, a "clean intersection" 164 is illustrated. Note that the "clean intersection" 164 in FIG. 30a does not have the serpentine shape, as does the intersection 160 in FIG. 29a. Rather, in FIG. 30b, as a result of the "flattened slope" of the horizon H1, at 162, relative to the fault "F", the intersection 164 in FIG. 30a between the horizon H1 and the fault "F", on the fault plane F, appears to be quite "straight". As a result of this straight intersection 164 in FIG. 30a, the geometric characteristics of the intersection 164/initial fault location 164 in FIG. 30a does, in fact, match well the geometric characteristics of the corresponding fault "F". Therefore, in FIG. 31, the "first filter" 130a of FIG. 24 should filter the intersection 180 because it is serpentine shaped (it does not match well the geometric characteristics of the corresponding fault passing therethrough); however, the "first filter" should not filter the intersections 182, 184, and 186 in FIG. 31 because these intersections are relatively straight (they do match well the geometric characteristics of the corresponding fault passing therethrough). In FIG. 32a, a plurality of "clean and straight intersections" 188, between the horizon H1 and a fault (not shown), are illustrated. Each intersection 188 is hereinafter called an "initial fault location" 188. In FIG. 32b, the initial fault location 188 (having a clean and straight intersection) between the horizon H1 and the fault F is illustrated. Note the flat slope 190 of the horizon H1 in the vicinity of the initial fault location 188 which produces the clean and straight intersection of the initial fault location 188.

Figure 30B:
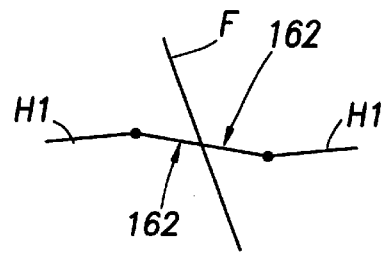

In FIG. 28, a flow chart depicting the function of the "construction of reference initial fault locations" code 130a of FIG. 24 is illustrated. In FIG. 28, horizon data 106 and fault surfaces and relationships data 102 are provided. In response to such data, the first step of the flow chart is to "construct an unfaulted horizon model" 166. The second step is to "intersect it with the fault surfaces to obtain estimates for the initial fault locations" 168. The third step is to "compute the maximum distortion angle for every fault location" 170 (determine the slope of the horizon H1 relative to the fault "F" as shown in FIG. 30b). In the fourth step 172, ask "are all angles below threshold?". If no, perform two additional steps: (1) "increment the filtering distances of the faults whose distortion angle is above the threshold" 174, and (2) "filter the horizon data by removing all data points which fall into the proximity zone of every fault; the proximity zone of a given fault is defined by the points in the plane which are no further than the current filtering distance away from any point on the estimated fault location curve" 176; and then repeat steps 166, 168, 170 and 172. However, if yes, "finish the calculation of initial fault locations" 178. This will produce the initial fault locations. Now, read the next section of this specification entitled "Data Filtering and Estimating Initial Fault Locations in the context of reference horizon modeling" and, while reading that section, refer back to the flow chart of FIG. 28.

The above referenced description included a discussion of the "first filter" and steps for estimating the "initial fault locations" in the context of reference horizon modeling (such as the reference horizon 120 in FIG. 22). The following description will discuss these concepts in much greater detail.

Data Filtering and Estimating Initial Fault Locations in the Context of Reference Horizon Modeling A typical problem that arises when modeling faulted horizons is proper handling and managing of data corresponding to the separate fault blocks. Known approaches include the so-called "fault-block" method. Even though this method achieves the desired data separation, it does not provide the automation due to the need for manual fault block definition using the mouse or some suitable interpretation procedure.

In accordance with the present invention, a new approach has been developed which does not require fault blocking of data, rather determines fault relationship of data points on the fly. It initially approximates faults as local vertical entities, then refines the model to account for true location and shaping of faults. As we mentioned above, the lines of intersection of the faults and the modeled horizon are unknown. However, a good approximation to them can be obtained by intersecting the unfaulted horizon model with the fault surfaces. These intersections are represented by a single curve for each fault surface. Once these curves are computed, the subsequent modeling steps can be performed as described in FIGS. 23 and 24. The geological nature of the faults implies that fault surfaces are fairly monotone and smooth. Therefore, the resulting initial fault/horizon intersection curves (i.e., the "initial fault locations") must have reasonably simple geometry without wild variations.

The computation of the "initial fault locations" is based on the calculation of the intersections between an unfaulted horizon model and the fault surfaces. The unfaulted horizon model is built using the horizon data only. It is a continuous surface. Because of the nature of the horizon data (typically 3D or 2D seismic surveys of oil fields), a straightforward intersection of the unfaulted horizon with the faults does not produce the desired solution. An important difficulty arises here. Namely, often, horizon data is wrongly interpreted by computers or humans, and horizon data is interpreted very close to the fault zones or even inside the zone. A simple intersection of unfaulted horizons modeled from such data typically produces either wildly varying intersection curves or multiple curves per fault. In fact, all interpolators available from mathematics and used commonly in the industry for developing unfaulted horizon models are guaranteed to fail in producing reasonable "initial fault locations" in many important practical cases.

To solve this problem we present a unique and robust method for computer generation of "initial fault locations" suitable for horizon data coming from a variety of sources. Our method is fault surface based, adaptive, fully automated and reliable. It is based on the following ideas we already indicated that the presence of data in the fault zone, or close to it, is a source of problems. On the other hand, because of the nature of the horizon data, removing data close to the fault zones reduces the slope of the unfaulted model in the zone. Hence, removing more and more data points in the vicinity of a given zone results in a smoother horizon and reduces its slope. This in turn means that we can eventually arrive at the desired solution. The key observation here is that the intersection of an appropriately chosen horizontal plane with the fault always gives a good solution. To make this practical, however, the following problems must be resolved. First, a reliable test for the quality of the computed fault locations must be developed so that if a fault passes the test, no more data is removed around its zone. Excessive removal of horizon data can have an adverse affect on the shaping of the unfaulted horizon which in turn may deteriorate the overall accuracy of the computed fault locations. Second, a method for managing the range of data removal on a per-fault basis must be defined so that the system can compute good fault locations yet minimize the data in a fully automated and adaptive fashion.

The method in accordance with the present invention is based on "horizon data filtering" along the fault surfaces. Filtering removes data points which are judged to be too close to fault surfaces. This is a combination of 2D and 3D techniques which assess the horizontal distance from each data point to estimated fault locations. Estimated initial fault locations are defined by projecting the intersection to curves onto a reference plane. Data points within a "horizontal distance tolerance", called the "filter distance", from either side of the estimated initial fault locations, are removed.

Filtering is an iterative process when used to calculate "initial fault locations". Starting with zero filtering distance for each fault, the filtering algorithm increments the distance on a per-fault basis which results in minimal filtering distances required to rid the system of bad data yet maximize the retention of good data. The value for this increment is calculated automatically by the system based on data type. For 3D seismic, a density analysis is performed for this purpose. It can be overwritten by the user to accommodate specific needs. At the end of each iteration, a convergence test is made based on the analysis of the quality of the current "initial fault locations". Data are considered good (and filtering complete) when all computed "initial fault locations" pass a distortion tolerance test. The maximum distortion of the bending of the projection of any computed fault location curve with respect to the bending of the corresponding fault surface along that curve is measured.

To illustrate how the distortion angle is derived, let us consider an initial fault location $\pi C$ given by the projection of the intersection curve between a horizon H and a fault F. Let p be any point on $\pi C$. Define $\vec{t}_p$ to be the tangent vector to $\pi C$ at the point p. Define also $\nabla_p F$ to be the gradient of F at the point C(p). Correspondingly, let $\pi \nabla_p F$ be the projection of $\nabla_p F$ onto the reference plane.

Assuming orientation in the plane, let $\vec{1}_p$ be the vector obtained from $\pi \nabla_p F$ by a rotation of 90 degrees in the direction of $\vec{t}_p$. Let $\theta_p$ be the angle between $\vec{1}_p$ and $\vec{t}_p$ computed by $$\theta_p = \arccos\left(\frac{\vec{t}_p \cdot \vec{1}_p}{|\vec{t}_p||\vec{1}_p|}\right).$$

Then define $\theta_{max}$ by $$\theta_{max} = \max_{p \in \pi C} |\theta_p|.$$

This is the critical parameter which is used to control the quality of the fault locations. It represents a distortion angle measured in degrees. The filter stops iterating when the distortion angle for every fault is below a threshold value. The threshold is set to 30 degrees in the system but it can be modified by the user to his or her liking. It is straightforward to see that $\theta_{max}=0$ for the special case when the horizon H is a plane that coincides with the reference domain. Typically, when these calculations are performed on a computer system with limited memory and finite precision, the projected curves are represented as collections of vertices and continuous segments of simple curves that connect them. Then, to carry out the calculations above, one has to process each segment (the end-points excluded) as described above and then take the maximum over all segments. For the special case when the segments are pieces of straight lines, $\vec{t}_p$ is constant over each segment (the end-points excluded). To compute the distortion angle reliably and efficiently, each segment can be sampled at n points to calculate. Then, an average distortion angle over this segment is computed by $$\theta_{ave} = \frac{1}{n}\sum_{i=1}^{n}\theta_{p_i}.$$

Correspondingly, the maximum angle for this fault location is calculated by taking the maximum over all segment average angles.

Each time the maximum distortion angle for a given fault location is above the threshold, its filter distance is increased by the increment and the iterations continue. In order to minimize the number of rejected data points, an internal weak limit of maximal filtering distance (equal to 5 times the initial filter distance) is maintained initially in the system. Thus, the individual distances are incremented until they reach this maximum. If the system decides that it cannot reach a reasonable solution with this maximum distance in effect, it ignores it and keeps incrementing the individual distances until the distortion constraint is satisfied. It typically requires 3 to 5 iterations to complete.

Alternatively, data filtering can be achieved by a simpler method which increments the distances for every fault uniformly. The number of filtered data points is counted at each iteration and the process stops when the current number of filtered points is a small fraction of the maximum number of filtered points during the iteration. This method lacks the adaptive features of the approach described above and tends to filter many more data points than the distortion angle based algorithm.

The automated generation of initial fault locations is also useful for determining major/minor relationships between fault surfaces. Often, in complex projects with large number of faults, it is difficult to decide what is the right relationship between some faults. Treating these faults as unrelated and using the method for generating "initial fault locations" provides helpful planar view of the fault traces on a given horizon. The configuration of the traces can be used to decide which is the right relationship between the faults.

Clean Up Reference Horizon Data from Wrong Sided Data Points 130b of FIG. 24

The Second Filter and the Narrow Filtering Zone

The "Clean up reference horizon data from wrong sided data points" code 130b of FIG. 24 functions as a "second filter".

In order to eliminate the "above referenced "particular set of reference horizon data", the slope of the horizon line H1 which lies between intersections 161 and 163 in FIG. 29b was decreased, relative to the slope of the fault "F"; and this produces the decreased slope of the horizon 162 in FIG. 30b relative to the slope of the fault "F" and this produces the "clean and straight" intersection 164 in FIG. 30a.

However, we previously eliminated too many points in the "particular set of reference horizon data" in order to produce the clean and straight intersections 164 in FIG. 30a and the initial fault locations 188 in FIG. 32b. Therefore, the "second filter" (inherent in the "Clean up reference horizon data from wrong sided data points" code 130b of FIG. 24) is required because we must now re-introduce the "particular set of reference horizon data" which was previously eliminated but some of that "particular set of reference horizon data" which is inside a "narrow filtering zone" must again be filtered out.

Figure 33A:
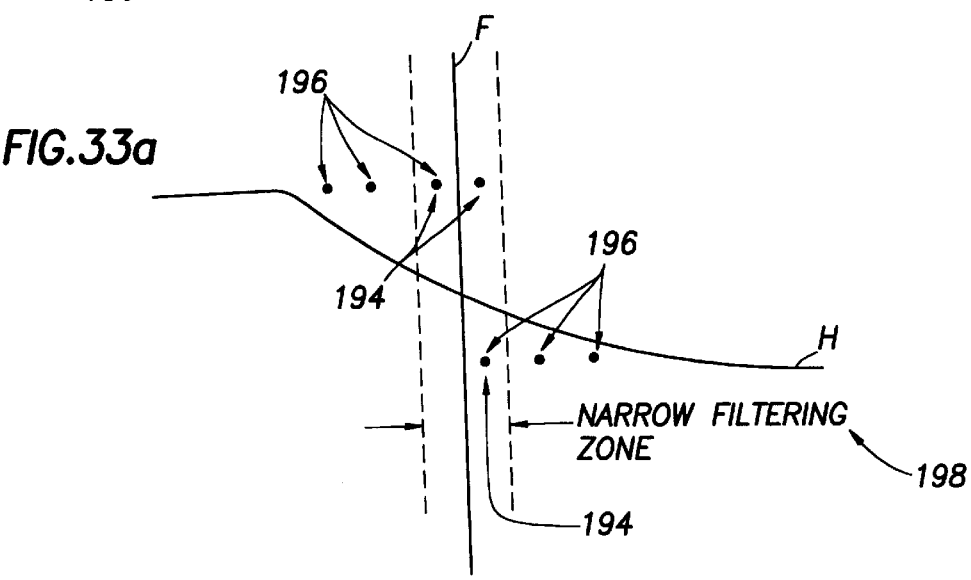
Figure 33B:
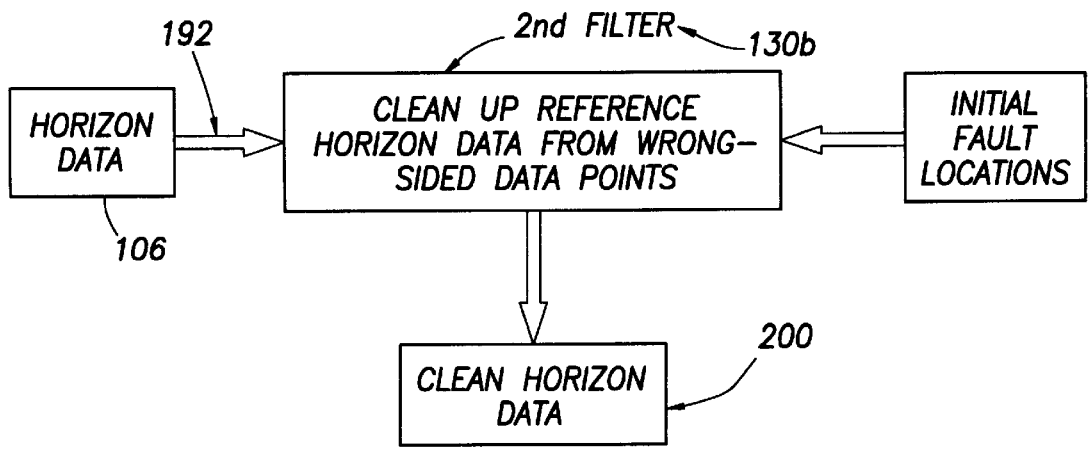

In FIGS. 33a and 33b, referring initially to FIG. 33a, the "particular set of reference horizon data" which were previously thrown away and eliminated are being "re-introduced". In FIG. 33b, note the data line 192 between the "horizon data" 106 and the block of code entitled "clean up horizon data from wrong sided data points" 130b (of FIG. 24) which represents the "second filter". The "horizon data" 106 includes the "particular set of reference horizon data" which was previously eliminated. In FIG. 33b, the "horizon data" 106 including the "particular set of reference horizon data" are being reintroduced into the "second filter" 130b of FIGS. 24 and 33b via the data line 192. However, in FIG. 33a, some of the "particular set of reference horizon data" will again be filtered out in the "second filter" 130b. That is, in FIG. 33a, a subset 194 of the "particular set of reference horizon data" 196 which are inside a "narrow filtering zone" 198 will be filtered out, via the "second filter" 130b. As a result, "clean horizon data" 200 will be generated by the "second filter" 130b, as shown in FIGS. 24 and 33b.

Construct an Initial Faulted Reference Horizon Model, Block 132 of FIG. 23

See the section of this specification set forth below entitled "Construct an initial faulted conformal horizon model, block 140 in FIG. 25; and Construct an initial faulted reference horizon model, block 132 in FIG. 23" which refers to FIG. 27 for more detailed information relating to block 132 of FIG. 23.

Figure 34A:
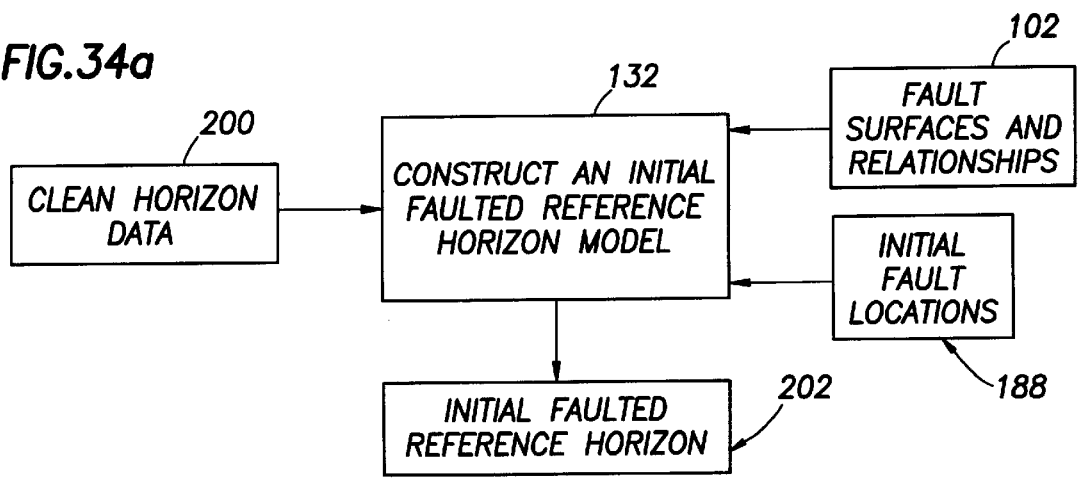

In FIG. 34a, the "clean horizon data" 200 of FIG. 33b includes all the "particular set of reference horizon data" 196 except for the subset 194 of points which lie within the narrow filtering zone 198 of FIG. 33a.

Figure 34B:
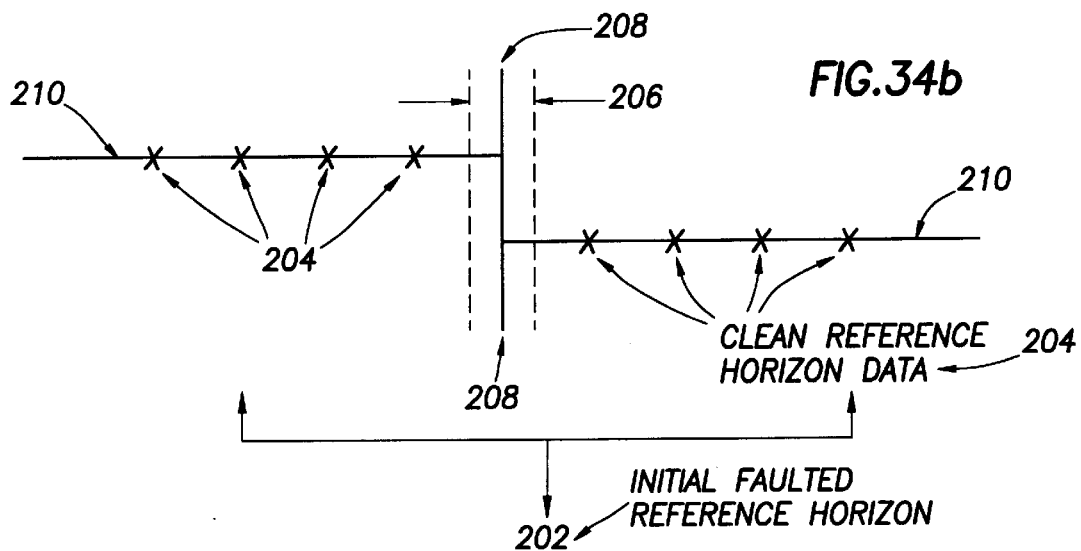

In FIG. 34a and 34b, the clean horizon data 200 is input to the "construct an initial faulted reference horizon model" 132 in addition to the "fault surfaces and relationships" 102 and the "initial fault locations" 188 of FIG. 32b. Recall that the "fault surfaces and relationships" data 102 is discussed in prior pending application Ser. No. 08/823,107, filed Mar. 24, 1997, entitled "Method and Apparatus for Determining Geologic Relationships for Intersecting Faults", the disclosure of which has already been incorporated by reference into this specification. In response to the clean horizon data 200 and the fault surfaces and relationships data 102 and the initial fault locations data 188, the "construct an initial faulted reference horizon model" code 132 generates an "initial faulted reference horizon" 202. An "initial faulted reference horizon" 202 is best shown in FIG. 34c.

Figure 34C:
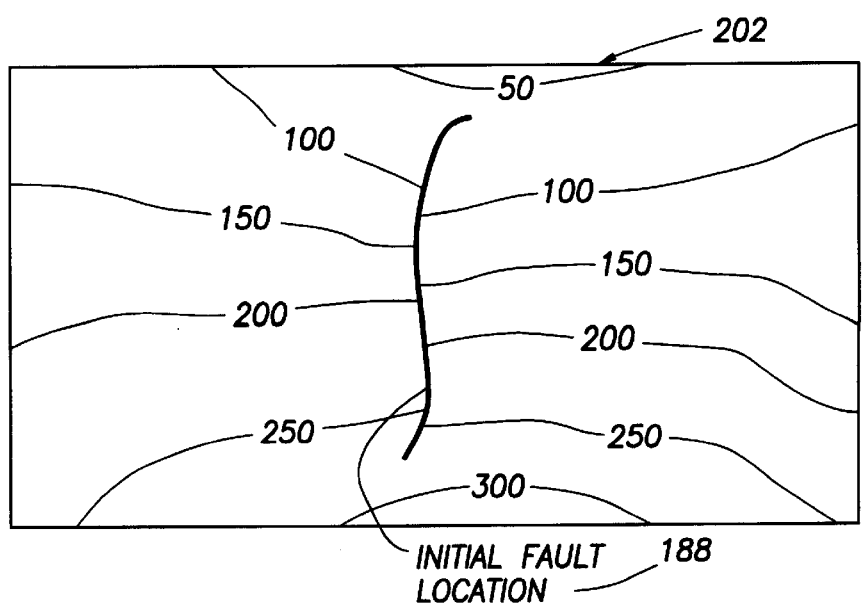

In FIGS. 34a through 34c, referring initially to FIG. 34b, since the "clean horizon data" 200, which is input to the "construct an initial faulted horizon model" 132, includes all the 196 of FIG. 33a except for the subset of points 194 of FIG. 33a which are inside the narrow filtering zone 198, the processor 112 of the workstation 108 of FIG. 18, when executing the horizon modeling software 110, will respond to the "clean horizon data" 200 in FIG. 34a (and to the "fault surfaces and relationships" data 102 and the "initial fault locations" 188 of FIG. 34a) by plotting a set of horizon data 204 as illustrated in FIG. 34b. Note that no horizon data points 204 are plotted inside the "narrow filtering zone" 206 in FIG. 34b. However, in addition, in FIG. 34b, the processor 112 of workstation 108 will also plot a substantially "vertically sloped" fault surface 208 through the horizon 210; that is, the fault 208 is disposed at an angle of approximately 90 degrees with respect to both the left and right sections of the horizon 210, as best illustrated in FIG. 34b. The horizon 210 in FIG. 34b, which is comprised of the data points 204 having no data points inside the "narrow filtering zone" 206, is called an "initial faulted reference horizon" 202. FIG. 34b shows a side view of the "initial faulted reference horizon" 202 including the vertically disposed fault 208 passing through the horizon 210. FIG. 34c shows a top view of the "initial faulted reference. horizon" 202 of FIG. 34b without the vertically disposed fault 208 passing therethrough. In FIG. 34c, the "initial faulted reference horizon" 202 includes a line 188 traversing the width of the horizon 202, which line 188 represents the "initial fault location" 188 in the "initial faulted reference horizon" 202 where the substantially vertically sloped fault surface 208 passes through the horizon 202. That line 188 is not shaped like a "fault zone" similar to the "fault zone" 82a of FIGS. 9 and 10 (where an oval shaped opening 82a is disposed through the horizon 82) because a substantially "vertically sloped" fault 208 is passing through the horizon 210 of FIG. 34b at approximately a 90 degree angle to the horizon 210.

Construct the Reference Final Fault Locations, Block 134

Figure 35A:
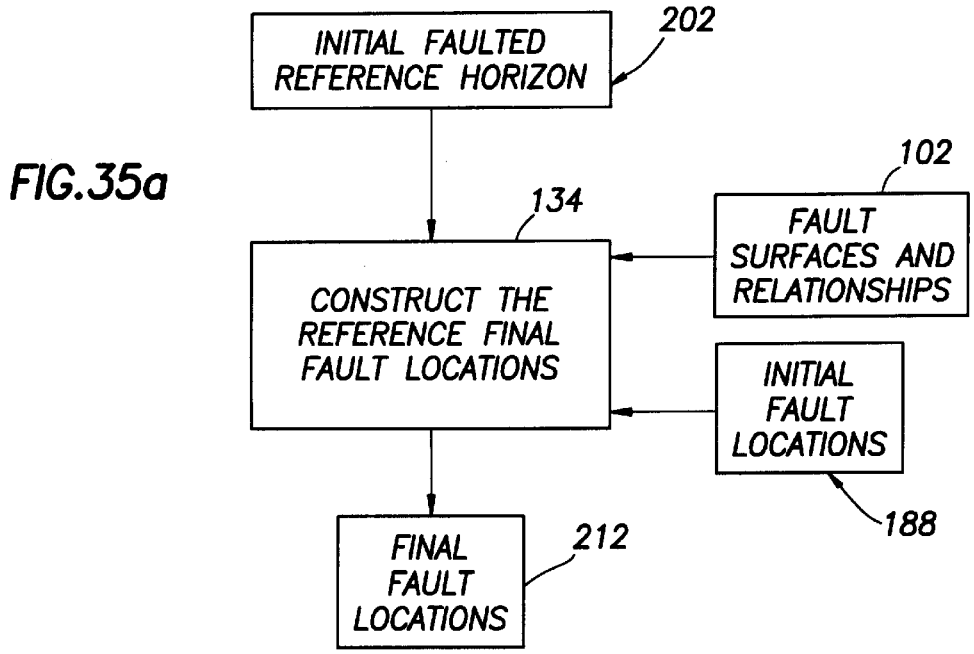

In FIG. 35a, the "initial faulted reference horizon" 202 of FIGS. 34a through 34c is input to the "construct the reference final fault locations" 134 of FIGS. 23 and 35a. In response to the "initial faulted reference horizon" 202 and the "fault surfaces and relationships" data 102 and the "initial fault locations" 188 (of FIG. 34c), the "construct the reference final fault locations" 134 generates the "final fault locations" 212.

Figure 35B:
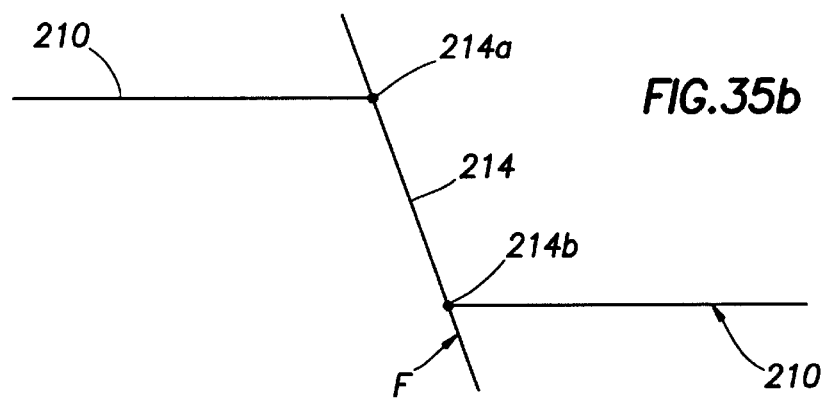
Figure 35C:
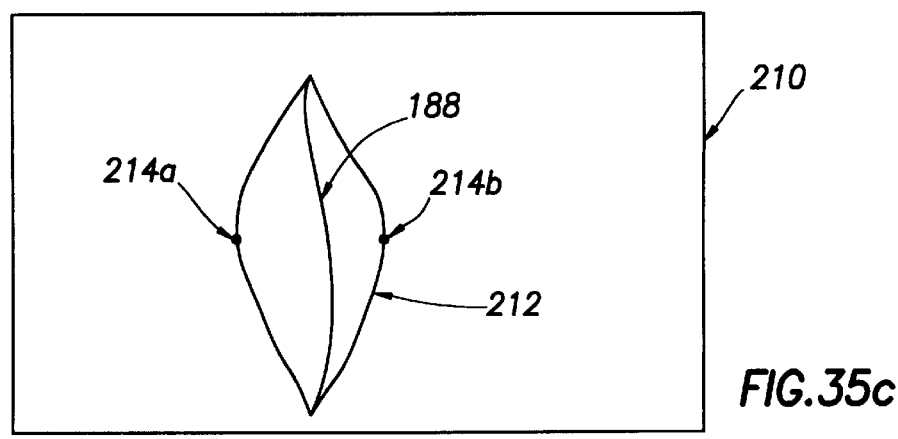

In FIGS. 35b and 35c, the horizon 210 of FIG. 34b is again illustrated in FIG. 35b. However, when the "construct the final fault locations" code 134 of FIG. 35a is executed by the processor 112 of the workstation 108 of FIG. 18, the processor 112 will plot a substantially "non-vertically" sloped fault 214 through the horizon 210 in FIG. 35b. A "non-vertically" sloped fault 214 is defined to be one which is not disposed at approximately 90 degrees with respect to the horizon 210. Because the "non-vertically" sloped fault 214 of FIG. 35b is not disposed at approximately 90 degrees with respect to the horizon 210, the fault 214 will therefore intersect the horizon 210 at two points, a first intersection point 214a and a second intersection point 214b. When the "non-vertically" sloped fault 214 is plotted through the horizon 210 in FIG. 35b, since it is "non-vertical", a "fault zone" will be created in the horizon 210, similar to the fault zone (or oval shaped opening) 82a in FIGS. 9 and 10. The exact location of that "fault zone" on the horizon 210 in FIG. 35b is called a "final fault location" 212. In FIG. 35c, a top view of the horizon 210 of FIG. 35b, without the fault 214 passing therethrough, is illustrated. In FIG. 35c, the horizon 210 is shown including the initial fault location 188 of FIG. 34c on the horizon 210. However, now that the "non-vertically" sloped fault 214 of FIG. 35b passes through the initial fault location 188 in FIG. 35c, the "initial fault location" 188 in FIG. 35c has now expanded to form a "final fault location" 212. The "final fault location" 212 in FIG. 35c is a "fault zone" (or oval shaped opening) in the horizon 210 identical to the fault zone 82a in the horizon 82 of FIGS. 9 and 10.

Construct the Final Faulted Reference Horizon Model, Block 136 in FIG. 23

Figure 36A:
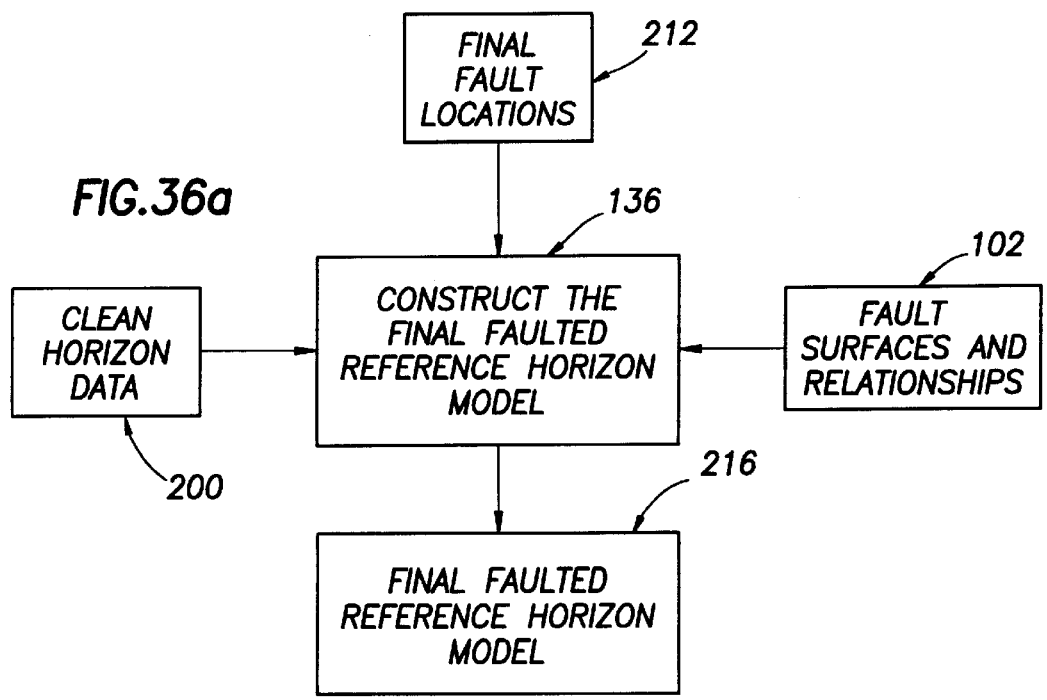

In FIG. 36a, the "construct the final faulted reference horizon model" code 136 of FIG. 23 receives the "clean horizon data" 200 and the "final fault locations" 212 and the "fault surfaces and relationships" data 102 (but it does not receive the "initial fault locations" 188), and, responsive thereto, it generates the "final faulted reference horizon model" 216. The "final faulted reference horizon model" 216 is defined to be that portion of the "final faulted horizon model" 116 of FIG. 19 that includes solely the reference horizon. The conformal horizons will be defined and built in FIG. 25 in response to the "final faulted reference horizon model 216 of FIGS. 23 and 36a.

Figure 36B:
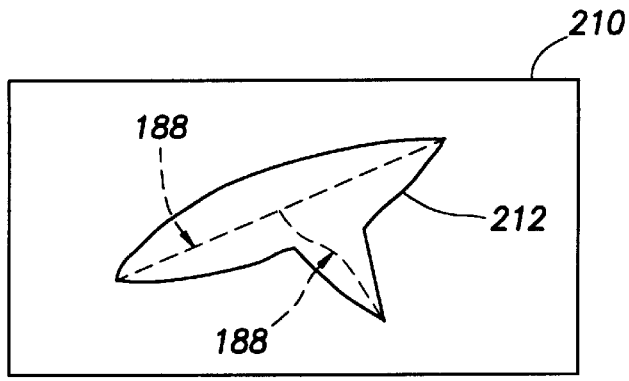
Figure 36C:
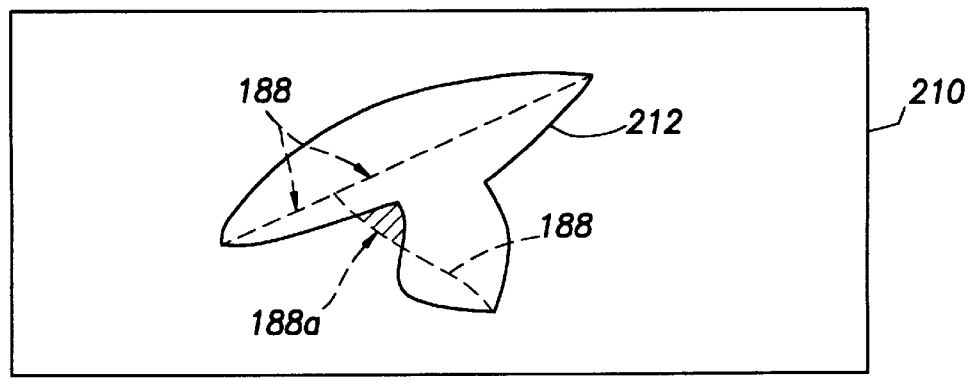

In FIGS. 36b and 36c, the "final fault location" 212 and the "initial fault location" 188 on the horizon 210 is again illustrated. Note that, in FIG. 36b, the "initial fault location" 188 is intended to be neatly located within the "final fault location" 212. However, in reality, in FIG. 36c, if the "construct the final faulted reference horizon model" code 136 of FIG. 23 also received the "initial fault locations" data 188, the "construct the final faulted reference horizon model" code 136 would, in some instances, place the "initial fault location" 188 outside the "final fault location" 212. See numeral 188a in FIG. 36c where the "initial fault location" 188 is disposed outside the "final fault location" 212.

In FIG. 37, in order to solve the above referenced problem where the "initial fault location" 188 is sometimes placed outside the "final fault location" 212, the "construct the final faulted reference horizon model" code 136 of FIG. 23 and 37 does not receive the "initial fault location" 188 (i.e., the "initial fault location" 188 is not input to the "construct the final faulted reference horizon model" code 136).

The Conformal Horizon Modeling Software 110b of FIG. 25

Before beginning a detailed description of the functional operation of the conformal horizon modeling software 110b of FIG. 25, the following discussion with reference to FIG. 37a will discuss the overall function of the conformal horizon modeling software 110b of FIG. 25.

In accordance with one aspect of the present invention, the horizon modeling software 110 of FIG. 18 of the present invention will automatically calculate and determine the conformal horizon model (such as conformal horizon 124 in FIG. 22) from the reference horizon model (such as reference horizon 120 in FIG. 22) and one or two additional original points on the conformal horizon that were previously identified in the horizon data 106.

In FIG. 37a, a reference horizon 218 is adequately defined by a multitude of original data points 222 which originated from the horizon data 106. A fault 220 intersects the reference horizon 218 as shown. Since a multitude of original data points 222 were received by the reference horizon modeling software 110a to define the reference horizon 218 in FIG. 37a, the reference horizon modeling software llOa had no problem with respect to the generation of the "surface of the reference horizon model" (from FIG. 23) which is inherent in the final faulted reference horizon model 216 of FIG. 36a.

However, the horizon data 106 does not include a multitude of original data points to define a "conformal" horizon, such as the conformal horizon 224 in FIG. 37a. In fact, only a few original data points that define the conformal horizon 224 exist in the horizon data 106. In FIG. 37a, assume that, in addition to the original data points 222 which define the reference horizon 218, only two additional original data points 226 and 228 were provided by the horizon data 106 for defining the conformal horizon 224 of FIG. 37a.

The conformal horizon modeling software 110b of FIG. 25 will adequately "determine" the conformal horizon 224 in FIG. 37a in response to the following given data: (1) the grid points 222 in FIG. 37a which define the reference horizon 218, and (2) the two additional original data points 226 and 228 in FIG. 37a which define the conformal horizon 224. When the conformal horizon modeling software 110b "determines" the conformal horizon 224 in FIG. 37a, it will determine a plurality of data called "shaping data", such as the "shaping data" 230 in FIG. 37a. When the shaping data 230 has been determined by the conformal horizon modeling software 110b, that "shaping data" 230 in addition to the two additional original data points 226 and 228 will adequately define the conformal horizon 224 in FIG. 37a.

The reference horizon modeling software 110a of FIG. 23 generates the "final faulted reference horizon model" 216 in FIG. 36a which represents a surface of the reference horizon model. For example, in FIG. 22, the reference horizon modeling software 110a will generate a surface of the reference horizon model for reference horizon 120. In FIG. 25, that surface of the reference horizon model (inherent in the final faulted reference horizon model) is now input to the conformal horizon modeling software 110b of FIG. 25. The conformal horizon modeling software 110b of FIG. 25 will, responsive thereto, generate surfaces for the conformal horizon models, such as the surfaces for the conformal horizons 124 and 126 in FIG. 22.

Construct Conformal Initial Fault Locations and Clean Up the Horizon Data from Wrong Sided Data Points and Derive Shaping Data, Block 138 in FIG. 25

In FIG. 25, the fifth block of code 138 ("construct conformal initial fault locations and clean up the horizon data from wrong sided data points and derive shaping data" 138) of the conformal horizon modeling software 110b receives the "final faulted reference horizon model" 216 representing a surface of the reference horizon model (such as reference horizon 120 in FIG. 22. In response thereto, the fifth block of code 138 generates "clean horizon and shaping data" and "initial fault locations".

In FIG. 26, a block diagram showing a detailed construction of the fifth block of code 138 in FIG. 25 ("construct conformal initial fault locations and clean up the horizon data from wrong sided data points and derive shaping data" 138) is illustrated. We will now analyze each block of code in FIG. 26 (blocks 138a through 138e), as follows.

Derive Preliminary Shaping Data, Block 138a of FIG. 26

This block of code will derive preliminary shaping data, such as the shaping data 230 shown in FIG. 37a.

Project the Reference Initial Fault Locations Along the Fault Surfaces, Block 138b of FIG. 26, and Blank the Shaping Data in the Fault Zones Defined by the Projected Reference Initial Fault Locations and the Corresponding Pairs of Reference Final Fault Locations, Block 138c of FIG. 26

In FIG. 37b, a reference horizon 232 is illustrated. A vector tangent 234 is projected in a tangential direction relative the fault 236 which cuts through the reference horizon 232. A conformal horizon 238 is defined such that the discontinuity 239 on the conformal horizon 238 lies directly on top of the vector tangent 234. A fault zone 244 is defined by point 240 on the reference horizon 232 and point 242 on the conformal horizon. Blank all shaping data (230 in FIG. 37a) on the conformal horizon 238 which are disposed within the fault zone 244 in FIG. 37b. This action (blanking the shaping data in the fault zone 244 ) is being taken in view of the aforementioned "no fault extensions" design philosophy.

Construct the Conformal Initial Fault Locations and Clean Up Horizon Shaping Data from Wrong Sided Data Points, Block 138d of FIG. 26

See the remarks above which relate to the block of code 130 in FIG. 23 associated with the reference horizon modeling software 110a ("construct reference initial fault locations and clean up the horizon data from wrong sided data points" 130). Those remarks related to the "first filter" and the "second filter".

This block of code 138d in FIG. 26 associated with the conformal horizon modeling software 110b (entitled "construct the conformal initial fault locations and clean up horizon shaping data from wrong sided data points" 138d) also functions as a "first filter" and a "second filter" in the same manner as did the block of code 130 in FIG. 23 associated with the reference horizon modeling software 110a. The flow chart of FIG. 28 relating to the construction of initial fault locations also applies with respect to the block of code 138d of FIG. 26.

Blank the Shaping Data in the True Fault Zones Defined by the Initial Fault Locations and the Corresponding Pairs of Reference Final Fault Locations, Block 138e of FIG. 26

In FIG. 37c, note the reference horizon 246 and the conformal horizon 248. This block of code 138e in FIG. 26 computes the initial fault location at the conformal level. In addition, the objective of this code 138e is to match the curvature of the curved fault 250 to model the-conformal horizon 248; and in order to match the curvature of curved fault 250, it is necessary to blank the shaping data (such as shaping data 230 in FIG. 37a) in the "true fault zone". The term "true fault zone" is defined as a zone defined by the following boundaries: the "true initial fault locations on the conformal level" 248 and the "final fault locations on the reference horizon" 246. In FIG. 37c, numeral 252 denotes the "true initial fault location on the conformal level" and numeral 254 denotes the "final fault locations on the reference horizon". Consequently, in FIG. 37c, numeral 256 identifies the "true fault zone".

In FIG. 37c, therefore, the block of code 138e in FIG. 26 entitled "Blank the shaping data in the true fault zones defined by the initial fault locations and the corresponding pairs of reference final fault locations" 138e will blank the shaping data (such as shaping data 230 in FIG. 37a) on the conformal horizon 248 which lies within the true fault zone 256 in FIG. 37c.

Having fully discussed the block of code 138 in FIGS. 25 and 26 ("Construct conformal initial fault locations and clean up the horizon data from wrong sided data points and derive shaping data" 138), for further more detailed information relating to this block of code 138, read the following section of this specification entitled "Data Filtering and Estimating Initial Fault Locations in the Context of Conformal Modeling".

Construct an Initial Faulted Conformal Horizon Model, Block 140 in FIG. 25; and Construct an Initial Faulted Reference Horizon Model, Block 132 in FIG. 23

In FIG. 27, the first step toward constructing an initial faulted (conformal or reference) horizon model (blocks 132, and 140) is to "construct an initial faulted (reference or conformal) horizon model using initial fault locations representing verticalized fault models", block 150 in FIG. 27. See FIGS. 34a and 34b. FIG. 34b illustrates a verticalized fault model where the fault 208 is disposed vertically with respect to the (conformal or reference) horizon 210.

In FIG. 27, the second step toward constructing an initial faulted (conformal or reference) horizon model (blocks 132, and 140) is to "update the horizon data to eliminate 'indeterminate model areas' if such exist", block 152 in FIG. 27. An "indeterminate model area" on a conformal or reference horizon is defined to be a "gap" on the horizon. A "gap" would appear on a conformal or reference horizon when no data exists on that part of the horizon.

In FIG. 27, the third step toward constructing an initial faulted (conformal or reference) horizon model (blocks 132, and 140) is to "compute fault throw at the initial fault locations and update the horizon data to support a valid throw model when needed", block 154 in FIG. 27. In addition, in FIG. 27, the fourth step toward constructing an initial faulted (conformal or reference) horizon model (blocks 132, 140) is to "correct the horizon model using the updated throw model" block 156 in FIG. 27.

With regard to the term "fault throw" used in the code blocks 154 and 156 in FIG. 27, the following discussion with reference to FIGS. 38 through 42 will define and discuss what is meant by the terms "fault throw" and "throw model".

Figure 38:
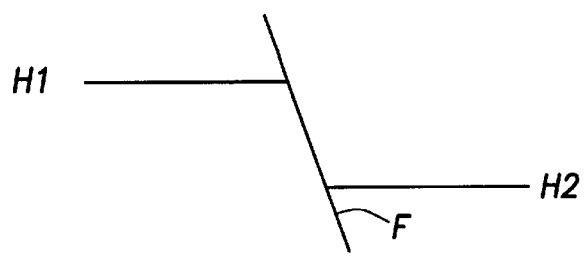
Figure 39:
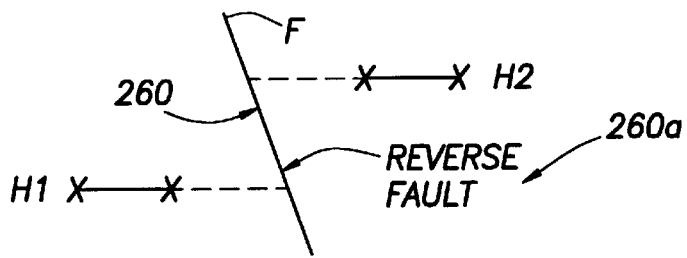
Figure 40:
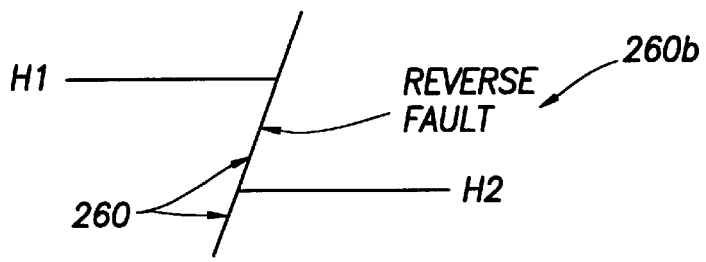
Figure 41:
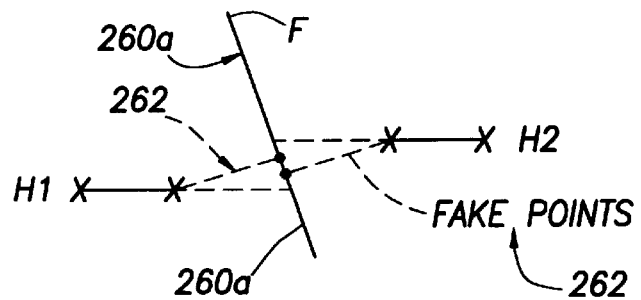
Figure 42:
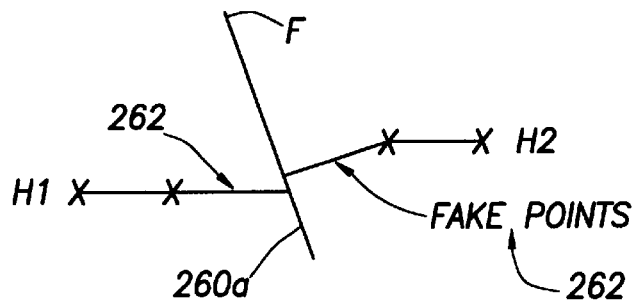

In FIGS. 38 through 42, referring initially to FIG. 38, a horizon H1 and H2 is intersected by a fault "F". The normal fault "F" in FIG. 38 is a typical fault discussed above in this specification. However, sometimes the earth formation of FIG. 8 may contain a "reverse fault". In FIGS. 39 and 40, reverse faults 260 are illustrated. In FIG. 39, horizon section H2 is above horizon section H1 thereby producing the reverse fault 260a; and, in FIG. 40, the reverse fault 260b is slanted in a reverse or opposite direction relative to the direction of normal fault "F" in FIG. 38. The "reverse fault" 260 is a problem which is created due to a lack of sufficient horizon data points. However, in order to remedy this problem regarding the reverse faults 260 of FIGS. 39 and 40, one solution is to introduce a "throw constraint", as follows. In FIGS. 41 and 42, in order to introduce the "throw constraint", introduce a set of "fake points" 262 on both sides of the reverse fault 260a in FIG. 41 in order to make the reverse fault 260a in FIG. 41 look like a "normal" fault, such as normal fault "F" in FIG. 38. As a result, in FIG. 42, the fault 260a looks like a "normal fault" 260a due to the set of fake points 262 which were added between each of the horizons H1 and H2 and the fault 260a. Now, by comparing the fault 260a of FIG. 42 with the fault "F" in FIG. 38, fault 260a in FIG. 42 looks more like a "normal" fault and not a "reverse" fault.

For more information regarding the concept of "fault throw" and "throw modeling", read the next section of this specification entitled "Data Filtering and Estimating Initial Fault Locations in the context of conformal modeling".

Data Filtering and Estimating Initial Fault Locations in the Context of Conformal Modeling The estimation of the "initial fault locations" in conformal horizon modeling is more complicated than the estimation for a reference horizon. A fully automated method for computing "initial fault locations" and "data filtering" in a conformal modeling context is presented here. Typically, conformal modeling is applied to horizons which have only a few data points derived through well exploration or some other means, but which is known to be shaped similarly to other known or pre-calculated horizons. These data points are enough to define in general the depth/elevation of the horizon but are far from being enough to derive adequate horizon shaping from them. The derivation of "initial fault locations" is a multistep procedure shown in FIGS. 24 and 26. Shaping data must be derived from the reference horizon subject to faulting geometry intrinsic to the input fault surfaces. First, the reference horizon is blanked inside all fault polygons (closed areas defined by reference horizon final fault locations). Then, an unfaulted isochore model is derived from horizon data and the blanked reference horizon. Then, initial fault location lines from the reference horizon are projected to estimated infill (conformal horizon) locations using fault surface derivatives and the unfaulted isochore model. These fault location estimates are then used to refine the isochore model to a faulted model, taking into account expanded fault zones due to migration of faults from reference to conformal horizon. The faulted isochore is then stacked onto the reference to create shaping data. At this point, shaping data will exist in all areas of the model except fault zones. Shaping data, along with horizon data, are then processed using the above described procedure to re-compute "initial fault locations". This results in accurate fault locations that take into account the 3D behavior of the fault surfaces. After the "initial fault locations" are created, the shaping data are re-blanked within the true fault zones, which are zones bounded by the "initial fault locations" and corresponding reference fault zones (polygons). This procedure is a reliable and fast method for deriving shaping data and calculating the initial fault locations for conformal horizon modeling in a fully automated fashion. Once this is completed, conformal horizon modeling proceeds exactly as does reference horizon modeling until the final model is constructed.

Throw Modeling" (blocks 154 and 156 in FIG. 27)—When constructing the horizon model nearby a fault and in the absence of a displacement model, the type of fault, normal or reverse, must be considered and used to develop a "throw model" consistent with the fault type. This is especially important when horizon data is sparse, but is also required for dense data in many cases. Fault type based "throw modeling" is potentially required anytime the horizon must be extrapolated to the fault surface, a condition largely independent of data distribution characteristics. Without such a model, adjacent fault blocks would otherwise be modeled as independent entities without control over the magnitude and direction of elevation changes across a fault. An extrapolated horizon on one side can lead to an incorrect elevation relative to the other side and can cause a normal fault to become reverse. Essentially, "throw modeling" reinstates fault block dependency. FIG. 27 shows steps used when constructing the "initial horizon model", with "throw modeling" the last phase, done after a fully-defined estimate of the horizon has been formed. First, a throw analysis is performed along initial fault locations. Based on this analysis, elevation values are derived along each side of each initial fault location line. Then, using these values, the model is regridded in such a way as to affect the model only in the proximity of initial fault locations. Analysis begins by first computing throw t' at horizon-fault intersections. This is a periodic calculation at sample points p along the initial fault location line C. Along C, this calculation intersects the left-sided horizon [H]L and the right-sided horizon [H]R with the fault F to yield throw t' at the intersection. Primed quantities represent calculations along horizon-fault intersections; corresponding non-primed quantities are locations along C. Let D be the difference model (fault—horizon), so that $[D_z]L$ and $[D_z]R$ are vertical components of the left and right difference models, respectively. $D_{xy}$ is the corresponding lateral component. Throw is then calculated as follows:

$$t' = [H'_z]_R - [H'_z]_L$$
$$[H'_z]_L = \left[H_z + D_{xy} \cdot \sqrt{|\nabla H|}\right]_L$$
$$[H'_z]_R = \left[H_z + D_{xy} \cdot \sqrt{|\nabla H|}\right]_R$$
$$D_{xy} = -\frac{D_z}{\sqrt{|\nabla D|}}$$
$$D = F - H$$

The fault heave h' is also computed using $$h' = |[D_{xy}]R - [D_{xy}]L|$$

The sign of t' and the fault gradient are combined to determine whether the model is normal or reverse faulting at C(p) and whether this fault type agrees with the actual fault type. If fault types agree and if heave h' is at least a minimum requirement $h'_{min}$ (an internal modeling constraint parameter), then the horizon model is unaltered. If these conditions are not met, horizon elevation constraints $$[H_z]_R^{new}$$

and $$[H_z]_L^{new}$$

at C(p) are introduced and computed using $$[H_z]_L^{new} = [H_z]_{mid} - \frac{t^{new}}{2}$$

$$[H_z]_R^{new} = [H_z]_{mid} + \frac{t^{new}}{2}$$

$$[H_z]_{mid} = \frac{[H_z]_R + [H_z]_L}{2}$$

$$t^{new} = \pm \left\{ h'_{min} \cdot \sqrt{|\nabla D|_L} + ([F_z]_L - [H_z]_R) - ([F_z]_R - [H_z]_L) \cdot s \right\}$$

$$s = \frac{\sqrt{|\nabla D|_L}}{\sqrt{|\nabla D|_R}}$$

$t^{new}$ is the new estimate of throw based on the minimum heave constraint $h'_{min}$ and signed based on fault type. Final elevation constraints are computed based on $t^{new}$ being centered about the midpoint elevation of the uncorrected horizon model $[H_z]_{mid}$.

After these throw-based elevation data are derived, the initial horizon model is updated to conform to the new constraints.

Other Components of Initial Horizon Modeling—In FIG. 27, "throw modeling" discussed above is the last of three basic steps in the construction of the "initial horizon model". All are shown in FIG. 27. For throw modeling to perform to its maximum potential, leading also to a final horizon model containing a complete set of final fault intersection lines, it is important that the horizon model be fully defined leading into throw modeling. Fault blocks void of data should contain a horizon estimate. Narrow fault blocks should be defined even in the most restricted areas. This requires an extra gridding step to analyze the results of the first gridding run, then regrid in an selective manner to fill in void areas of the model.

If, after the first gridding pass, the number of indeterminate grid values exceeds 1 in 10,000, a regrid operation is performed. Before doing so, defined grid values from the first pass are converted into data points and used as constraints and extrapolation control. In initial stages of regridding, faults are treated as translucent boundaries so that data may be temporarily visible to undefined and narrow fault block parts of the model. The elevation of newly defined parts will be a blend of surrounding fault blocks. Regridding is controlled so as to restrict extrapolation to local areas only.

Conclusions—The new methods described above show clearly that the complicated problem of modeling realistic geological horizons can be fully automated. As a result, a modeling system that takes as inputs only a minimal number of parameters, along with the natural input data entities such as horizon data sets and fault surfaces, can be developed. Such a system eliminates a significant burden of interactive tasks performed on a daily basis by geophysicists and geologists developing reservoir models. The adaptive features built into the system guarantees that automation does not come at the expense of the quality of the final modeling results. On the contrary, pre-commercial testing showed that the automatically computed results are superior in quality relative to their interactively developed counterparts.

As a result, the fully automated horizon modeling method and apparatus (which includes the horizon modeling software 110 of FIG. 18) in accordance with the present invention is provided in order to generate a "final faulted horizon model" 116 of FIG. 19 from which a map 118 of one of the horizons can be derived and analyzed to determine the location of the faults in the formation. The new method can also be applied to problems from other scientific and engineering fields that require 3D modeling of complex discontinuous surfaces.

DETAILED DESCRIPTION OF THE PREFERRED EMBODIMENT

Refer now to FIGS. 43 through 56.

1. Overview

In this section, we define the challenges that every reservoir modeling system faces in developing accurate models and discuss briefly the strengths and weaknesses of existing approaches.

1.1 Problem Formulation

The development of realistic petroleum reservoir models is a rather difficult problem to solve and requires understanding and bringing together different technologies and fields of science before a meaningful solution can be formed. By definition, a petroleum reservoir is a porous, permeable rock formation containing quantities of oil and/or gas surrounded by layers of less permeable rock formations. The building of the reservoir model begins with collecting data from seismic surveys, wells in the areas of interest, borehole findings, cores and rock samples, etc. This data is used for developing first the geometrical model of the reservoir represented as a volume in the three dimensional space enclosed by bounding surfaces. The bounding surfaces represent the geologic structure boundaries of the formation: geological horizons, faults, erosional channels, etc. This geometric structural model is then populated with material property distributions in order to construct a 3D property model. The property model is used to estimate the available hydrocarbon reserve in the reservoir and/or used for well planning. In another typical scenario, using upscaling methods, the property model is turned into an input for systems for reservoir simulation which calculate the fluid flow in the reservoir. The obtained flow data is compared with real measurements via history matching techniques and the quality of the modeling results is assessed. The modeling process is then restarted from the very beginning with corresponding adjustments. It is clear that it is extremely important to develop a realistic and accurate geometric structural model in order to guarantee high quality modeling results in all subsequent modeling steps.

The development of the structural geometric model is a 3D problem. The bounding surfaces for a given reservoir can be quite complicated and the right topological relationships between them can only be resolved using 3D modeling techniques. The problem is further complicated by the difficulties in providing adequate and consistent data that describes the structure boundaries. Depending on a variety of conditions, for a given reservoir boundary, there can be a paucity or a plethora of data, a clean definition of where the surface boundary exists, or a lack of clear definition. The data that does exist may be corrupted in some manner: noisy measurements, or data inconsistency with respect to certain feature boundaries, etc. There may be no faults, or many of them, possibly 100 or more. Some may be large and clearly discernible, others small and difficult to locate. Some faults intersect other faults, requiring that relationships be established. Faults often partition the model domain into closed subdomains and, in such cases, horizon data may exist in some subdomains, but not in others. Then, when modeling the horizon, in most cases, it is desirable to model it throughout, even in subdomains where horizon data is absent, or at least, provide a "reasonable" approximation in those areas. To improve the approximation in such areas, the fault model should have a provision to accommodate a displacement model. This has the effect of treating the fault as a transparent boundary (instead of an opaque one), across which horizon data is shared. The proper horizon-fault intersection curves (fault traces) should also be developed and included as a part of the final model.

In general, a variety of data sources for reservoir characterization are available. However, the most abundant data source is typically geophysical. Thus, a close connection to seismic interpretation systems, such as IESX and Charisma, is a key issue. Often, the developed model is used to validate the original interpretation. This naturally leads to tight coupling between modeling and interpretation, a powerful concept serving to achieve the best possible results overall.

In some cases, in addition to the seismic data, or instead of it, data from borehole interpretation is embedded in the model, resulting in cross-coupling data sources to support improvements in both the seismic interpretation and the overall model.

In practice, horizons are associated with different quantities of data, because some are strong reflectors and easily interpreted (if data is seismically derived). Others are difficult to detect or interpretation is incomplete for some reason. Thus, the amount of available data for a given horizon can be insufficient for developing a reasonable model. In such cases, methods based on structural conformity can be used. The shape of the modeled horizon can be constrained to the shape of another horizon previously modeled, with automatic reconciliation to complexities due to faulting patterns. In some cases, shaping should be constrained to two straddling horizons above and below, not just one, based on some average shape and proportional offset between the two. Conformal modeling is thus a method of information sharing across stratigraphically related horizons. In fact, given a reliable conformal modeling system, one which accurately migrates (propagates) fault intersection geometries from one horizon to the next, there is less need to do a full interpretation of the infill, relying instead of the modeling system to "finish the job".

Most modeling methods apply 2D techniques to what is, intrinsically a 3D problem and thus fall short in delivering a realistic or easy-to-use solution. Some, more advanced, systems, which include 3D methods, do not include automation and ease of use components, especially when dealing with topological relationships amongst the many boundaries in a large, complex, faulted reservoir. Or, they may fail to address real-world data integrity problems, also an automation issue, imposing cumbersome modeling workflow requirements, such as manual data editing.

Finally, there is the issue of fault blocks. Some systems require an interpretation step to artificially extend faults to either the model boundary or to other faults. This is done to eliminate the possibility of edges of faults "dangling" within the volume space at their natural locations, which leads to modeling difficulties. This is mostly an automation issue, or lack of it, if creating closed fault blocks are required. Model continuity is generally not an issue here, since fault block based methods can equally be made to ensure model continuity where faults naturally die out. The value of closed fault blocks may be warranted for downstream processes (e.g. for property modeling), but this should not necessarily be a prerequisite to structure modeling, especially if it reduces the level of automation.

In this specification, new "methods", which are used in the "Automatic Non-Artificially Extended Fault Surface Based Horizon Modeling System" of the present invention, are disclosed. The Horizon Modeling System of the present invention disclosed in this specification is part of an overall system that is hereinafter called "Framework 3D". All such new "methods" are currently implemented using rectilinear grid geometry for surface representations. Although this imposes some limits on the complexity of models that can be generated, it is important to note that the new concepts and/or methods carry over to much more general surface representations with very little change.

Although directly applicable to reverse faults, the Framework 3D methods are implemented for use in connection with normal and vertical faults. Vertical faults, when defined, are modeled as cutting through the entire reservoir. Framework 3D demonstrates effectiveness of the new methods in dealing with a majority of the structural components of a reservoir and will be extended to handle more complex elements, including reverse faults and fault displacement models.

1.2 Modeling and Visualization Components

"Framework 3D" is a suite of advanced modeling tools which complement the basic "CPS-3" mapping and modeling software. It allows the user to create, visualize, and edit a bundled suite of structural boundaries as a cohesive 3D entity, or structural framework. The "Framework 3D" application is comprised of six modules or "components":

(1) Fault Modeling (fault gridding)
(2) Fault Framework Building (assembling faults into a 3D framework)
(3) Horizon Modeling (3D horizon gridding)
(4) SurfViz (3D model visualization)
(5) Allan Diagrams (layer communication visualization)
(6) Horizon Sequence Editor (create a stratigraphically ordered list of horizons)

The above referenced "components" which comprise "Framework 3D" fit together into the integrated workflow sequence shown in FIG. 43.

Refer to FIG. 43 to view a flowchart depicting a modeling work flow.

A modeling session is initiated by first setting up a modeling environment which defines the volume of interest, data domain (depth, time or elevation), units, grid interval, etc. A data access layer provides the connection between modeling components and the geophysical and geologic databases for access to bulk data and their attributes. A wide variety of data types are supported. Fault data may consist of fault segments (cuts), contacts, and traces or any generic scatter set. Horizon data may consist of 3D or 2D seismic interpretation, well picks, or data of any spatial distribution so long as it is of a consistent domain (time, depth or elevation). Dip data may also be used for horizon slope constraints. All phases of modeling are supported by 3D and 2D visualization with ITC (intertask communication) connection between modeling and 3D visualization (SurfViz) providing rapid display updates when gridding operations are complete.

Fault Surface Modeling—This component provides an easy way to create surface models for a large number of faults. It allows selection of multiple data sets for each fault and assigns corresponding gridding parameters. Many of all faults can then be gridded in one execution step. A limited set of parameters has been made available to the user to control the smoothness, fit to data, grid increment and extrapolation distance of the resultant fault surfaces.

In this module, faults are modeled as independent entities. The impact of faults on other faults is not accounted for here. Rather, rendering faults as surfaces is the main issue, applying techniques which accurately model shaping and extent characteristics.

Faults are modeled out to their natural extent, since there is no requirement that they carve the 3D modeling domain into fault blocks. Several methods are available for controlling the fault extent, with tip-loop polygons used for exacting control.

Once all faults are modeled (or at least some of them), they are ready for assembly into a 3D framework.

Fault Framework Building—This component creates a realistic 3D structural framework of all faults to be modeled and reconciles intersection relationships that may exist between them. The result is the Fault Framework, catalogued as a named entity, which may contain both normal fault surfaces and vertical fault traces. Fault relationships and truncation rules are defined, which are then used to manage intersection of fault surfaces. A 3D visualization tool, Surfviz, assists in this step and in assessing overall model integrity, guiding the building process. Once complete, the Fault Framework is input to the Horizon Modeler to grid each horizon.

When one fault intersects another fault, one of them is declared the minor and the other the major, and the minor is automatically truncated to the major. Thus, the fault intersections are managed as pair-wise relationships. Refer to prior pending application Ser. No. 08/823,107 to Abbott, filed Mar. 24, 1997, assigned to the same assignee as the present application, and entitled "Method and Apparatus for Determining Geologic Relationships for Intersecting Faults", hereinafter called "the Abbott Application", the disclosure of which has already been incorporated by reference into this specification.

A pair-wise paradigm is seen as a more natural approach to representing the 3D fault model, one which is suited to this non-fault approach. New faults can be easily added, old ones removed or fault-fault relationships modified. When a new fault is introduced into the framework, only the faults it intersects are affected, i.e., only the physical neighborhood is affected. The same applies when a fault is removed from the framework. By contrast, for systems which use a fault block approach and where fault boundaries form a hierarchical decomposition of closed volume space, inserting or removing a fault often requires re-partitioning of the model, which is a more extensive operation. Using the pair-wise paradigm, faults affect the model only in the locale where they exist, having the effect of simplifying the user workflow, but also better reflecting the nature of the modeling problem. After the fault framework is built, it is ready for use in horizon modeling.

Horizon Modeling—This specification entitled "Automatic Non-artificially Extended Fault Surface Based Horizon Modeling System" discloses the "Horizon Modeling" component. The "Horizon Modeling" component creates the horizon model, accepting faults as a complex system of interconnecting surfaces as defined in the fault framework. Outputs include the horizon surface along with fault traces as pairs of upthrown and downthrown lines of intersection between the horizon and each fault surface. A conformal modeling option may be used to create an infill (conformal) horizon, in which case one or two reference horizons are part of the input.

The computed horizon model will be faulted or unfaulted based on the location (in the 3D space) of the fault surfaces. Methods allowing faults to naturally terminate anywhere within the model domain are used. 3D fault surface based gridding techniques are employed to do this (as opposed to the more conventional fault trace based methods or the fault block method). There is absolutely no requirement to provide estimates of any horizon-fault intersections to drive the process.

Fault surface based gridding involves 3D methods. Predictor-corrector techniques are used to first derive approximate horizon-fault intersections, then successively correcting the solution until the computed intersections satisfy a set of quality constraints (to the user, all of this is a single modeling step, with no intervention required). During the computational phase, as the predicted horizon-fault intersection location changes, the horizon solution changes as well, so that the final intersection solution is a best fit and true intersection between the horizon and the faults.

Efficient memory management methods are used which avoid having to retain many (more then one) fault surfaces in memory at any one time, resulting in an approach capable of tolerating any number of faults in the model. Likewise, there is no limit on the extent or resolution of the horizon.

Horizon data on the wrong side of fault surfaces are automatically filtered to avoid disturbing the final model. Adaptive filtering methods are used which analyze the model and automatically remove bad data points in order to improve the consistency of the model.

A true push button solution has been achieved in regard to 3D horizon modeling. However, automation is not at the expense of the quality of modeling results or the options available for controlling the modeling process. There is still the ability to exercise detail, interactive control over the final solution and modeling breakpoints are available for this purpose.

Allan Diagrams—Based on a fault framework and two or more horizons, this component displays a graphic profile along the face of a given fault, detailing zones of communication of the intervening layer as it crosses the fault. This diagram when created consists of a cross-section view into the fault surface, augmented by a map view showing the communication zones and fault polygons, and a reference map showing the profiled fault in relation to other faults in the fault framework. A legend is included, showing the defined zones and their relationship, and the numerical (fault surface) area of communication (if any).

SurfViz—This component visualizes fault and horizon surfaces in 3D, with real-time rotation, scaling, and light-source modeling. It is used for validating the 3D cohesiveness of the final model and assists in the creation process, such as defining fault truncation relationships. The Inter-Task Communication protocol is used for instant propagation of surface modification notification and automatic view update. Seismic interpretation data, boreholes, contours, and polylines can also be displayed.

Surface Sequence Editor—This component creates an ordered list of horizon surfaces created by the Horizon Modeler and is used by SurfViz when displaying color filled fence diagrams. This ordered list is also used by other applications, such as Property Modeling.

2. Fault Modeling

Fault modeling is the first step toward building the 3D fault framework. Faults are modeled as independent surface entities which will later be assembled (and trimmed) into a cohesive 3D framework. The main goal of this step is to produce the best possible rendering of data points on a fault surface.

The quantity and quality of data representing a fault may vary considerably from fault to fault. If seismic based, interpretations may be provided along some cross sections, with other cross sections either poorly defined or undefined. In terms of shaping, faults tend to be fairly simplistic structural interfaces with monotone-type characteristics, much simpler than that of horizon surfaces. Given sufficient data, they are easily modeled. In reality, data is often sparse, possibly well defined in one axial direction and poorly defined in another. Types of data and their distribution characteristics are shown in FIG. 44.

The modeling algorithms must be sufficiently robust to tolerate wide ranges and odd patterns of data distribution characteristics. Locations where the fault ceases to exist is often not represented in the data, requiring special interpretation during modeling. For these and other reasons, special algorithms are required to model faults.

Refer to FIG. 44 for an illustration of fault model geometry.

It is fairly typical that a reservoir may contain tens or even hundreds of faults. To address the workflow of managing many faults, special methods are required to model them all at once, or, at least, many of them in a single step.

2.1 Fault Surface Modeling

Referring to FIG. 45, a table based fault gridder, capable of gridding any number of faults, is shown in FIG. 45. Each row of the table in FIG. 45 represents a fault. Columns in FIG. 45 are used to name the fault, define input data sources, set gridding parameters, etc. For each fault, multiple data sets and several gridding parameters may be defined. All faults, or only some of them, may then be gridded in one step.

Generalized parameters are made available to the user to control smoothness, fit to data, grid increment and extrapolation distance of the resultant fault surfaces. There is also flexibility as to which data set and parameter columns are displayed (not all columns are shown in the dialog).

The columns in the fault gridding table of FIG. 45 include the following options and parameters:

Data—The fault gridder supports multiple data types as input to fault creation. Several columns (only one shown) are used for this purpose to input: cut (or segment) data, trace (fault polygon) data, contact data, and well cut data.

Smoothing—A smoothing level controls the range of output from a very planar (trend-like) surface to more complex shapes based on stricter honoring of fault data. Five levels of smoothness are available, ranging from none to very high. Smoothing is nearly always required for seismically derived fault data to dampen the "noise" inherent in the picks.

Trend—Depending on smoothing, the modeling algorithm incorporates trend methods and this parameter defines the order of the trend. Higher trend orders allow more curvature in the resulting model.

Increment—For steeply-dipping faults, the grid resolution may need to be enhanced over the default resolution (the resolution at which the horizon is produced). For high resolution fault models, storage requirements will not be excessive, since compression methods are used when storing the grid.

Extrapolation—This parameter is a gross extent control, defining the distance to extrapolate the fault beyond the data extent in the three dimensional space. This allows the user to ensure that faults which are supposed to intersect really do, even if the input data does not naturally cause this to happen.

Tip Loop Polygon—This parameter gives the name of a fault extent polygon, allowing the user to explicitly control the precise extent of the fault. The system will optionally compute a tip loop polygon based on the extrapolated data extent.

Tip Loop Calculation—This parameter controls whether a tip loop polygon will be computed or whether a supplied polygon is used.

Once a fault gridding table is defined, it may be given a name and saved. A subsequent modeling session may recall the table for further use: adding new faults, regrid or remove existing ones, append contents of another fault table, regrid selected faults, regrid only faults with changed parameters, etc. Framework 3D is not restricted to fault surfaces created by the gridding table. Surfaces may be created using the wide range of CPS-3 gridding algorithms, or imported from an external source.

3. Fault Framework Building

The purpose of the Fault Framework Builder is to assemble all faults into a single entity used to represent the complete fault geometry of a reservoir. The following entities are used to build the framework:

(1) Individually gridded fault location surfaces which define the structure and generalized extents of the faults. These faults may come from the table based fault gridder or from some other source.

(2) Traces which represent vertical fault locations (optional).

(3) Fault-to-fault relationship information defining the relationship between each pair of intersecting faults. This consists of defining the truncating (major) fault and the fault which is truncated (minor), as well as whether the minor fault is truncated above or below the major fault (refer to the aforementioned "Abbott application" already incorporated herein by reference).

Faults intersect other faults and the Fault Framework Builder reconciles these intersections by first detecting that they exist, then advising which faults should be truncated and how. The user can change any of the automatically computed fault relationships and truncation rules.

Refer to FIG. 46 for an illustration of fault framework elements.

In FIG. 46, the fault framework manages and stores the various data objects computed during the building process. These objects include minor faults truncated against their related major fault, requiring storage of two fault versions (truncated and raw), fault-fault intersection lines and all established fault relationships. Some of these elements are shown in FIG. 46.

3.1 Building the Framework

Refer to FIG. 47 for a visual display (dialog) relating to building the fault framework. The Fault Framework Builder dialog is shown in FIG. 47.

From this dialog of FIG. 47, the user can load fault surfaces, have the system automatically calculate whether the faults are major or minor and define the truncation rules, perform the truncations, undo them, etc. You can also edit the framework rules, redo truncations, and then, once complete, give the framework a name and save it. If you enter or select an existing framework, the framework builder will automatically load the framework, display all faults and fault pairs in the table, and show all currently defined truncation rules and status information.

The following options and dialog components are available in the Fault Framework Builder of FIG. 47:

Vertical Fault Set Name—This field names a collection of vertical fault traces to be added to the framework. Each vertical fault is individually named within the collection (fault set). Vertical faults are modeled as cutting through the entire reservoir and are applied to each horizon.

Select Colors—Each fault is assigned a default color, which can be edited. This color is the display color when the fault is viewed in SurfViz.

Fault—This column contains the fault names. If the fault does not intersect any other fault or intersects only one fault, then there will be only one row corresponding to this fault. If a fault intersects more than one fault, there will be a row for each intersection and the intersected fault will be named in the "Related Fault" column.

Related Fault—This column contains the name of a related fault. If blank, the fault does not intersect any other fault in the framework.

Major—This column names the major fault, given that a relationship exists ("Related Fault" field is non-blank). This means that any truncation will be done to the other (minor) fault in the fault pair. The color of this field is indicative of the status of this surface's truncations for this fault pair. Red means that the minor fault surface either has not been truncated or has been truncated differently than what is currently specified. It is necessary to perform a truncation pass on the fault framework in order to re-truncate the surfaces to reflect what is specified in the table.

Minor Truncated—This column lists the truncation rule for the intersecting fault pair: (1) Above—The minor fault is truncated above (structurally higher than) the major fault, (2) Below—The minor fault is truncated below (structurally lower than) the major fault, and (3) None—The minor fault is (and should remain) untruncated relative to the major fault.

Refer to FIG. 48 for a cross-sectional view of three faults representing two of these cases.

Referring again to FIG. 47, once a truncation has been applied, if the major/minor relationship is changed, the truncation rule becomes inconsistent with the truncation that has actually been applied and is highlighted in red. The next time a truncation is executed on a framework, the minor fault will automatically be restored from the original untruncated version. The truncation will be done based on the current setting of the truncation rule. If the minor fault is also truncated by other faults in the framework, these truncations will also be re-done automatically.

Hide/Show Duplicate Rows—In FIG. 47, a pair of intersecting faults (fault A and fault B) will occupy two rows in the table—one row named fault A (and related fault B) and another row named fault B (and related fault A), but with the same relationship on each row. This toggle button hides one of them.

Find Fault—For tables that include many faults, this option may be used to quickly find a named fault.

Load Faults—This push button invokes a multi-select dialog, allowing selection of one or more faults for loading into the fault framework. When each fault is loaded, the system checks for intersection with all other previously loaded faults. Each intersection will be create a row entry in the table and the truncation rule will be set to undefined and highlighted yellow. As soon as the relationship is defined (either auto-calculated or manually defined), the color will change from yellow to red, with red indicating the truncation has yet to be performed (on the minor fault). When loading a fault, as it is checked for intersection with other faults, fault-fault intersection lines are calculated and saved as part of the fault framework.

Remove Fault—This push button removes all selected faults from the framework. All rows that correspond to this fault will be removed from the table and truncations involving this fault will be reversed.

Save to Fault Framework—This push button saves the fault framework to a named framework table.

Calculate Rules—This push button calculates default truncation rules for all selected fault pairs. A major fault will be selected from the pair and a truncation rule for the minor fault will be calculated. Calculated rules are good defaults to start from and can be overridden at any time.

Restore Fault—This push button reverses the truncation of all selected faults. This restores the fault to its untruncated form. When a fault is restored, the rows specifying truncations for this fault are no longer current and will be highlighted in red.

Apply—This push button applies the rules and truncates the (minor) faults.

3.2 Visualizing the Framework

The Fault Framework Builder interacts with SurfViz via an ITC connection (Inter-Task Communication) to show the current state of the framework as it is being built. Surfaces are automatically displayed as they are being created and redisplayed as they are modified.

Refer to FIG. 19 for a "final faulted horizon model", otherwise known as a "SurfViz view of a Framework 3D Model".

4. Horizon Modeling

We already pointed out that constructing realistic geologic horizon models in the presence of complex faulting is a 3D modeling problem. To tackle it, we have adopted single valued grid representations of horizon surfaces in order to make the solution as efficient as possible in light of large scale applicability. There is no limit on the number of faults, resolution of the fault or horizon surfaces, or number of horizon data points.

Fault surface based gridding techniques form the core computational process of the horizon modeler. Many other options and features exist, especially conformal modeling, but the ability to accept faults as surfaces, and the automation that supports this process, are the distinguishing characteristics of this module.

Refer to FIG. 49 for inputs to horizon modeling.

In FIG. 49, the basic inputs to horizon modeling are shown in FIG. 49. The faults and optional fault displacement models are gridded surfaces. Horizon data are discrete points with random distribution—dense or sparse clouds of points in space with no direct connection to the fault surface (Fault-fault relationships are not shown, but are used to model compound fault geometries).

Refer to FIG. 50 for a view of horizon trimming, and refer to FIG. 51 for a completed horizon model.

In FIGS. 50 and 51, horizon points are interpolated to a rectilinear grid and extrapolated to intersect with the fault surface (see FIG. 50). The intersection line is calculated and the surface extensions are trimmed to honor the fault topology. In a final step (see FIG. 51), the fault zone is infilled with fault grid values so that, in this zone and at the surface intersection curves, the horizon model exactly matches the fault model. The final horizon model is then a collection of the resulting surface together with the horizon-fault intersection traces.

Refer to FIG. 52 for a detail horizon model geometry.

In FIG. 52, a view of output elements of the horizon model is shown in FIG. 52. Fault downthrown and upthrown traces are oriented with the downside of the discontinuity to the right side of the trace (i.e., the true down direction, considering the model domain, may be depth or elevation). Consistency of orientation assists annotation of fault block markers when rendering the model.

A bifurcated fault is traced so that only major fault traces pass through the zone of bifurcation. Minor fault traces always start (or stop) at the bifurcation. All traces have surface Z-values attached and these Z-values are the exact representations of both the horizon and fault models, i.e., these are the discrete points in space where the two surfaces connect, representing a curve in 3D space. Sampling of the curve varies, depending on bending. Simple intersections with low curvature will have fewer points than a more complex intersection with high curvature.

In FIG. 52, where the major fault trace passes through the bifurcation zone, the trace changes from being a horizon-fault intersection to a fault—fault intersection. Only horizon-fault intersection Z-values are represented in the trace. Where trace Z-values are absent (i.e., has a null Z-value), the trace passes through a bifurcation.

4.1 Building the Horizon

Referring to FIG. 53, the Horizon Modeling dialog is illustrated. Its primary purpose is to name all input objects used to compute the horizon, including data sets, fault framework, reference surfaces (for conformal modeling), etc, and to name the output horizon. Key parameters are also set here.

Referring to FIG. 54, the horizon modeling modes of operation are illustrated. The basic mode of operation is set by this dialog, which is any combination of faulted, unfaulted, conformal and unconformal. These are summarized in the table of FIG. 54. Mode icons shown in the table of FIG. 54 are push buttons in the dialog and are used to control object input. The eight modes are a decomposition of the four primary modes delineated in the table of FIG. 54.

Available options and dialog components include:

Sets for Gridding—Up to eight data sets may be specified, allowing modeling of multiple seismic surveys, and other kinds of data catalogued separately in the database. When more than one set is specified, a global weight may be attached to each set (not shown). Individual point weights are also acceptable, if available in the data set. Global and point weights are acceptable in any combination.

Use Dip and Azimuth Fields—The data set may include, as separate fields, dip angle and dip azimuth data. This information is used to constrain the slope of the model. Both components, or only the dip azimuth component, may be used. A range of influence for these parameters (not shown) may be set. This range is the distance relative to the specific data point where the corresponding dip and/or azimuth data has effect.

Normal Fault Polygons—This option allows introduction of interpreted fault polygons (i.e., known fault traces) into the model, if they exist. They constrain the horizon to intersect the fault at the polygon (x, y) locus points. Fault polygon data may be provided for an arbitrary number of faults. In addition, fault polygon data may represent full intersection polygons or only (partial) segments of traces. As such, they can effectively be used for detail control of the model in selected areas.

Limiting Polygon—One or more polygons may be used for detail coverage control of the final model. Only interior parts of all polygons will be defined.

Initial Grid Intervals—These two parameters control the range of influence of data points by controlling the size of the initial grid of the Convergence Gridder. The user may select appropriate values to be provided automatically by the system. In this case, based on data distribution analysis, the system computes initial grid intervals which result in a fully defined model.

Additional Smoothing—This parameter is used to smooth the model and is most applicable for high-resolution models of 3D seismic data. Several levels of smoothing are available.

Referring to FIG. 55, the "Advanced Modeling Options" dialog is illustrated. This "Advanced Modeling Options" dialog is accessed from the main horizon modeling dialog. It offers options for controlling the modeling process and setting additional modeling parameters. The automated and adaptive techniques used in horizon modeling, in most cases, do not necessitate usage of this dialog, except in difficult data cases. Re-entrant modeling can be enabled, starting at some intermediate modeling stage, thereby exposing intermediate results to detail edits. This gives the user a great ability to influence the final modeling results.

Refer now to FIG. 55.

Calculate Initial Fault Locations Only—This option begins with input data and computes an initial approximation to fault locations. These are single traces which represent the approximate intersection between faults and the horizon being gridded. Modeling stops after these traces are computed with the final horizon model not computed. This is useful for validating the integrity of the fault framework relative to the specific horizon without waiting for the entire model to be built. Typically, the visual appearance of the resulting traces is a good indicator of the quality of the fault surfaces and the horizon data. Rough traces generally indicate the need to improve the smoothness of the fault model. Smooth traces indicate good fault surfaces and consistent horizon data, generally taking fewer iterations for the system to converge to a solution.

Restart Using Initial Fault Locations—This option allows restart of the modeling process from initial fault locations. This set of initial fault locations may or may not have been edited prior to restarting.

Restart at Fault Trace Calculation—This option allows restart of the modeling process from the initial horizon model. The initial horizon model is one of the intermediate objects made available when a complete modeling run is done. This surface object may be edited before restarting. The upthrown and downthrown fault traces will be recalculated and the final horizon model will be computed.

Restart at Fault Trace Regrid Calculation—This option allows restart of the modeling process from the final upthrown and downthrown traces. These traces may be edited before restarting, but will be modeled as true intersection locations, reshaping the horizon where editing occurred and retaining the old horizon where edits did not occur.

Restart at Fault Zone Infill—This option re-inserts the fault model within fault zones of the horizon. This is useful if the fault traces are edited in bifurcation zones and keeps the final horizon model in sync with the traces.

4.2 Filtering and Automation

Parameters in the "Advanced Modeling Options" dialog, shown in FIG. 55, control two modules which are key to the automation of the horizon modeling process. Both of them involve filtering. One filter is used while calculating initial fault locations, another is used to control the quality of data fed to the remaining modeling steps.

4.2.1 Filtering When Calculating Initial Fault Locations

In order to calculate stable initial fault locations, it is often necessary to temporarily ignore some types of data close to the faults. Filtering at this stage of modeling removes data points which may be too close to fault surfaces.

Data filtering plays an important role when estimating where a fault intersects a horizon. This is an iterative process and typically requires three to five iterations. Starting with zero filtering distance for each fault, the filtering algorithm increments the distance on a per fault basis, yielding minimal filtering distances required to rid the system of bad (inconsistent) data, yet maximize the retention of good data. The initial filter distance parameter on the dialog is the increment used in this calculation. At the end of each iteration, a convergence test is made based on the analysis of the quality of the current initial fault locations. Data are considered good (and filtering complete) when all computed initial fault locations pass a distortion test. Each time a fault location fails the distortion test, its filter distance is increased and the iterations continue.

A "maximum number of iterations" parameter limits the number of filtering iterations and a "maximum distortion angle" parameter controls the filtering convergence test. This distortion parameter controls the maximum distortion of the bending of any computed fault location curve with respect to the bending of the corresponding fault surface. Setting this parameter to a small value (between 20 and 30 degrees) usually results in good quality fault locations. Large values may result in poor quality fault locations. Small values, less then 20 degrees, may require more iterations for convergence.

4.2.2 Filtering When Calculating the Horizon Model

In addition to estimating where a fault penetrates a horizon, filtering is also vital in supplying good data to horizon gridding. It removes wrong sided data points (that is, points on the wrong side of a fault surface) using an adaptive method on a per-fault basis. Well data are always excluded from filtering so that only seismic and any other non-well data types are filtered. Since the filter does not distinguish a bad point from a good one (i.e., a correctly sided point), good data points close to a fault may be removed in the filtering process as well. Due to the nature of 3D seismic data, and the inherent difficulties of picking faults and horizons in a consistent manner, it is sometimes necessary to filter this type of data. The need for filtering depends on the consistency of the data, but, if not done, can adversely affect the final model when inconsistencies occur. This is a single-pass, non-iterative filter that re-filters the original input data and does not use the filtered data from the initial fault locations calculations (first filter). Like the first filter, this filtering removes data points which are judged to be too close to fault surfaces. Points within a distance tolerance, called the filter distance, from either side of the fault, are removed.

By default, filtering distances derived from the first filter are used, restricted to a minimal/maximal range. The default range is an internal setting based on a combination of the seismic sample interval and the horizon grid interval. The effect is that the two filters are loosely tied together (by default) with the first filter affecting the second, a technique assisting process automation. Controls are available to turn this filter off, or to apply the same distance to all faults.

4.3 Conformal Modeling

Refer to FIG. 5 for conformal modeling to one reference horizon. In addition, refer to FIG. 22 for conformal modeling to two reference horizons.

In FIGS. 5 and 22, methods of structural conformal geology are options to the modeling process. Multiple horizons may be modeled independent or dependent on one another. Conformal dependency may be established based on or two other reference horizons controlling the shape of the modeled horizon. Single-reference conformal modeling constrains the shape to one input reference horizon (see FIG. 5). Dual reference conformal modeling constrains the shape to an average (proportional) shape of two reference horizons (see FIG. 22). The derivation of shaping constraints is fully automated in keeping with overall automation of the system.

Predictor/corrector methods are used when deriving final fault locations (traces) that properly show the fault migrating from reference to infill. In the case of conformal modeling, these iterative fault locating techniques are more complex than those of reference horizon modeling. The methods used honor true fault geometries and take into account faults dying out both laterally (x, y) and vertically.

4.4 Controlling Fault Throw

Refer to FIG. 56 for a throw model correction.

In FIG. 56, when horizon data is remote from fault surfaces, extrapolation is required to model the horizon up to the fault. In cases of sparse data, remoteness is a more likely occurrence, but may occur in most any data case. The extrapolated horizon at the fault, although it may be reasonable within the block, may be unreasonable as it relates to the horizon on the opposing side of the fault. This assumes absence of a fault displacement model, but can lead to a normal fault modeled as reverse (see FIG. 56).

To detect and remedy this situation, a throw correction step is used. Horizon throw is analyzed along the initial fault locations and compared with the fault gradient. As needed, a throw correction is applied consistent with the type of fault (normal or reverse). A minimum-average alteration of the model is made based on a minimal throw constraint. In places where the horizon indicates faulting consistent with the fault type, no correction is made. This correction introduces a level of across-fault horizon dependency. However, it does not offer the kind of throw control that a fault displacement model would provide.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A device adapted for storing instructions, said instructions adapted to be executed by a processor of a workstation, said workstation adapted to receive data including horizon data representing one or more horizons in an earth formation and fault data representing one or more faults intersecting at least some of said horizons, said instructions, when executed by said processor of said workstation, conducting a process comprising the steps of:

(a) computing a preliminary unfaulted horizon model using only said horizon data, (b) computing intersections between said preliminary unfaulted horizon model and each of the faults intersecting said horizon model, at least some of said intersections between said horizon model and said each of said faults being inconsistent intersections, and (c) filtering in the vicinity of said inconsistent intersections.

2. The device of claim 1, wherein said inconsistent intersections exhibit geometric characteristics that are inconsistent with the geometric characteristics of said each of the faults, and wherein the filtering step (c) comprises the step of:

(c1) eliminating some of said horizon data in the vicinity of said inconsistent intersection thereby decreasing a slope of said horizon model in the vicinity of said inconsistent intersection and generating a new said horizon model having a surface which includes one or more clean and consistent intersections between said new horizon model and each of the faults intersecting said new horizon model, each of said clean and consistent intersections representing an initial fault location.

3. The device of claim 2, wherein said instructions, when executed by said processor, conduct said process further comprising the step of:

(d) when said surface of said horizon model including said clean and consistent intersections is generated, reintroducing said some of said horizon data which was eliminated during the eliminating step (c1).

4. The device of claim 3, wherein said instructions, when executed by said processor, conduct said process further comprising the step of:

(e) re-filtering said some of said horizon data which was reintroduced during the reintroducing step (d).

5. The device of claim 4, wherein the re-filtering step (e) comprises the step of:

(e1) eliminating certain ones of said horizon data which are located within a narrow filtering zone around said initial fault locations thereby generating clean horizon data.

6. The device of claim 5, wherein said instructions, when executed by said processor, conduct said process further comprising the step of:

(f) generating an initial faulted horizon model in response to said clean horizon data generated during the eliminating step (e1) and said initial fault locations, said initial faulted horizon model including a horizon having a substantially vertically sloped fault or discontinuity passing therethrough at each of said initial fault locations.

7. The device of claim 6, wherein said instructions, when executed by said processor, conduct said process further comprising the step of:

(g) generating a set of final fault locations on said horizon model in response to said initial faulted horizon model generated during the generating step (f), the final fault locations representing a horizon model having a non-vertically sloped fault or discontinuity passing therethrough, the horizon model having a fault zone including an opening through which the non-vertically sloped fault passes when said final fault locations represent said horizon model having said non-vertically sloped fault passing therethrough.

8. The device of claim 7, wherein said instructions, when executed by said processor, conduct said process further comprising the step of:

(h) generating a final faulted horizon model in response to said final fault locations generated during the generating step (g) but not in response to said initial fault locations generated during the eliminating step (c1), said final faulted horizon model including one or more accurately represented intersections between a horizon and one or more faults passing through the horizon, whereby underground deposits of hydrocarbon are potentially located adjacent to said intersections.

9. The device of claim 8, wherein said fault data includes fault surfaces data and relationships data, said fault surfaces data including a plurality of pairs of fault surfaces, said relationships data identifying intersecting ones of said plurality of pairs of fault surfaces, each fault surface of said intersecting ones of said plurality of pairs of fault surfaces having a major status and a minor status, said relationships data further including the major status and the minor status of each fault surface of said intersecting ones of said plurality of pairs of fault surfaces.

10. A method of determining an accurate estimate of underground deposits of hydrocarbon in an earth formation, comprising the steps of:

(a) introducing data representing one horizon;

(b) generating a preliminary horizon model, said horizon model including horizon data;

(c) computing intersections between said preliminary horizon model and each fault intersecting said horizon model;

(d) improving said preliminary horizon model, the improving step (d) including the step of filtering said horizon data in the vicinity of at least some of said intersections which exhibit geometric characteristics not in good agreement with the geometric characteristics of the corresponding faults passing through said intersections; and (e) repeating steps (a) through (d) for each horizon model until said horizon model exhibits clean intersections between said horizon model and faults intersecting said horizon model, said clean intersections representing initial fault locations which have geometric characteristics matching well the geometric characteristics of the corresponding fault.

11. The method of claim 10, further comprising the steps of:

(f) refiltering the horizon data thereby removing bad, wrong sided data points, the refiltering step including the steps of:

(f1) reintroducing eliminated horizon data which was filtered during the filtering step (d), and refiltering the reintroduced horizon data by eliminating certain ones of the horizon data which are located within a narrow filtering zone in the vicinity of said initial fault locations thereby generating clean horizon data.

12. The method of claim 11, further comprising the steps of:

(g) determining an initial faulted horizon model in response to said clean horizon data generating during step (f1) and the initial fault locations, the initial faulted horizon model including a horizon having a substantially vertically sloped fault passing through the initial fault location on the horizon.

13. The method of claim 12, further comprising the steps of:

(h) determining a final faulted horizon model, the determining step (h) including the steps of, (h1) generating a set of final fault locations in response to said initial fault locations and said initial faulted horizon model determined during the determining step (g), said final fault locations representing a horizon having a non-vertically sloped fault passing through a fault zone, said fault zone including an opening through which the non-vertically sloped fault passes.

14. The method of claim 13, further comprising the steps of:

(i) determining an accurate estimate of underground deposits of hydrocarbon in the earth formation, the determining step (i) including the steps of, (i1) generating a final faulted horizon model in response to the final fault locations generating during the generating step (h1) but not in response to the initial fault locations generating during the repeating step (e), said final faulted horizon model including one or more accurately represented intersections between one or more horizons and one or more faults passing through the horizons, the underground deposits of hydrocarbon being located adjacent said intersections.

* * * * *